US011874534B2

(12) United States Patent
Hugenberg et al.

(10) Patent No.: US 11,874,534 B2
(45) Date of Patent: Jan. 16, 2024

(54) SPECTACLE LENS HAVING A PHOTOCHROMIC COATING AND METHOD FOR PRODUCING THE SAME

(71) Applicant: Carl Zeiss Vision International GmbH, Aalen (DE)

(72) Inventors: Norbert Hugenberg, Aalen (DE); Silvia Faul, Aalen (DE); Bin Peng, Aalen (DE); David Diggins, Flagstaff Hill (AU); Michael Krieger, Aalen (DE); Markus Haidl, Aalen (DE)

(73) Assignee: Carl Zeiss Vision International GmbM, Aalen (DE)

( * ) Notice: Subject to any disclaimer, the term of this patent is extended or adjusted under 35 U.S.C. 154(b) by 713 days.

(21) Appl. No.: 17/078,143

(22) Filed: Oct. 23, 2020

(65) Prior Publication Data

US 2021/0124189 A1 Apr. 29, 2021

Related U.S. Application Data

(63) Continuation of application No. PCT/EP2019/060481, filed on Apr. 24, 2019.

(30) Foreign Application Priority Data

Apr. 24, 2018 (EP) .................................. 18168994

(51) Int. Cl.
G02C 7/10 (2006.01)
G02C 7/06 (2006.01)

(52) U.S. Cl.
CPC .............. G02C 7/102 (2013.01); G02C 7/06 (2013.01); G02C 7/107 (2013.01)

(58) Field of Classification Search
CPC ........... G02C 7/102; G02C 7/06; G02C 7/107
USPC .................................................... 351/159.61
See application file for complete search history.

(56) References Cited

U.S. PATENT DOCUMENTS

| | | | |
|---|---|---|---|
| 3,986,997 A | 10/1976 | Clark | |
| 4,211,823 A | 7/1980 | Suzuki et al. | |
| 4,294,950 A | 10/1981 | Kato | |
| 4,355,135 A | 10/1982 | January | |
| 6,538,092 B1 | 3/2003 | Terry et al. | |
| 7,258,437 B2 | 8/2007 | King et al. | |
| 9,817,155 B2 | 8/2017 | Neuffer | |
| 9,778,484 B2 | 10/2017 | Hugenberg et al. | |
| 9,957,398 B2 | 5/2018 | Hugenberg et al. | |
| 10,179,831 B2 | 1/2019 | Weippert | |
| 2004/0191520 A1* | 9/2004 | Kumar | C09K 9/02 428/411.1 |
| 2004/0220292 A1 | 11/2004 | Momoda et al. | |
| 2006/0066947 A1 | 3/2006 | Henry | |
| 2006/0269741 A1 | 11/2006 | Izumi et al. | |
| 2008/0271844 A1 | 11/2008 | Lacan et al. | |
| 2008/0311404 A1 | 12/2008 | Diggins | |
| 2009/0189303 A1 | 7/2009 | Diggins et al. | |
| 2011/0026118 A1 | 2/2011 | Seesselberg et al. | |
| 2011/0075096 A1* | 3/2011 | Ishak | G02C 7/102 351/159.65 |
| 2012/0021135 A1 | 1/2012 | Yajima | |
| 2016/0124122 A1 | 5/2016 | Duc et al. | |
| 2016/0161643 A1 | 6/2016 | Jiang et al. | |
| 2017/0031064 A1 | 2/2017 | Gloege et al. | |
| 2017/0297955 A1 | 10/2017 | Gloege | |
| 2018/0251657 A1 | 9/2018 | Yamamoto et al. | |
| 2019/0391411 A1 | 12/2019 | Kelch et al. | |

FOREIGN PATENT DOCUMENTS

| | | |
|---|---|---|
| AU | 1980064178 B2 | 9/1983 |
| AU | 2016317439 A1 | 3/2018 |
| CN | 101300507 A | 11/2008 |
| CN | 204666984 U | 9/2015 |
| CN | 105264406 A | 1/2016 |
| DE | 19848591 A1 | 10/1999 |
| DE | 102012210185 A1 | 12/2013 |
| DE | 102015209794 A1 | 12/2016 |
| EP | 28975 A1 | 5/1981 |
| EP | 217502 A1 | 4/1987 |
| EP | 556646 A1 | 8/1993 |
| EP | 1392613 A1 | 3/2004 |
| EP | 1457808 A1 | 9/2004 |
| EP | 1461644 A1 | 9/2004 |
| EP | 1561571 A1 | 8/2005 |
| EP | 1602479 A1 | 12/2005 |

(Continued)

OTHER PUBLICATIONS

Office action by the European Patent Office issued in EP 18 168 994.4, to which this application claims priority, dated Jun. 2, 2021, and English-language translation thereof.

Koeppen: "Konzeption und Entwicklung von Gleitsichtglaeser," DOZ, pp. 42-45, and English-language translation thereof, Oct. 1995.

"Use of impact-resistant lenses in eyeglasses and sunglasses," FDA, Code of Federal Regulations, Title 21, vol. 8, Sec. 801.410 (21CFR801. 410), Apr. 9, 2004.

"Ophthalmic optics—Spectacle lenses—Vocabulary (ISO 13666:2012)," German and English version EN ISO 13666:2012, Oct. 2013.

"Qualitätskontrolle für Lacke und Rohstoffe [Quality Control for Paints and Raw Materials]," Byk-Gardner GmbH, pp. 156 to 158, 2018.

(Continued)

Primary Examiner — James R Greece
(74) Attorney, Agent, or Firm — Tautz & Schuhmacher LLC; Georg M. Hasselmann

(57) ABSTRACT

A spectacle lens includes at least one substrate and at least one photochromic layer. The spectacle lens exhibits no swelling of the coating and/or of the substrate in the event of at least one damage to the surface of the spectacle lens with a force of ≤65 m N after contamination of the surface of the spectacle lens with at least one organic acid over a period from a range of 12 hours to 84 hours. Further, a method for producing the spectacle lens and the use of at least one chemically modified layer and/or at least one barrier layer for coating a spectacle lens substrate is disclosed.

44 Claims, No Drawings

(56) References Cited

FOREIGN PATENT DOCUMENTS

| | | | |
|---|---|---|---|
| EP | 1674898 | A1 | 6/2006 |
| EP | 1965235 | A1 | 9/2008 |
| EP | 2006031 | A2 | 12/2008 |
| EP | 2437084 | A1 | 4/2012 |
| EP | 2578649 | A1 | 4/2013 |
| EP | 2664659 | A1 | 11/2013 |
| EP | 2711741 | A1 | 3/2014 |
| EP | 3352001 | A1 | 7/2018 |
| WO | 9417116 | A1 | 8/1994 |
| WO | 9846692 | A1 | 10/1998 |
| WO | 03058300 | A1 | 7/2003 |
| WO | 2005050265 | A1 | 6/2005 |
| WO | 2006050891 | A2 | 5/2006 |
| WO | 2009029198 | A1 | 3/2009 |
| WO | 2009056196 | A1 | 5/2009 |
| WO | 2009156784 | A1 | 12/2009 |
| WO | 2011096304 | A1 | 8/2011 |
| WO | 2015121341 | A1 | 8/2015 |
| WO | 2015160612 | A1 | 10/2015 |

OTHER PUBLICATIONS

Extended European Search Report by the European Patent Office issued in EP 18 168 994.4, to which this application claims priority, dated Sep. 28, 2018.

International Search Report of the International Searching Authority issued in PCT/EP2019/060481, to which this application claims priority, dated Oct. 31, 2019, and English-language translation thereof.

Written Opinion issued in PCT/EP2019/060481, to which this application claims priority, dated Nov. 4, 2019.

Office action by the European Patent Office issued in EP 18 168 994.4, to which this application claims priority, dated Jun. 4, 2020.

International Preliminary Examination Report issued in PCT/EP2019/060481, to which this application claims priority, dated Aug. 20, 2020, and English-language translation thereof.

Office action by the European Patent Office issued in EP 18 168 994.4, to which this application claims priority, dated Nov. 24, 2020, and English-language translation thereof.

Office action by the Chinese Patent Office issued in CN 201980041831.4, which is a counterpart hereof, dated Mar. 10, 2022, and English-language translation thereof.

English language translation of the Search Report to the Office action by the Chinese Patent Office issued in CN 201980041831.4, which is a counterpart hereof, dated Mar. 10, 2022.

Office Action by the Chinese Patent Office (CNIPO) issued in CN 201980041831.4, which is a counterpart hereof, dated Jul. 4, 2023, and English translation thereof.

Office Action by the European Patent Office (EPO) issued in EP 18 168 994.4, which is a counterpart hereof, dated Jul. 10, 2023, and English translation thereof.

* cited by examiner

SPECTACLE LENS HAVING A PHOTOCHROMIC COATING AND METHOD FOR PRODUCING THE SAME

CROSS REFERENCE TO RELATED APPLICATIONS

This application is a continuation application of international patent application PCT/EP2019/060481, filed Apr. 24, 2019, designating the United States and claiming priority from European application 18168994.4, filed Apr. 24, 2018, and the entire content of both applications is incorporated herein by reference.

TECHNICAL FIELD

The present disclosure relates to a spectacle lens comprising at least one substrate and at least one photochromic layer, to a method of producing such a spectacle lens and to the use of at least one chemically modified layer and/or at least one barrier layer in the coating of a spectacle lens.

BACKGROUND

EP 1 461 644 A1 discloses an ophthalmic layer based on a polymeric substrate covered with a photochromic layer and an acrylate-based radiation-cured layer. The acrylate-based radiation-cured layer is said to be more alkali-resistant, harder, and more scratch-resistant than the photochromic layer, and is also to be compatible with any organosilane-based abrasion-resistant layer applied thereto. The acrylate-based layer comprises, for example, 10% by weight to 85% by weight of at least one epoxy monomer and 90% by weight to 15% by weight of at least one acrylate monomer. As well as the organosilane-based abrasion-resistant layer, the coating of the ophthalmic lens may further include an antireflection layer, an antistatic layer, or a water-repellent layer.

EP 2 006 031 A2 discloses a process for producing a laminate from a substrate, for example a spectacle lens, and a moisture-curing polyurethane resin as primer by means of spin-coating. For production of the polyurethane resin, polyurethane polymers or polyurethane polymers having an average molecular weight Mn of 300 to 5000 in which the average content of terminal isocyanate groups is 0.001 to 50 mol % is used.

EP 1 561 571 A1 discloses a photopolymerizable and curable composition for the production of a photochromic coating on a substrate. The composition comprises a free-radically polymerizable polymer, 0.2% to 20% by weight of a photochromic component and a phosphorus-containing initiator for photopolymerization. The coating has a thickness of 1 µm to 100 µm on the curved surface of the substrate. The difference between the maximum, minimum and average thickness of the coating is not greater than 7% except in the peripheral edge region. The spherical correction effect of the substrate before and after coating thereof differs by less than ±0.5 diopter.

AU 2016 317 439 A1 discloses a primer layer, the flexibility of which prevents cracking of a photochromic layer. The bond strength between the photochromic layer and the substrate is not impaired by this primer layer. The primer composition comprises (A) a polyrotaxane and (B) a polyurethane resin or a precursor thereof.

US 2012/021135 A1 discloses a method of producing a spectacle lens comprising a primer layer and a hardcoat layer. The primer layer is applied as a water-based resin composition. After the water-based solvent has been removed to obtain the primer layer, the composition for the hardcoat layer is applied thereto. The latter is subsequently cured.

SUMMARY

It is an object of the present disclosure to provide a spectacle lens having photochromic properties, wherein the optical properties of the spectacle lens are not to be impaired by damage to the spectacle lens in everyday use of the spectacles with associated contamination of the spectacle lens.

It is a further object of the present disclosure to provide a method of producing such a spectacle lens.

The object is achieved by providing a spectacle lens comprising at least one substrate and at least one photochromic coating and at least one chemically modified layer on the same surface of the substrate, wherein the chemically modified layer displays a pH-buffering effect, and a method of producing such a spectacle lens. Exemplary embodiments of the spectacle lens are discussed below.

DESCRIPTION OF EXEMPLARY EMBODIMENTS

The substrate to be coated with at least one photochromic layer may comprise at least one polymeric material and/or at least one mineral glass, wherein the polymeric material or mineral glass may each take the form of a semifinished spectacle lens, i.e., of a lens blank having just one optically ready-processed face according to DIN EN ISO 13666:2013-10, paragraph 8.4.2, or of a finished spectacle lens, i.e., of a spectacle lens having two ready-processed optical faces before or after edge processing according to DIN EN ISO 13666:2013-10, paragraph 8.4.6. The semifinished spectacle lenses may take the form of monofocal semifinished spectacle lenses, multifocal semifinished spectacle lenses or varifocal semifinished spectacle lenses according to DIN EN ISO 13666:2013-10, paragraphs 8.4.3, 8.4.4 and 8.4.5. The finished spectacle lenses may be monofocal spectacle lenses, multifocal spectacle lenses, bifocal spectacle lenses, trifocal spectacle lenses, varifocal spectacle lenses or degressive spectacle lenses according to DIN EN ISO 13666:2013-10, paragraphs 8.3.1, 8.3.2, 8.3.3, 8.3.4, 8.3.5 and 8.3.6. The semifinished spectacle lenses or finished spectacle lenses usable as substrate may be based, for example on the base materials specified in Table 1 below.

TABLE 1

Examples of base materials for semifinished spectacle lenses or finished spectacle lenses

| Trade name | Base material | Average refractive index n* | Abbe number v* |
|---|---|---|---|
| CR 39, CR 330, CR 607, CR 630, RAV 700, 7NG, 7AT, 710, 713, 720 | Polyallyldiglycol carbonate ((P)ADC) | 1.500 | 56 |

TABLE 1-continued

Examples of base materials for semifinished spectacle lenses or finished spectacle lenses

| Trade name | Base material | Average refractive index n* | Abbe number v* |
|---|---|---|---|
| RAVolution | Polyurea/Polyurethane | 1.500 | 54 |
| Trivex | Polyurea/Polyurethane | 1.530 | 45 |
| Panlite, Lexan | Polycarbonate (PC) | 1.590 | 29 |
| MR 6 | Polythiourethane | 1.598 | |
| MR 8 | Polythiourethane | 1.598 | 41 |
| MR 7 | Polythiourethane | 1.664 | 32 |
| MR 10 | Polythiourethane | 1.666 | 32 |
| MR 174 | Polyepisulfide | 1.738 | 32 |
| MGC 1.76 | Polyepisulfide | 1.76 | 30 |
| | Mineral 1.5 | 1.525 | 58 |
| | Mineral 1.6 | 1.604 | 44 |
| | Mineral 1.7 | 1.701 | 39.2 |
| | Mineral 1.8 | 1.802 | 34.4 |
| | Mineral 1.9 | 1.885 | 30 |

*Based on sodium D line

The opposite face of the semifinished spectacle lens from the optically ready-processed face may, before or after the coating of the optically ready-processed face of the semifinished spectacle lens, typically be converted by mechanical processing, for example machining and/or grinding and/or turning and/or polishing, into the second optically ready-processed face. This mechanical processing typically precedes the coating of the semifinished spectacle lens.

The substrate to be coated is typically a finished spectacle lens.

The substrate to be coated may not have an optical correction effect. Alternatively, the substrate to be coated may be endowed with an optical correction effect and/or an aberration correction for the viewing eye. Optical correction effect is understood to mean spherical correction, astigmatic correction and correction of the axis position and optionally correction by a prism with a base setting. This optical correction effect is conventionally implemented for distance viewing or close viewing in monofocal spectacle lenses. In the case of multifocal spectacle lenses, bifocal spectacle lenses, trifocal spectacle lenses, varifocal spectacle lenses or degressive spectacle lenses, the optical correction effect for distance vision and/or for close vision may in each case include a spherical correction, an astigmatic correction, a correction of the axis position and optionally a correction by a prism with a base setting. Aberration correction for the viewing eye, regardless of whether the aberration correction is for close vision or distance vision, is typically calculated analogously to Werner Koppen "Konzeption and Entwicklung von Gleitsichtgläsern" [Design and Development of Varifocal Lenses], Deutsche Optiker Zeitschrift DOZ, October 1995, pages 42-45. For this purpose, the surface properties of at least one substrate surface, in an optimization process, are varied by iteration until a desired image aberration distribution for the viewing eye has been attained within a defined tolerance, i.e., until the merit function has gone below a defined value.

The substrate to be coated can be produced either by means of primary forming and subsequent mechanical processing, for example machining and/or grinding and/or turning and/or polishing, or, in the case of substrates based on at least one polymeric material, by means of an additive manufacturing method. In the production of the substrate to be coated, based on at least one polymeric material, by means of additive manufacturing methods, the substrate may have a uniform refractive index or a location-dependent refractive index distribution. The location-dependent refractive index distribution is typically calculated and optimized beforehand by means of optical calculation programs, for example ZEMAX (from Zemax LLC). For the calculation, the position of the substrate to be coated in front of the eye intended, the pupillary distance, the pantoscopic tilt of the substrate to be coated, the face form angle of the substrate to be coated and the substrate size must typically be known. Furthermore, the calculation of multifocal spectacle lenses, bifocal spectacle lenses, trifocal spectacle lenses, varifocal spectacle lenses and degressive spectacle lenses is based in particular on an object distance model which describes the position of object points in the spectacle wearer's field of view relative to the centers of rotation of the wearer's eyes. A varifocal spectacle lens having a location-dependent refractive index distribution is disclosed, for example, in EP 3352001 A1.

If the substrate to be coated comprises both at least one polymeric material and at least one mineral glass, the mineral glass typically takes the form of an ultrathin lens, and the polymeric material typically takes the form of a semifinished spectacle lens product or of a finished spectacle lens or of at least one polymer film. Ultrathin lenses are described in detail hereinafter in section "II.2. Coating comprising at least one photochromic layer, at least one chemically modified primer coat layer and at least one barrier layer comprising at least one ultrathin lens on the same surface of the substrate", called "II.2. Barrier layer comprising at least one ultrathin lens" hereinafter.

If, in this exemplary embodiment, the substrate to be coated comprises at least one ultrathin lens as mineral glass and at least one polymer film as polymeric material, the at least one polymer film is typically disposed between at least two ultrathin lenses. The at least one polymer film is typically based on polyethylene, polypropylene, polyethylene terephthalate, polycarbonate, polymethylmethacrylate, polyvinyl chloride, polyvinyl acetate, polyvinyl butyrate and/or mixtures thereof. The at least one polymer film may have been stabilized with cellulose triacetate, for example. The at least one polymer film may be colored or uncolored. If the substrate to be coated that comprises at least a polymer film and at least an ultrathin lens is to be colored, the at least one polymer film is typically colored. The at least one polymer film typically has an average thickness from a range from 9 µm to 205 µm, more typically from a range from 14 µm to 103 µm.

If, in this exemplary embodiment, the substrate to be coated comprises at least one ultrathin lens as mineral glass and at least one finished spectacle lens as polymeric material, at least one ultrathin lens may be on the front face and/or on the reverse face of the finished spectacle lens. Typically, there is at least one ultrathin lens both on the front face and on the reverse face of the finished spectacle lens.

If, in this exemplary embodiment, the substrate to be coated comprises at least one ultrathin lens as mineral glass and at least one semifinished spectacle lens product as polymeric material, preference is given to first processing the optically unfinished face and then bonding the front face and/or the reverse face of the finished spectacle lens thus obtained to at least one ultrathin lens. Alternatively, in the case of use of a semifinished spectacle lens product as polymeric material, the at least one ultrathin lens is bonded to the already optically finished face, the optically unfinished face is processed, and then this processed face is optionally bonded to at least one further ultrathin lens. Bonding to at least one further ultrathin lens is preferred here. Typically, the optically finished face of the semifinished spectacle lens product is the front face thereof, and the optically unfinished face is the reverse face thereof. As an alternative to the conversion of the optically unfinished face into a second optically finished face and the bonding thereof to at least one ultrathin lens, this second face, after conversion into a second optically finished face, may be provided with at least one coating. This coating is typically selected from the group consisting of at least one hardcoat layer, at least one antireflection layer, at least one antifog layer, at least one electrically conductive or electrically semiconductive layer, and at least one cleancoat layer. Particular preference is given to at least one hardcoat layer, at least one antireflection layer and at least one cleancoat layer as coating, in which case the at least one hardcoat layer is the layer closest to the substrate and the at least one cleancoat layer is the layer furthest removed from the substrate.

The at least one ultrathin lens bonded to the front face of the finished spectacle lens may be identical or different, for example in respect of glass composition, average thickness and/or shape, to the at least one ultrathin lens bonded to the reverse face of the finished spectacle lens. The same also applies in the case of use of at least one semifinished spectacle lens product or at least one polymer film as polymeric material. In the case of use of the semifinished spectacle lens product, the optically unfinished face, prior to the bonding to at least one ultrathin lens, is converted to an optically finished face.

The bonding of the at least one ultrathin lens to the optically finished face, typically the front face, of the semifinished spectacle lens product, or to one of the finished optical faces, typically the front face, of the finished spectacle lens is typically cohesive and form-fitting. Typically, the reverse face of the at least one ultrathin lens is bonded to the optically finished front face of the semifinished spectacle lens product or of the finished spectacle lens. The reverse face of the at least one ultrathin lens and/or the optically finished front face of the semifinished spectacle lens product or of the finished spectacle lens may be provided with at least one coating. This at least one coating may comprise at least one coloring layer, at least one photochromic layer and/or at least one polarizing layer. The at least one coloring layer typically comprises a colorable layer according to U.S. Pat. No. 4,355,135 A, especially according to claim 1 of U.S. Pat. No. 4,355,135 A, according to U.S. Pat. No. 4,294,950 A, especially according to either of claims 1 and 6 of U.S. Pat. No. 4,294,950 A, or according to U.S. Pat. No. 4,211,823 A, especially according to either of claim 1 or 2 of U.S. Pat. No. 4,211,823 A. More typically, the coloring layer comprises a colorable layer according to U.S. Pat. No. 4,355,135 A, especially typically according to claim 1 of U.S. Pat. No. 4,355,135 A. The at least one photochromic layer typically comprises a layer according to US 2006/0269741 A1, especially according to US 2006/0269741 A1, claim 6, or a layer according to US 2004/0220292 A1, especially according to US 2004/0220292 A1, claim 1. The at least one photochromic layer typically has an average thickness from a range from 5 µm to 200 µm, further typically from a range from 9 µm to 166 µm, more typically from a range from 17 µm to 121 µm and most typically from a range from 21 µm to 81 µm. The at least one polarizing layer typically comprises either a polarization film or a layer having polarizing properties. The polarization film used may be a film of polyvinyl alcohol or polyethylene terephthalate, for example, comprising dichroic colorants. The polarization film may have a monolayer or multilayer film structure. The polarization film may have been preformed to accurately fit the reverse face of the at least one ultrathin lens. Typically, the polarization film is preformed with application of reduced pressure with the aid of a metal mold. A layer having polarizing properties is disclosed, for example, in EP 1 965 235 A1, EP 0 217 502 A1, EP 1 674 898 A1, US 2006/0066947 A1, WO 2005/050265 A1, WO 2009/029198 A1, WO 2009/156784 A1 or WO 2015/160612 A1. In the aforementioned applications, the layer having polarizing properties is in each case a constituent of a layer sequence described therein. In the context of this disclosure, typically only the layer having polarizing properties which is described in the applications cited is used as polarizing layer.

There is typically only a single layer selected from at least one coloring layer, at least one photochromic layer and at least one polarizing layer between the reverse face of the at least one ultrathin lens and the optically finished front face of the semifinished spectacle lens product or of the finished spectacle lens. If there are multiple layers between the reverse face of the at least one ultrathin lens and the optically finished front face of the semifinished spectacle lens product or of the finished spectacle lens, these are typically in the following preferred sequences from the eye side to the object side:

ultrathin lens/photochromic layer/polarizing layer/coloring layer/semifinished spectacle lens product or finished spectacle lens or ultrathin lens/photochromic layer/coloring layer/polarizing layer/semifinished spectacle lens product or finished spectacle lens or ultrathin lens/polarizing layer/coloring layer/semifinished spectacle lens product or finished spectacle lens.

If at least one polymer film is used as polymeric material, the above-described at least one coloring layer, at least one photochromic layer and/or at least one polarizing layer is/are typically applied to the reverse face of the ultrathin lens. If the reverse face of the ultrathin lens comprises two or more of these layers, the sequence thereof between ultrathin lens and the at least one polymer film corresponds to the above-described sequence between ultrathin lens and semifinished spectacle lens product or finished spectacle lens.

Particularly typically, there is no layer between the reverse face of the at least one ultrathin lens and the optically finished front face of the semifinished spectacle lens product or of the finished spectacle lens.

The optional, preferred bonding of the second, finished optical face of the semifinished spectacle lens or of the finished spectacle lens to at least one further ultrathin lens is typically likewise cohesive and form-fitting. Typically, the optically finished reverse face of the semifinished spectacle lens or of the finished spectacle lens is bonded here to the front face of the at least one ultrathin lens. The optically finished reverse face of the semifinished spectacle lens product or of the finished spectacle lens and/or the front face of the at least one ultrathin lens may have been provided with at least one coating. This at least one coating typically comprises a coloring layer. The coloring layer has already been defined above. Typically, the optically finished reverse face of the semifinished spectacle lens or of the finished spectacle lens and/or the front face of the at least one ultrathin lens does not comprise any coating. As alternative to the bonding of the optically finished reverse face of the semifinished spectacle lens product or the reverse face of the finished spectacle lens to at least one ultrathin lens, the respective reverse face may be provided with at least one coating. This coating is typically selected from the group consisting of at least one hardcoat layer, at least one antireflection layer, at least one antifog layer, at least one electrically conductive or electrically semiconductive layer, and at least one cleancoat layer. More typically, the coating comprises at least one hardcoat layer, at least one antireflection layer and at least one cleancoat layer, in which case the at least one hardcoat layer is the layer closest to the substrate to be coated and the at least one cleancoat layer is the layer furthest removed from the substrate to be coated.

The front face and/or the reverse face of the at least one ultrathin lens can each be coated by means of a PVD method and/or a spin-coating method. The subsequent curing of the coating obtained by the spin-coating method can be effected either thermally or by radiation curing. Typically, this coating is cured by radiation curing.

The bonding of the respective optically finished face of the semifinished spectacle lens product or of the at least one finished optical face of the finished spectacle lens or of the at least one polymer film to the at least one ultrathin lens in each case is typically effected by an adhesive. The adhesive may serve here, for example, as primer or compensation material for the different thermal expansion of the individual components. In addition, via the selection of the adhesive, matching of any difference in refractive index $\Delta nD$ that exists between the individual components can be achieved. What is typically effected here is not just the matching of the refractive index nD but also the matching of the Abbe number, such that the change in the refractive index of the individual components is the same across the visible spectrum. Usable adhesives are described, for example, in DE 10 2012 210 185 A1, WO 2009/056196 A1 or WO 2015/121341 A1. Typically, the individual components are bonded to one another by means of an adhesive based on an amine-catalyzed thiol hardening of epoxy resins analogously to WO 2015/121341 A1, especially analogously to claim 1 of WO 2015/121341 A1, at a temperature from a range from 20° C. to 80° C., typically from a range from 40° C. to 70° C. and more typically from a range from 45° C. to 65° C.

There may be at least one layer between the surface of the at least one ultrathin lens facing the finished optical face of the semifinished spectacle lens or of the finished spectacle lens and the finished optical face. This at least one layer typically has the same surface topography as the respective layer beneath to which this at least one layer has been applied. Slight differences in the surface topography of the two surfaces to be joined to one another can be filled, for example, by means of an adhesive. For form-fitting bonding of the respective surfaces, it is preferable that the radii of curvature of the respective components to be bonded to one another should typically differ by less than 1 mm, further typically within a range from 0.03 mm to ≤0.8 mm, more typically within a range from 0.04 mm to ≤0.7 mm and most typically within a range from 0.05 mm to ≤0.6 mm.

The at least one ultrathin lens and the semifinished spectacle lens product or the finished spectacle lens, before being joined by means of an adhesive, typically have the same diameter and the same radius of curvature. Typically, the at least one polymer film has a diameter sufficiently great that the at least one polymer film completely covers the front face of the eye-side ultrathin lens and the reverse face of the object-side ultrathin lens. Any excess polymer film is typically cut off. If the at least one polymer film already has the same radius of curvature as the ultrathin lens to be bonded thereto, the at least one polymer film typically has the same diameter as the ultrathin lens.

The substrate to be coated may comprise at least one photochromic layer both on the front face, i.e., the face on the object size, which, according to DIN EN ISO 13666: 2013-10, paragraph 5.8, is intended to lie remote from the eye in the spectacles, and on the reverse face, i.e., the face on the eye side, which, according to DIN EN ISO 13666: 2013-10, paragraph 5.9, is intended to lie facing the eye in the spectacles. Typically, the substrate to be coated comprises at least one photochromic layer solely on the front face. This at least one photochromic layer is disposed on at least one surface of the substrate to be coated and should not be confused with the at least one photochromic layer disposed between the optically finished face of a semifinished spectacle lens product or a finished spectacle lens and at least one ultrathin lens.

The at least one photochromic layer typically comprises a layer according to US 2006/0269741 A1, especially according to US 2006/0269741 A1, claim 6, or a layer according to US 2004/0220292 A1, especially according to US 2004/0220292 A1, claim 1, or a layer according to EP 1 561 571 A1, especially according to EP 1 561 571 A1, claim 1, or a photochromic layer according to WO 03/058300 A1, page 10 line 23 to page 21 line 18. More typically, the at least one photochromic layer comprises a layer according to US 2006/0269741 A1, especially according to US 2006/0269741 A1, claim 6, or a layer according to US 2004/0220292 A1, especially according to US 2004/0220292 A1, claim 1. US 2006/0269741 A1, claim 6, claims a coated product comprising, in the layer sequence, a polyurethane resin layer and a resin layer containing a photochromic compound on a substrate. US 2004/0220292 A1, claim 1, claims a curable composition comprising 100 parts by weight of a free-radically polymerizable monomer, 0.01 to 20 parts by weight of an amine compound and 0.1 to 20 parts by weight of a photochromic compound. The free-radically polymerizable monomer here includes a free-radically polymerizable monomer comprising a silanol group or comprising a group that forms a silanol group after hydrolysis, and/or a free-radically polymerizable monomer comprising an isocyanate group. The at least one photochromic layer typically has an average thickness from a range from 5 μm to 200 μm, further typically from a range from 9 μm to 166 μm, more typically from a range from 15 μm to 121 μm and most typically from a range from 18 μm to 87 μm.

There may be at least one primer layer between the substrate to be coated and the at least one photochromic layer, typically facing the substrate and directly adjoining the at least one photochromic layer. The at least one primer layer used may be the polyurethane resin layer disclosed in EP 1 602 479 A1, especially in EP 1 602 479 A1, claim 1, or the primer layer disclosed in WO 03/058300 A1, especially in WO 03/058300 A1, page 22 line 3 to page 23 line 13. The at least one primer layer used is typically the polyurethane resin layer disclosed in EP 1 602 479 A1, especially in EP 1 602 479 A1, claim 1. EP 1 602 479 A1, claim 1, claims a product comprising a polyurethane layer on at least one surface of the substrate in the layer sequence. This polyurethane resin layer comprises a cured product of a moisture-curing polyurethane resin and/or a precursor thereof.

For all the exemplary embodiments detailed hereinafter, the at least one photochromic layer used is typically one of the aforementioned photochromic layers, and optionally one of the aforementioned primer layers.

Damage in the course of everyday use of the spectacles, which may be manifested, for example, in microscratches on the coating and/or in the coating of a spectacle lens and/or on a surface of the substrate and/or in the substrate of the spectacle lens, through contact, for example, with moisture, impurities, fatty acids present in perspiration or skin fats or pH acidic components, can result in swelling or in curling or in arching of the coating and/or of the substrate. pH-acidic components may be present in foods, for example. Microscratches that generally penetrate to a depth of around 300 nm to around 5000 nm and/or to a breadth of around 1 μm to around 150 μm into a surface of the spectacle lens, i.e., into the coating and/or the substrate of the spectacle lens, can be enlarged by contamination within the coating, which is unavoidable in everyday use of the spectacles, in substrate direction and/or within at least one layer of the coating and/or in the substrate. In spectacle lenses having at least one photochromic layer, especially through contact of the at least one photochromic layer with pH-acidic components in particular, there can be irreversible swelling, especially of the at least one photochromic layer. Swelling of the at least one photochromic layer generally also causes lifting or curling or arching of that at least one layer disposed on the same surface as the at least one photochromic layer and is remote from the substrate in the layer sequence of the spectacle lens in relation to the at least one photochromic layer. Even in respect of the aforementioned case, reference is made hereinafter solely to "swelling of the at least one photochromic layer" or generally to "swelling of the coating". If "swelling of the substrate" is referred to in the context of this disclosure, this swelling generally also results in and comprises lifting or curling or arching of the at least one layer adjoining the surface of the substrate.

A spectacle lens in which the at least one photochromic layer has at least one swelling in at least one place acts like a microlens on viewing through it at exactly that place. Since microscratches on and/or in the coating of a spectacle lens are unavoidable in the course of use of the spectacles, there will generally be swelling of the at least one photochromic layer in more than one single place on contact of the at least one spectacle lens comprising a photochromic layer with at least one pH-acidic component. On viewing through the spectacle lens, each of these places acts like a microlens, which can be perceived as troublesome by a spectacle wearer.

In order to suppress and/or prevent the swelling of the at least one photochromic layer of a spectacle lens, according to the disclosure, either at least one barrier layer and/or at least one chemically modified layer is applied on the same surface in each case that also comprises the at least one photochromic layer. The at least one barrier layer and/or the at least one chemically modified layer, in relation to the at least one photochromic layer, is present on the side further remote from the substrate. If only the coating of the front face of the substrate comprises at least one photochromic layer, the at least one barrier layer and/or the at least one chemically modified layer is further to the object side. If, additionally or alternatively, the coating of the reverse face of the substrate comprises at least one photochromic layer, the at least one barrier layer and/or the at least one chemically modified layer on the reverse face is further to the eye side. The at least one barrier layer and/or the at least one chemically modified layer may directly adjoin the at least one photochromic layer on the respective side remote from the substrate. There may alternatively be at least one further layer between the at least one photochromic layer and the at least one barrier layer or between the at least one photochromic layer and the at least one chemically modified layer. Furthermore, it is not necessary, or not only necessary, for the layer directly adjoining the at least one photochromic layer to have been chemically modified; instead, it is alternatively or additionally possible for at least one layer of the coating further remote from the substrate to have been chemically modified. What is meant by "chemically modified" in this context is that the at least one chemically modified layer displays a pH-buffering effect. The at least one chemically modified layer and/or the at least one barrier layer typically prevent(s) moisture, impurities, fatty acids present in perspiration or skin fats or pH acidic components from coming into contact with the at least one photochromic layer. Typically, the at least one chemically modified layer is a chemical barrier that prevents pH-acidic components in particular from coming into contact with the at least one photochromic layer. Typically, the at least one barrier layer is a barrier that prevents pH-acidic components in particular from coming into contact with the at least one photochromic layer. In one exemplary embodiment, the at least one barrier layer, in addition to its actual function, fulfills the function of a sacrificial layer. In this connection, "sacrificial layer" does not mean that this layer is degraded, but means that this layer merely prevents the at least one photochromic layer present on the same surface of the substrate from coming into contact with moisture, impurities, fatty acids present in perspiration or skin fats, or pH-acidic components. For example, a hardcoat layer can determine the scratch resistance, chemical resistance and/or hardness of the spectacle lens and, at the same time, the same hardcoat layer can assume the function of a sacrificial layer. In a further exemplary embodiment, the at least one barrier layer in the layer sequence is not required on account of its actual function, but typically merely fulfills the function of a sacrificial layer in this layer sequence. If, for example, a layer sequence, as well as the at least one photochromic layer, comprises two hardcoat layers on the same surface of the substrate, one of the hardcoat layers may fulfill the actual function of a hardcoat layer and the other hardcoat layer the function of a sacrificial layer. In the latter case, the hardcoat layer is required in its function as sacrificial layer and not in its function as hardcoat layer. If the layer in its actual function and the further layer in its function as sacrificial layer are the same type of layer, for example a hardcoat layer, the two layers may have identical or different composition and/or identical or different layer thickness. Typically, given the same layer type, the respective layer in its actual function and the respective further layer in its function as sacrificial layer have both different layer thickness and different composition. More typically, the respective layer in its function as sacrificial layer has a higher average layer thickness than the respective layer in its actual function; in other words, a hardcoat layer used as sacrificial layer, for example, has a higher average thickness than the further hardcoat layer disposed on the same surface of the substrate to be coated. Further typically, the respective layer in its function as sacrificial layer is disposed closer to the substrate than the further respective layer in its actual function.

The spectacle lens comprising at least one photochromic layer, at least one barrier layer and/or at least one chemically modified layer, in the event of at least one instance of damage to the surface of the spectacle lens comprising at least one photochromic layer with a force of typically ≤65 mN, further typically with a force from a range from 0 mN to 63 mN, further typically with a force from a range from 9 mN to 61 mN, more typically with a force from a range from 13 mN to 59 mN and most typically with a force from a range from 17 mN to 56 mN, after contamination of the surface of the spectacle lens comprising at least one photochromic layer with at least one organic acid over a period from a range from typically 12 hours to 84 hours, further typically from a range from 24 hours to 72 hours, more typically from a range from 48 hours to 71 hours and most typically from a range from 60 hours to 70 hours, does not have a swelling of the coating and/or the substrate. The surface of the spectacle lens comprising at least one photochromic layer here is that surface of the coating comprising at least one photochromic layer in the layer sequence. What is meant by "damage" is that the coating of the surface of the spectacle lens comprising the at least one photochromic layer is partly removed, typically by a scratching mechanism of damage. The coating is removed from a first part of the surface and remains on a second part of the surface. The first and second parts of the surface here are on the same surface of the spectacle lens comprising the at least one photochromic layer. The extension of the first part of the surface in a first direction is here delimited by the coating remaining on the second part of the surface. The part of the surface may be either an outermost surface of the spectacle lens or, after removal of the outermost surface or after removal of the outermost surface and at least one layer further to the inside, may also be a layer of the coating of the spectacle lens that has not yet been removed. "Damage" is further understood to mean the complete removal of the coating down to or into the substrate, in which case the coating is typically also removed from a first part of the surface only and remains on a second part of the surface. In other words, even in the case of complete removal of the coating down to or into the substrate in normal direction to the substrate surface, part of the coating typically remains. The damage to the coating and/or the substrate fulfills the function of enabling complete or facilitated passage of the at least one organic acid to one of the layers of the coating or to the substrate. In this way, the mode of action of the at least one chemically modified layer and/or of the at least one barrier layer can be described in an objective and reproducible manner.

What is meant by no swelling of the coating and/or substrate is that there is visually no occurrence of any microlens effect on viewing through the spectacle lens after the above-described contamination. "No swelling" is further and typically understood to mean that, after the above-described contamination, with the aid of an optical profilometer based on white light interferometry, over the extent of the damage on and/or within the coating of the spectacle lens, no structures of typically <500 nm in z direction, further typically from a range from 0 nm to 376 nm in z direction, further typically from a range from 1 nm to 213 nm in z direction, further typically from a range from 1 nm to 166 nm in z direction, more typically from a range from 2 nm to 99 nm in z direction and most typically from a range from 2 nm to 68 nm in z direction are apparent on the surface of the spectacle lens comprising at least one photochromic layer. If structures of 500 nm in z direction are apparent on the surface of the spectacle lens comprising at least one photochromic layer with the aid of an optical profilometer based on white light interferometry, this is referred to in the context of this disclosure as swelling or arching or curling of the coating and/or substrate. The optical profilometer used is typically the NewView 7100 optical profilometer from AMETEK Germany GmbH. z direction is understood to mean the normal to the spectacle lens surface. Contamination of the spectacle lens is understood to mean that the surface of the spectacle lens comprising at least one photochromic layer, especially the surface of the spectacle lens comprising at least one instance of damage to the at least one photochromic layer, is completely immersed into at least one organic acid. The respective surface of the spectacle lens is immersed into at least one organic acid under defined conditions, typically in a closed vessel at room temperature, and stored over the period of time specified above. Room temperature is understood to mean a temperature of 22° C.±2° C. Before examining the swelling, the contamination of the surface of the spectacle lens comprising the at least one photochromic layer is removed and the spectacle lens is dried. The contamination can be washed off, for example, with a lower alcohol, such as ethanol or 2-propanol, and/or demineralized water. Typically, any structures formed are ascertained only after the above-described contamination and classified into swelling or no swelling according to the details described above. Prior to contamination, the spectacle lens to be examined is typically assessed only visually with regard to any microlens effects present on viewing through it. Spectacle lenses that already have microlens effects prior to contamination have irreversible swelling and were not subjected to any further contamination. Alternatively, the surface of a spectacle lens comprising at least one photochromic layer that visually does not have any microlens effect on viewing through it can be examined with the aid of an optical profilometer based on white light interferometry before and after contamination with at least one organic acid, and the difference in the structures in z direction ascertained. A difference in the structures in z direction of ≤100 nm is regarded as no swelling. A difference in the structures in z direction of >100 nm is regarded as swelling.

The at least one organic acid used is typically at least one liquid organic aliphatic saturated or unsaturated, optionally substituted, monocarboxylic acid, more typically at least one liquid organic aliphatic saturated or unsaturated monocarboxylic acid having 2 to 22 carbon atoms, typically having 3 to 18 carbon atoms. For example, the at least one organic acid may be selected from the group consisting of acetic acid, propionic acid, acrylic acid, lactic acid, butyric acid, isobutyric acid, valeric acid, enanthic acid, caproic acid, caprylic acid, pelargonic acid, myristoleic acid, palmitoleic acid, linoleic acid, alpha-linolenic acid, gamma-linolenic acid, oleic acid, ricinoleic acid, stearidonic acid, arachidonic acid, eicosapentaenoic acid, docosapentaenoic acid and docosahexaenoic acid. The at least one organic acid is typically selected from the group consisting of acetic acid, lactic acid, butyric acid, caproic acid, caprylic acid, pelargonic acid, linoleic acid, alpha-linolenic acid, gamma-linolenic acid and oleic acid. The at least one organic acid used is more typically lactic acid, caprylic acid and/or oleic acid.

The damage to the spectacle lens on the surface of the substrate comprising at least one photochromic layer is caused by a scoring tool, typically a diamond scoring tool, further typically with a diamond scoring tool having a conical tip, further typically with a diamond scoring tool having a conical tip having a radius of 2 µm, more typically with a diamond scoring tool having a conical tip having a radius of 2 µm±0.2 µm and a cone of 90°±1.5°, which is typically moved in a first direction so as to remove material, i.e., to remove coating and/or substrate. This damage to the spectacle lens is typically discernible to the naked eye. The damage to the spectacle lens on the surface of the substrate comprising at least one photochromic layer is typically caused by a force from a range from typically 2 mN to 100 mN, typically with the aid of an ultra-nanohardness measuring device. The ultra-nanohardness measuring device used is typically the UNHT$^3$ ultra-nanohardness measuring device from Anton-Paar GmbH. The damage is typically caused by at least one instance of linear or strip-shaped damage to the surface of the spectacle lens comprising at least one photochromic layer with a force from a range from typically 2 mN to 100 mN. This at least one instance of damage is typically a continuous line, typically made with constant force, typically having a length from a range from 0.05 mm to 0.4 mm, more typically from a range from 0.09 mm to 0.36 mm and most typically from a range from 0.1 mm to 0.3 mm. The length of this line is typically at least ten times, typically at least one hundred times, more typically between ten and one hundred times, its width. The spectacle lens may have more than one instance of damage on the surface comprising at least one photochromic layer, in which case multiple instances of damage may each have been caused by the same force or each by a different force. Multiple instances of damage, irrespective of whether they have been caused with the same or different forces, are typically located separately from one another. The multiple instances of damage may be arranged in a row, in the form of a matrix or in random distribution on the at least one surface of the spectacle lens comprising at least one photochromic layer. Typically, multiple instances of damage with different force are arranged separately from one another in the form of a matrix on the surface of the spectacle lens comprising at least one photochromic layer. In order to determine that force which causes damage to the surface of the spectacle lens comprising at least one photochromic layer which then causes at least one instance of swelling, typically multiple instances of damage that are separated from one another and have been caused by different force are utilized. The multiple instances of damage separated from one another may have been caused by a force from the preferred range from 2 mN to 100 mN, for example by a force of 4 mN, 10 mN, 14 mN, 20 mN, 30 mN, 40 mN, 50 mN, 60 mN, 70 mN, 80 mN, 90 mN and/or 100 mN. The assessment of the damage with respect to the maximum force exerted that results in no damage or the minimum force exerted that results in at least one instance of damage on the surface of the spectacle lens comprising at least one photochromic coating, causing swelling of the coating and/or the substrate, as already set out above, is made visually or typically with the aid of an optical profilometer.

The damage to the surface of the spectacle lens comprising at least one photochromic layer which is caused by a particular force corresponds to a particular penetration depth of the damage into the coating and/or into the substrate of the spectacle lens. The penetration depth here depends upon factors including the layer present on the respective surface of the spectacle lens, the average thickness of this layer and/or the hardness of this layer. The damage may penetrate into the coating and/or into the substrate by, for example, from <1 µm to 15 µm, the aforementioned penetration depth being the difference between undamaged surface and undamaged layer or undamaged substrate.

The swelling of that coating of which the layer sequence comprises at least one photochromic layer and/or of the substrate surface with a coating comprising at least one photochromic layer is typically reduced and very typically prevented by at least one chemically modified layer and/or by at least one barrier layer. The examination and assessment of the swelling of the coating and/or the substrate is effected as described above, regardless of whether the coating of the same surface comprises at least one photochromic layer and at least one chemically modified layer or at least one photochromic layer and a barrier layer or at least one photochromic layer and at least one chemically modified layer and at least one barrier layer.

The coating composition for use with preference for production of the at least one chemically modified layer typically comprises at least one base. The at least one base typically comprises at least one heterocyclic nitrogen compound, at least one primary amine, at least one secondary amine, at least one tertiary amine and/or at least one metal hydroxide. The coating composition for use with preference for production of the at least one chemically modified layer comprises the at least one base typically in a proportion from a range from 0.01% by weight to 11.8% by weight, further typically from a range from 0.09% by weight to 9.4% by weight, further typically from a range from 0.1% by weight to 7.6% by weight, more typically from a range from 0.3% by weight to 6.2% by weight and most typically from a range from 0.4% by weight to 5.3% by weight, based in each case on the total weight of the coating composition.

There follows a description of possible preferred coatings comprising

I. at least one photochromic layer and at least one chemically modified layer or
II. at least one photochromic layer and at least one chemically modified layer and at least one barrier layer or
III. at least one photochromic layer and at least one barrier layer or
IV. at least one photochromic layer and at least one chemically modified layer that acts as barrier layer, each on the same surface of the substrate.

I. Coating Comprising at Least One Photochromic Layer and at Least One Chemically Modified Layer on the Same Surface of the Substrate There follows a further elucidation of the chemical modification of at least one layer which is present on the same surface as the at least one photochromic layer and further removed from the substrate in a layer sequence in relation to the at least one photochromic layer. If the front face of the substrate here comprises at least one photochromic layer, the at least one chemically modified layer is further to the object side in the layer sequence in relation to the photochromic layer. If the reverse face of the substrate here comprises at least one photochromic layer, the at least one chemically modified layer is further to the eye side in the layer sequence in relation to the photochromic layer. Both the front face of the substrate and the reverse face of the substrate may comprise at least one photochromic layer and at least one chemically modified layer. Typically only the front face of the substrate comprises at least one photochromic layer and at least one chemically modified layer.

In one exemplary embodiment of the disclosure, at least one surface of the substrate to be coated comprises at least one photochromic layer, at least one chemically modified primer coat layer and at least one hardcoat layer on the same surface. The at least one hardcoat layer in the aforementioned layer sequence is typically that layer furthest removed from the substrate. The following may optionally be applied to the at least one hardcoat layer: at least one antireflection layer, at least one electrically conductive or semiconductive layer, at least one antifog layer and/or at least one cleancoat layer. The at least one electrically conductive or semiconductive layer may be part of the at least one antireflection layer. If just one of the surfaces of the substrate comprises a photochromic layer and the opposite surface does not comprise any photochromic layer, this opposite surface may comprise at least one hardcoat layer, at least one antireflection layer, at least one electrically conductive or semiconductive layer which is optionally part of the at least one antireflection layer, at least one coloring layer, at least one polarizing layer, at least one antifog layer and/or at least one cleancoat layer. Typically, the opposite surface comprises at least one hardcoat layer, more typically at least one hardcoat layer and at least one antireflection layer, and most typically at least one hardcoat layer, at least one antireflection layer and at least one cleancoat layer. The antireflection layer here, or at least one cleancoat layer if present, is the layer furthest removed from the substrate. Alternatively, the opposite surface may comprise an ultrathin lens, typically at least one ultrathin lens and at least one antireflection layer, in which case the at least one antireflection layer is remote from the substrate in relation to the at least one ultrathin lens. Further alternatively, the opposite surface may comprise at least one ultrathin lens, at least one antireflection layer and at least one cleancoat layer, in which case the at least one antireflection layer and the at least one cleancoat layer are remote from the substrate in relation to the at least one ultrathin lens, and the at least one cleancoat layer is a layer furthest removed from the substrate. Ultrathin lenses are described in detail hereinafter in section "II.2. Coating comprising at least one photochromic layer, at least one chemically modified primer coat layer and at least one barrier layer comprising at least one ultrathin lens on the same surface of the substrate", called "II.2. Barrier layer comprising at least one ultrathin lens" hereinafter. Optionally, the opposite surface may comprise at least one coloring layer between the surface and the at least one ultrathin lens.

Typically, in this exemplary embodiment, the front face of the substrate comprises at least one photochromic layer, at least one chemically modified primer coat layer and at least one hardcoat layer. The coating on the front face of the substrate in that case comprises, proceeding from the front face of the substrate, typically at least one photochromic layer, at least one chemically modified primer coat layer and at least one hardcoat layer. The at least one hardcoat layer in the aforementioned sequence is the outermost layer furthest to the object side, to which at least one further layer is optionally applied, for example at least one antireflection layer, at least one electrically conductive or semiconductive layer, at least one antifog layer and/or at least one cleancoat layer. In addition, the front face of the substrate may comprise at least one coloring layer and/or at least one polarizing layer. Alternatively, the substrate itself may have been colored and/or comprise a polarizing film. The at least one coloring layer optionally present or the at least one polarizing layer optionally present is closer to the front face of the substrate in relation to the at least one photochromic layer. If the front face of the substrate, as well as at least one photochromic layer, at least one chemically modified primer coat layer and at least one hardcoat layer, comprises both at least one coloring layer and at least one polarizing layer, it is possible for either the at least one coloring layer or the at least one polarizing layer to be the layer closest to the front face of the substrate. The at least one coloring layer is typically the layer closest to the front face of the substrate. As an alternative to the application of a coloring layer, the substrate may be colored.

In this exemplary embodiment, the at least one photochromic layer may be one of the abovementioned layers. In addition, this surface of the substrate may comprise at least one of the primer layers mentioned above in connection with the at least one photochromic layer, typically directly adjacent to the at least one photochromic layer. The at least one primer layer is typically the layer closer to the surface of the substrate in each case in relation to the at least one photochromic layer.

The at least one chemically modified primer coat layer has an adhesion-promoting effect on various substrates or on various coatings present on the substrate. The bond strength of the at least one chemically modified primer coat layer is typically ascertained by means of a crosscut test using a substrate coated with at least one photochromic layer, at least one chemically modified primer coat layer and at least one hardcoat layer on the same surface, in that cuts extending down to this surface of the substrate are made at right angles to one another, so as to form a grid. An adhesive tape, typically Scotch 600 adhesive tape from 3M Company, is applied to this grid and pulled off. The area pulled off is ascertained as a percentage by microscope or visually by the naked eye. The level of adhesion is typically assessed visually by the naked eye. More typically, the level of adhesion is assessed using the catalog "Qualitätskontrolle für Lacke and Rohstoffe" [Quality Control for Paints and Raw Materials], 2016, page 156, from Byk-Gardner GmbH.

The at least one chemically modified primer coat layer is typically an impact-modified and adhesion-promoting thermoplastic or elastomeric coating. Impact resistance is typically ascertained using a coated substrate, wherein the coating of the substrate on the same surface comprises at least one photochromic layer, at least one chemically modified primer coat layer, at least one hardcoat layer and at least one antireflection layer. Impact resistance is typically ascertained to FDA, Code of Federal Regulations, Title 21, Volume 8, Sec. 801.410 (21CFR801.410).

The at least one chemically modified primer coat layer is typically produced using a coating composition comprising
  i) at least one aqueous aliphatic, cycloaliphatic, aromatic or heteroaromatic polyurethane dispersion, at least one aqueous aliphatic, cycloaliphatic, aromatic or heteroaromatic polyurea dispersion, at least one aqueous aliphatic, cycloaliphatic, aromatic or heteroaromatic polyurethane-polyurea dispersion and/or at least one aqueous aliphatic, cycloaliphatic, aromatic or heteroaromatic polyester dispersion, more typically at least one aqueous aliphatic polyurethane dispersion or at least one aqueous aliphatic polyester dispersion, and most typically at least one aqueous aliphatic polyurethane dispersion,
  ii) at least one solvent,
  iii) at least one base and
  iv) optionally at least one additive.

The proportion of the at least one aqueous aliphatic, cycloaliphatic, aromatic or heteroaromatic polyurethane dispersion, the at least one aqueous aliphatic, cycloaliphatic, aromatic or heteroaromatic polyurea dispersion, the at least one aqueous aliphatic, cycloaliphatic, aromatic or heteroaromatic polyurethane-polyurea dispersion and/or the at least one aqueous aliphatic, cycloaliphatic, aromatic or heteroaromatic polyester dispersion in the coating composition usable for production of the at least one chemically modified primer coat layer typically has a total proportion from a range from 2% by weight to 31% by weight, further typically from a range from 4% by weight to 26% by weight, further typically from a range from 5% by weight to 21% by weight, more typically from a range from 6% by weight to 20% by weight and most typically from a range from 7% by weight to 19% by weight, based in each case on the total weight of the coating composition. The total proportion here includes both the proportion of only one of the dispersions listed above and a mixture of dispersions listed above.

Typically, the coating composition usable for production of the at least one chemically modified primer coat layer comprises an aqueous polyurethane dispersion, where the polyurethane typically includes a polyester unit as spacer. Aqueous polyurethane dispersions for use with preference are disclosed in WO 94/17116 A1, especially in WO 94/17116 A1, page 7 lines 11 to 33. According to WO 94/17116 A1, page 7 lines 11 to 33, an aqueous polyurethane dispersion is typically a polyurethane-polyurea, i.e., a polymer characterized by the occurrence both of urethane and urea groups in a macromolecular chain. The aqueous polyurethane dispersion may have been stabilized with an anionically stabilized acrylic emulsion, as disclosed, for example, in WO 94/17116 A1, especially in WO 94/17116 A1, page 7 lines 33 to 35.

The proportion of the at least one solvent in the coating composition usable for production of the at least one chemically modified primer coat layer is typically within a range from 69% by weight to 98% by weight, further typically within a range from 73% by weight to 96% by weight, more typically within a range from 76% by weight to 94% by weight and most typically within a range from 79% by weight to 93% by weight, based in each case on the total weight of the coating composition. The aforementioned proportions are applicable both to the use of a mixture of different solvents and to the use of a single solvent.

The coating composition usable for production of the at least one chemically modified primer coat layer typically comprises at least one organic solvent having a low boiling point of <100° C. at standard pressure and at least one organic solvent having a moderate boiling point from a range from 100° C. to 150° C. at standard pressure. Examples of organic solvents having a low boiling point that may be used include methanol, ethanol, 1-propanol, 2-propanol, tert-butanol, acetone, diethyl ether, tert-butyl methyl ether, tetrahydrofuran, chloroform, 1,2-dichloroethane, methylene chloride, cyclohexane, ethyl acetate, n-hexane, n-heptane and/or methyl ethyl ketone. Preferred organic solvents having a low boiling point are methanol, ethanol, 1-propanal and/or 2-propanol.

Examples of organic solvents having a moderate boiling point that may be used include 1-methoxy-2-propanol, 1-butanol, dibutyl ether, 1,4-dioxane, 3-methyl-1-butanol, 4-hydroxy-4-methyl-2-pentanone, methyl isobutyl ketone and/or toluene. Preferred solvents having a moderate boiling point are 1-methoxy-2-propanol and/or 4-hydroxy-4-methyl-2-pentanone.

The weight ratio of the at least one organic solvent having a low boiling point to at least one organic solvent having a moderate boiling point is typically 1:1, further typically 1:1.4, more typically 1:1.5 and most typically 1:1.7.

The coating composition usable for production of the at least one chemically modified primer coat layer may additionally comprise water as solvent as well as at least one organic solvent having a low boiling point and at least one organic solvent having a moderate boiling point. In this case, the weight ratio of the at least one organic solvent having a low boiling point to at least one organic solvent having a moderate boiling point to water is typically 2:7:1, further typically 2.5:6.5:1, further typically 3:6:1, more typically 3:5:1 and most typically 3:6:1.

The at least one chemically modified primer coat layer typically has an average thickness from a range from 300 nm to 1200 nm, further typically from a range from 340 nm to 1130 nm, further typically from a range from 390 nm to 1080 nm, more typically from a range from 440 nm to 1010 nm and most typically from a range from 470 nm to 960 nm. What is meant by average thickness is the arithmetic average of the thickness of the respective chemically modified primer coat layer measured in at least three places. The average thickness of the at least one chemically modified primer coat layer is typically determined after application and drying using a spectacle lens comprising at least one photochromic layer and at least one chemically modified primer coat layer, where the aforementioned layers are on the same surface of the substrate and the at least one chemically modified primer coat layer is the layer furthest removed from the substrate. The average thickness of the at least one chemically modified primer coat layer is typically determined by means of measurement of spectral reflectivity and/or spectral transmissivity. The average thickness of the at least one chemically modified primer coat layer is typically determined using an optical spectrometer from Filmetrics Inc., for example the optical spectrometer F20, F10-HC or F10-AR. More typically, the average thickness of the at least one chemically modified primer coat layer is determined using the F10-HC optical spectrometer (from Filmetrics Inc.). Illumination of the spectacle lens comprising at least one photochromic layer and at least one chemically modified primer coat layer using white light gives rise to interference spectra as a function of the geometric layer thickness and refractive index of the respective layer. Incidence of white light gives rise to interferences at optically transparent layers since, for particular wavelengths, the path difference is an exact multiple of the optical layer thickness. The layer thickness is typically calculated by the fast Fourier transformation (FFT) method. In the FFT method, the geometric layer thickness is calculated from the periodicity of the interference spectrum. Alternatively, the average thickness of the at least one chemically modified primer coat layer can be determined using at least one scanning electron microscope section image or at least one transmission electron microscope section image of a spectacle lens comprising at least one photochromic layer and at least one chemically modified primer coat layer. For this purpose, the thickness of the respective chemically modified primer coat layer is ascertained in at least three places and the arithmetic average is formed.

The coating composition usable for production of the at least one chemically modified primer coat layer is applied to at least one photochromic layer or to at least one further layer that is present on and different from the photochromic layer. This coating composition is typically dried by evaporation of the at least one solvent present in the coating composition. This coating composition is typically dried at a temperature from a range from 20° C. to 80° C., further typically from a range from 23° C. to 78° C., more typically from a range from 35° C. to 76° C. and most typically at 45° C. to 75° C.

The coating composition for production of the at least one chemically modified primer coat layer comprises at least one base that typically imparts a pH-buffering effect to the at least one chemically modified primer coat layer and hence slows, typically prevents, contact of pH-acidic components with a layer closer to the substrate, typically at least one photochromic layer closer to the substrate. The coating composition for production of the at least one chemically modified primer coat layer comprises the at least one base typically in a proportion from typically a range from 0.1% by weight to 3.2% by weight, further typically from a range from 0.2% by weight to 2.8% by weight, further typically from a range from 0.3% by weight to 2.4% by weight, more typically from a range from 0.4% by weight to 1.9% by weight and most typically from a range from 0.5% by weight to 1.6% by weight, based in each case on the total weight of the coating composition. The aforementioned proportions are applicable either in the case of use of a single type of base or in the case of use of a mixture of different bases.

The coating composition for production of the at least one chemically modified primer coat layer may comprise, for example, imidazole, 1-methylimidazole, 2-methylimidazole, 4-methylimidazole, 2,5-dimethylimidazole, 4-hydroxymethylimidazole, pyrazole, 1,2,3-triazole, 1,2,4-triazole, tetrazole, pentazole, pyrrole, pyrrolidine, pyridine, 4-amidopyridine, 4-methylpyridine, 4-methoxypyridine, 2,4,6-trimethylpyridine, piperidine, piperazine, triethylamine, diisopropylamine, diisobutylamine, sodium hydroxide solution and/or potassium hydroxide solution as base. The at least one chemically modified primer coat layer typically comprises at least one base selected from the group consisting of 2-methylimidazole, imidazole, 1-methylimidazole, 4-methylimidazole, 2,5-dimethylimidazole, triethylamine or sodium hydroxide solution, more typically at least one base selected from the group consisting of 2-methylimidazole, 1-methylimidazole, 4-methylimidazole and sodium hydroxide solution. Most typically, the coating composition for production of the at least one chemically modified primer coat layer comprises at least one base selected from the group consisting of 2-methylimidazole and 1-methylimidazole in a proportion from a range from 0.1% by weight to 2% by weight, typically from a range from 0.3% by weight to 1.5% by weight, based in each case on the total weight of the coating composition for production of the at least one chemically modified primer coat layer. The aforementioned proportions are applicable either to the proportion of a mixture comprising 2-methylimidazole and 1-methylimidazole or to the proportion of 2-methylimidazole or 1-methylimidazole.

The coating composition for production of the at least one chemically modified primer coat layer may optionally comprise at least one additive. The at least one additive here may be a dispersant, an antisettling agent, a wetting agent, including an anti-crater additive or a leveling additive, a biocide and/or a UV absorber. The coating composition for production of the at least one chemically modified primer coat layer comprises the at least one additive optionally present typically in a proportion from a range from 0.01% by weight to 1.7% by weight, further typically in a proportion from a range from 0.07% by weight to 1.4% by weight, more typically in a proportion from a range from 0.09% by weight to 1.1% by weight and most typically in a proportion from a range from 0.1% by weight to 0.7% by weight, based in each case on the total weight of the coating composition. The aforementioned proportions are applicable either to the use of one type of additive or to the use of a mixture of different additives.

The proportions of the individual components described above are used in such a way that they add up to 100% by weight in the coating composition to be used for the production of the at least one chemically modified primer coat layer.

The coating composition usable for production of the at least one chemically modified primer coat layer is typically applied to at least one surface of the substrate covered with at least one photochromic layer by means of dip-coating or spin-coating.

In this exemplary embodiment, the surface of the substrate comprising at least one photochromic layer typically comprises exactly one chemically modified primer coat layer. This exactly one chemically modified primer coat layer is disposed on the same surface of the substrate and remotely from the substrate in relation to the at least one photochromic layer. There may be at least one further layer present between the at least one photochromic layer and the exactly one chemically modified primer coat layer. There is typically no further layer between the at least one photochromic layer and the exactly one chemically modified primer coat layer.

In this exemplary embodiment, the surface of the substrate comprising at least one photochromic layer typically comprises at least one hardcoat layer. This at least one hardcoat layer is disposed on the same surface of the substrate and remotely from the substrate in relation to the at least one photochromic layer, typically also in relation to the at least one chemically modified primer coat layer. There may be at least one further layer present between the at least one chemically modified primer coat layer and the at least one hardcoat layer. There is typically no further layer between the at least one chemically modified primer coat layer and the at least one hardcoat layer.

For the production of the at least one hardcoat layer, preference is given to using a composition as described in EP 2 578 649 A1, especially in EP 2 578 649 A1, claim 1. More typically, the composition for the production of the at least one hardcoat layer comprises a) at least one silane derivative of the formula $R^1R^2_{3-n}Si(OR^3)_n$ where $R^1$ is an unsubstituted or substituted alkyl group, cycloalkyl group, acyl group, alkyleneacyl group, aryl group or alkylenearyl group, $R^2$ is an organic radical comprising an epoxy group, $R^3$ is an unsubstituted or substituted alkyl group, cycloalkyl group, aryl group or alkylenearyl group and n=2 or 3, and/or a hydrolysis product and/or a condensation product of the silane derivative of the formula $R^1R^2_{3-n}Si(OR^3)_n$, b) at least one colloidal inorganic oxide, hydroxide, oxide hydrate, fluoride and/or oxyfluoride, c) at least one epoxy compound having at least two epoxy groups and d) at least one catalyst system comprising at least one Lewis acid and at least one thermolatent Lewis acid-base adduct.

The above-described composition for the production of the at least one hardcoat layer comprises the at least one silane derivative of the formula $R^1R^2_{3-n}Si(OR^3)_n$ and/or a hydrolysis product and/or condensation product thereof typically in a proportion from a range from 9% by weight to 81% by weight, further typically from a range from 13% by weight to 76% by weight, more typically from a range from 19% by weight to 71% by weight and most typically from a range from 23% by weight to 66% by weight, based in each case on the total weight of the composition. The aforementioned proportions are based either on the use of one type of silane derivative of the formula $R^1R^2_{3-n}Si(OR^3)_n$ and/or a hydrolysis product thereof and/or condensation product thereof or on the use of a mixture of different silane derivatives of the formula $R^1R^2_{3-n}Si(OR^3)_n$ and/or the respective hydrolysis product thereof and/or the respective condensation product thereof. Silane derivatives used may be, for example, 3-glycidoxymethyltrimethoxysilane, 3-glycidoxypropyltrihydroxysilane, 3-glycidoxypropyldimethylhydroxysilane, 3-glycidoxypropyldimethylethoxysilane, 3-glycidoxypropylmethyldiethoxysilane, 3-glycidoxypropyltrimethoxysilane, 3-glycidoxypropyltriethoxysilane, 3-glycidoxypropyldimethoxymethylsilane, 3-glycidoxypropyldiethoxymethylsilane and/or 2-(3,4-epoxycyclohexyl)ethyltrimethoxysilane. The silane derivative used is typically 3-glycidoxypropyltrimethoxysilane and/or 3-glycidoxypropyltriethoxysilane.

The above-described composition for the production of the at least one hardcoat layer comprises the at least one colloidal inorganic oxide, hydroxide, oxide hydrate, fluoride and/or oxyfluoride typically in a proportion from a range from 3% by weight to 60% by weight, further typically from a range from 6% by weight to 58% by weight, more typically from a range from 9% by weight to 57% by weight and most typically from a range from 13% by weight to 55% by weight, based in each case on the total weight of the composition. The aforementioned proportions are applicable either in the case of use of a single type of colloidal inorganic oxide, hydroxide, oxide hydrate, fluoride and/or oxyfluoride or in the case of use of a mixture of different colloidal inorganic oxides, hydroxides, oxide hydrates, fluorides and/or oxyfluorides. The inorganic oxide, hydroxide, oxide hydrate may, for example, be a metal oxide, metal hydroxide and/or metal oxide hydrate of or including titanium, typically $TiO_2$, of or including silicon, typically $SiO_2$, of or including zirconium, typically $ZrO_2$, of or including tin, typically $SnO_2$, of or including antimony, typically $Sb_2O_3$, of or including aluminum, typically $Al_2O_3$ or AlO(OH), and/or mixed oxides and/or mixtures thereof. The inorganic oxide, hydroxide, oxide hydrate used is typically a metal oxide, metal hydroxide, metal oxide hydrate of or including titanium, of or including silicon, of or including zirconium, and/or mixtures thereof. The inorganic oxide, hydroxide, oxide hydrate used is more typically a metal oxide, metal hydroxide, metal oxide hydrate of or including silicon, most typically $SiO_2$. Further typically, the inorganic oxide, hydroxide, oxide hydrate has a core-shell structure. In this case, the core typically comprises a metal oxide, metal hydroxide and/or metal oxide hydrate of or including titanium, typically $TiO_2$, or of or including zirconium, typically $ZrO_2$, and the shell typically comprises a metal oxide, metal hydroxide and/or metal oxide hydrate of or including silicon. The inorganic fluoride may, for example, be magnesium fluoride. The at least one colloidal inorganic oxide, hydroxide, oxide hydrate, fluoride and/or oxyfluoride typically in each case has an average particle size from a range from 3 nm to 70 nm, further typically from a range from 6 nm to 64 nm, more typically from a range from 8 nm to 56 nm and most typically from a range from 9 nm to 52 nm.

The above-described composition for the production of the at least one hardcoat layer comprises the at least one epoxy compound typically in a proportion from a range from 0.01% by weight to 14% by weight, further from a range from 0.07% by weight to 11% by weight, more typically from a range from 0.1% by weight to 6% by weight and most typically from a range from 0.2% by weight to 3% by weight, based in each case on the total weight of the composition. The aforementioned proportions are applicable either in the case of use of a single type of epoxy compound or of a mixture of different epoxy compounds. The at least one epoxy compound may comprise, for example, diglycidyl ether, ethylene glycol diglycidyl ether, propylene glycol diglycidyl ether, butane-1,4-diol diglycidyl ether, hexane-1,6-diol diglycidyl ether, trimethylolpropane triglycidyl ether, triglycidylglycerol and/or trimethylolethane triglycidyl ether. The at least one epoxy compound typically comprises trimethylolpropane triglycidyl ether, butanediol diglycidyl ether and/or hexane-1,6-diol diglycidyl ether.

The above-described composition for the production of the at least one hardcoat layer comprises the at least one catalyst system typically in a proportion from a range from 0.04% by weight to 4% by weight, further typically from a range from 0.1% by weight to 3% by weight, more typically from a range from 0.2% by weight to 2% by weight and most typically from a range from 0.3% by weight to 1% by weight, based in each case on the total weight of the composition. In the at least one catalyst system, the weight ratio of the at least one Lewis acid to the at least one thermolatent Lewis acid-base adduct is typically 20:1 to 2:1, further typically 18:1 to 1:2, more typically 13:1 to 1:1 and most typically 6:1 to 1:1. The at least one Lewis acid used may, for example, be an ammonium perchlorate, magnesium perchlorate, sulfonic acids and/or sulfonic salts, such as trifluoromethanesulfonic acids and/or salts thereof. The at least one Lewis acid used is typically ammonium perchlorate and/or magnesium perchlorate. The at least one thermolatent Lewis acid-base adduct used may, for example, be at least one metal complex, such as aluminum acetylacetonate, iron acetylacetonate and/or zinc acetylacetonate. The at least one thermolatent Lewis acid-base adduct used is typically aluminum acetylacetonate and/or iron acetylacetonate.

The above-described composition for the production of the at least one hardcoat layer may further comprise at least one organic solvent and/or water. The proportions of the individual components described above are used in such a way that they add up to 100% by weight in the composition to be used for the production of the at least one hardcoat layer.

The at least one hardcoat layer typically has an average thickness from a range from 0.6 μm to 7.1 μm, further typically from a range from 0.8 μm to 6.6 μm, more typically from a range from 1.1 μm to 5.8 μm and most typically from a range from 1.6 μm to 4.9 μm. The average thickness of the at least one hardcoat layer is determined analogously to the average thickness of the chemically modified primer coat layer typically by means of a measurement of spectral reflectivity and/or of spectral transmissivity.

As an alternative to the above-described composition for the production of the at least one hardcoat layer, a composition according to U.S. Pat. No. 3,986,997 A, especially according to U.S. Pat. No. 3,986,997 A, example 7, may be used. As a further alternative, for the production of the at least one hardcoat layer, it is possible to use a composition according to WO 98/46692 A1, especially according to WO 98/46692 A1, example 21, or according to U.S. Pat. No. 6,538,092 B1, especially according to U.S. Pat. No. 6,538,092 B1, example 1.

In this exemplary embodiment, the at least one hardcoat layer typically does not act as a barrier layer. Typically, in this exemplary embodiment, the at least one hardcoat layer serves to increase scratch resistance and to increase chemical stability of the spectacle lens.

In this exemplary embodiment, the spectacle lens typically comprises the following layer sequences from object to eye:
a) optionally at least one cleancoat layer/at least one antireflection layer/at least one hardcoat layer/at least one chemically modified primer coat layer, typically exactly one chemically modified primer coat layer/at least one photochromic layer/front face of substrate// reverse face of substrate/at least one hardcoat layer/at least one antireflection layer/optionally at least one cleancoat layer, or
b) optionally at least one cleancoat layer/at least one hardcoat layer/at least one chemically modified primer coat layer, typically exactly one chemically modified primer coat layer/at least one photochromic layer/front face of substrate//reverse face of substrate/at least one hardcoat layer/optionally at least one cleancoat layer.

The layer sequence described above under a) is particularly preferred.

II. Coating Comprising at Least One Photochromic Layer, at Least One Chemically Modified Layer and at Least One Barrier Layer on the Same Surface of the Substrate There follows a further elucidation of the simultaneous presence of at least one chemically modified layer and at least one barrier layer present in the form of at least two separate layers, each on the same surface as the at least one photochromic layer and further removed from the substrate in a layer sequence in relation to the at least one photochromic layer, with reference to various exemplary embodiments. If the front face of the substrate here comprises at least one photochromic layer, the at least one chemically modified layer and the at least one barrier layer are further to the object side in the layer sequence in relation to the photochromic layer. If the reverse face of the substrate comprises at least one photochromic layer, the at least one chemically modified layer and the at least one barrier layer are further to the eye side in the layer sequence in relation to the photochromic layer. Both the front face of the substrate and the reverse face of the substrate may comprise at least one photochromic layer, at least one chemically modified layer and at least one barrier layer. Typically only the front face of the substrate comprises at least one photochromic layer, at least one chemically modified layer and at least one barrier layer.

II.1. Coating Comprising at Least One Photochromic Layer, at Least One Chemically Modified Primer Coat Layer and at Least One Barrier Layer Comprising at Least One Hardcoat Layer on the Same Surface of the Substrate In an exemplary embodiment, the spectacle lens comprises at least one photochromic layer, at least one chemically modified layer and at least one barrier layer on the same surface of the substrate. In this exemplary embodiment, at least one surface of the substrate, typically the front face of the substrate, comprises at least one photochromic layer, at least one chemically modified layer and at least one barrier layer, where both the at least one chemically modified layer and the at least one barrier layer are remote from the substrate in the layer sequence in relation to the at least one photochromic layer. The at least one barrier layer here is typically the layer furthest removed from the substrate. The at least one chemically modified layer, in this exemplary embodiment, typically comprises at least one chemically modified primer coat layer as already described above in the section "I. Coating comprising at least one photochromic layer and at least one chemically modified layer on the same surface of the substrate", called "I. chemically modified layer" hereinafter. The at least one barrier layer in this exemplary embodiment typically comprises at least one of the hardcoat layers that have already been described above in the section "I. chemically modified layer". Alternatively, the at least one barrier layer may also comprise at least one primer coat layer and at least one of the hardcoat layers that have already been described above in the section "I. chemically modified layer". In the latter case, the at least one hardcoat layer is disposed on the outside, i.e., further removed from the substrate, in relation to the at least one primer coat layer. The at least one primer coat layer is produced using a coating composition comprising i) at least one aqueous aliphatic, cycloaliphatic, aromatic or heteroaromatic polyurethane dispersion, at least one aqueous aliphatic, cycloaliphatic, aromatic or heteroaromatic polyurea dispersion, at least one aqueous aliphatic, cycloaliphatic, aromatic or heteroaromatic polyurethane-polyurea dispersion and/or at least one aqueous aliphatic, cycloaliphatic, aromatic or heteroaromatic polyester dispersion, more typically at least one aqueous aliphatic polyurethane dispersion or at least one aqueous aliphatic polyester dispersion, and most typically at least one aqueous aliphatic polyurethane dispersion, ii) at least one solvent and iii) optionally at least one additive.

The proportion of the at least one aqueous aliphatic, cycloaliphatic, aromatic or heteroaromatic polyurethane dispersion, the at least one aqueous aliphatic, cycloaliphatic, aromatic or heteroaromatic polyurea dispersion, the at least one aqueous aliphatic, cycloaliphatic, aromatic or heteroaromatic polyurethane-polyurea dispersion and/or the at least one aqueous aliphatic, cycloaliphatic, aromatic or heteroaromatic polyester dispersion in the coating composition usable for production of the at least one primer coat layer typically has a total proportion from a range from 2% by weight to 38% by weight, further typically from a range from 4% by weight to 34% by weight, further typically from a range from 5% by weight to 28% by weight, more typically from a range from 6% by weight to 25% by weight and most typically from a range from 7% by weight to 21% by weight, based in each case on the total weight of the coating composition. The total proportion here includes both the proportion of only one of the dispersions listed above and a mixture of dispersions listed above.

Typically, the coating composition usable for production of the at least one primer coat layer comprises an aqueous polyurethane dispersion, where the polyurethane typically includes a polyester unit as spacer. Aqueous polyurethane dispersions for use with preference are disclosed in WO 94/17116 A1, especially in WO 94/17116 A1, page 7 lines 11 to 33. The aqueous polyurethane dispersion may have been stabilized with an anionically stabilized acrylic emulsion, as disclosed, for example, in WO 94/17116 A1, especially in WO 94/17116 A1, page 7 lines 33 to 35.

The proportion of the at least one solvent in the coating composition usable for production of the at least one primer coat layer is typically within a range from 69% by weight to 98% by weight, further typically within a range from 68% by weight to 99% by weight, more typically within a range from 81% by weight to 97% by weight and most typically within a range from 89% by weight to 93% by weight, based in each case on the total weight of the coating composition.

The aforementioned proportions are applicable both to the use of a mixture of different solvents and to the use of a single solvent.

The coating composition usable for production of the at least one primer coat layer typically comprises at least one organic solvent having a low boiling point of <100° C. at standard pressure and at least one organic solvent having a moderate boiling point from a range from 100° C. to 150° C. at standard pressure. Examples of organic solvents having a low boiling point that may be used include methanol, ethanol, 1-propanol, 2-propanol, tert-butanol, acetone, diethyl ether, tert-butyl methyl ether, tetrahydrofuran, chloroform, 1,2-dichloroethane, methylene chloride, cyclohexane, ethyl acetate, n-hexane, n-heptane and/or methyl ethyl ketone. Preferred organic solvents having a low boiling point are methanol, ethanol, 1-propanal and/or 2-propanol.

Examples of organic solvents having a moderate boiling point that may be used include 1-methoxy-2-propanol, 1-butanol, dibutyl ether, 1,4-dioxane, 3-methyl-1-butanol, 4-hydroxy-4-methyl-2-pentanone, methyl isobutyl ketone and/or toluene. Preferred solvents having a moderate boiling point are 1-methoxy-2-propanol and/or 4-hydroxy-4-methyl-2-pentanone.

The weight ratio of the at least one organic solvent having a low boiling point to at least one organic solvent having a moderate boiling point is typically 1:1, further typically 1:1.4, more typically 1:1.5 and most typically 1:1.7.

The coating composition usable for production of the at least one primer coat layer may additionally comprise water as solvent as well as at least one organic solvent having a low boiling point and at least one organic solvent having a moderate boiling point. In this case, the weight ratio of the at least one organic solvent having a low boiling point to at least one organic solvent having a moderate boiling point to water is typically 2:7:1, further typically 2.5:6.5:1, further typically 3:6:1, more typically 3:5:1 and most typically 3:6:1.

The at least one primer coat layer typically has an average thickness from a range from 300 nm to 1200 nm, further typically from a range from 340 nm to 1150 nm, further typically from a range from 390 nm to 1120 nm, more typically from a range from 440 nm to 1110 nm and most typically from a range from 470 nm to 1100 nm. What is meant by average thickness is the arithmetic average of the thickness of the respective primer coat layer measured in at least three places. The average thickness of the at least one primer coat layer is typically determined after application and drying using a spectacle lens comprising at least one photochromic layer and at least one primer coat layer, where the aforementioned layers are on the same surface of the substrate and the at least one primer coat layer is the layer furthest removed from the substrate. The average thickness of the at least one primer coat layer is typically determined by means of measurement of spectral reflectivity and/or spectral transmissivity. The average thickness of the at least one primer coat layer is typically determined using an optical spectrometer from Filmetrics Inc., for example the optical spectrometer F20, F10-HC or F10-AR. More typically, the average thickness of the at least one primer coat layer is determined using the F10-HC optical spectrometer (from Filmetrics Inc.). Illumination of the spectacle lens comprising at least one photochromic layer and at least one primer coat layer using white light gives rise to interference spectra as a function of the geometric layer thickness and refractive index of the respective layer. Incidence of white light gives rise to interferences at optically transparent layers since, for particular wavelengths, the path difference is an exact multiple of the optical layer thickness. The layer thickness is typically calculated by the fast Fourier transformation (FFT) method. In the FFT method, the geometric layer thickness is calculated from the periodicity of the interference spectrum. Alternatively, the average thickness of the at least one primer coat layer can be determined using at least one scanning electron microscope section image or at least one transmission electron microscope section image of a spectacle lens comprising at least one photochromic layer and at least one primer coat layer. For this purpose, the thickness of the respective primer coat layer is ascertained in at least three places and the arithmetic average is formed.

The coating composition usable for production of the at least one primer coat layer is applied to at least one photochromic layer or to at least one further layer that is present on and different from the photochromic layer. This coating composition is typically dried by evaporation of the at least one solvent present in the coating composition. This coating composition is typically dried at a temperature from a range from 20° C. to 80° C., further typically from a range from 23° C. to 78° C., more typically from a range from 35° C. to 76° C. and most typically at 45° C. to 75° C.

The coating composition for production of the at least one primer coat layer may optionally comprise at least one additive. The at least one additive here may be a dispersant, an antisettling agent, a wetting agent, including an anti-crater additive or a leveling additive, a biocide, a UV absorber and/or a mixture thereof. The coating composition for production of the at least one primer coat layer comprises the at least one additive optionally present typically in a proportion from a range from 0.01% by weight to 1.7% by weight, further typically in a proportion from a range from 0.07% by weight to 1.4% by weight, more typically in a proportion from a range from 0.09% by weight to 1.1% by weight and most typically in a proportion from a range from 0.1% by weight to 0.7% by weight, based in each case on the total weight of the coating composition. The aforementioned proportions are applicable either to the use of one type of additive or to the use of a mixture of different additives.

The proportions of the individual components described above are used in such a way that they add up to 100% by weight in the coating composition to be used for the production of the at least one primer coat layer.

The coating composition usable for production of the at least one primer coat layer is typically applied to at least one surface of the substrate covered with at least one photochromic layer by means of dip-coating or spin-coating.

In this exemplary embodiment, typically at least one surface of the substrate, typically the front face thereof, comprises a) typically at least one photochromic layer, at least one hardcoat layer 1, at least one chemically modified primer coat layer and at least one hardcoat layer 2. The at least one hardcoat layer 2 here typically serves to increase scratch resistance and to increase chemical stability of the spectacle lens. In addition, the at least one hardcoat layer 2 may act as barrier layer, but only in those regions of the hardcoat layer 2 that are intact, i.e., undamaged. The at least one hardcoat layer 2 may have instances of minor damage over the course of time, for example microscratches, that can arise in the course of everyday use of the spectacles over the course of the total wearing period of a pair of spectacles of typically two to four years. In the region of the instances of minor damage, the at least one hardcoat layer 2 can no longer act as barrier layer. The at least one hardcoat layer 1 typically serves here as at least one barrier layer. The at least one hardcoat layer 1 also serves, in addition to the at least one hardcoat layer 2, to increase scratch resistance and to increase chemical stability, especially in those regions in which the at least one hardcoat layer 2 has instances of minor damage. The average layer thickness of the at least one hardcoat layer 1 and the average layer thickness of the at least one hardcoat layer 2 may be identical or different. The average layer thickness of the at least one hardcoat layer 1 is typically different than the average layer thickness of the at least one hardcoat layer 2. The average layer thickness of the at least one hardcoat layer 1 is typically within a range from 1.7 µm to 5.2 µm, further typically within a range from 2.1 µm to 4.8 µm, more typically within a range from 2.3 µm to 4.4 µm and most typically within a range from 2.7 µm to 4.1 µm. The average layer thickness of the at least one hardcoat layer 2 is typically within a range from 0.7 µm to 4.2 µm, further typically within a range from 1.4 µm to 3.9 µm, more typically within a range from 1.7 µm to 3.3 µm and most typically within a range from 2.0 µm to 2.9 µm. The at least one hardcoat layer 1 and the at least one hardcoat layer 2 can be produced using the same or a different composition. The at least one hardcoat layer 1 and the at least one hardcoat layer 2 are typically produced using an identical composition. The average layer thickness of the at least one chemically modified primer coat layer is typically within a range from 0.4 µm to 1.3 µm, further typically within a range from 0.5 µm to 1.2 µm, more typically within a range from 0.6 µm to 1.1 µm and most typically within a range from 0.7 µm to 1.0 µm. The hardcoat layer 2 in the above layer sequence a) is the layer furthest removed from the surface of the substrate, typically the outermost layer on the object side on the front face of the substrate in the above layer sequence a). The front face of the substrate especially typically comprises a layer sequence a) comprising exactly one photochromic layer, exactly one hardcoat layer 1, exactly one chemically modified primer coat layer and exactly one hardcoat layer 2; or b) at least one photochromic layer, at least one chemically modified primer coat layer, at least one hardcoat layer 1, at least one primer coat layer and at least one hardcoat layer 2. The at least one hardcoat layer 2 here typically serves to increase scratch resistance and to increase chemical stability of the spectacle lens. As set out above for the layer sequence described under a), the at least one hardcoat layer 2 may additionally act as barrier layer in the undamaged regions. The at least one hardcoat layer 1 typically serves here as at least one barrier layer. In addition, as set out above for the layer sequence described under a), the at least one hardcoat layer 1 may contribute to an increase in scratch resistance and to an increase in chemical stability of the spectacle lens. The average layer thickness of the at least one hardcoat layer 1 and the average layer thickness of the at least one hardcoat layer 2 may be identical or different. The average layer thickness of the at least one hardcoat layer 1 is typically identical to the average layer thickness of the at least one hardcoat layer 2. Identical average layer thickness is also understood to mean a layer thickness varying by ≤300 nm. This tolerance range is applicable to all average layer thicknesses referred to as identical, especially also to the identical average layer thicknesses mentioned in connection with layer sequences c) and d). The average layer thickness of the at least one hardcoat layer 1 and the average layer thickness of the at least one hardcoat layer 2 are typically each within a range from 1.6 µm to 4.7 µm, further typically within a range from 1.7 µm to 4.4 µm, more typically within a range from 1.8 µm to 4.2 µm and most typically within a range from 2.0 µm to 4.1 µm. The average layer thickness of the at least one chemically modified primer coat layer is typically within a range from 0.3 µm to 1.4 µm, further typically within a range from 0.4 µm to 1.3 µm, more typically within a range from 0.5 µm to 1.2 µm and most typically within a range from 0.6 µm to 1.1 µm. The average layer thickness of the at least one primer coat layer is typically within a range from 0.3 µm to 1.6 µm, further typically within a range from 0.4 µm to 1.2 µm, more typically within a range from 0.5 µm to 1.0 µm and most typically within a range from 0.6 µm to 0.8 µm. The at least one hardcoat layer 1 and the at least one hardcoat layer 2 can be produced using the same or a different composition. The at least one hardcoat layer 1 and the at least one hardcoat layer 2 are typically produced using an identical composition. The hardcoat layer 2 in the above layer sequence b) is the layer furthest removed from the surface of the substrate, typically the outermost layer on the object side on the front face of the substrate in the above layer sequence b). The front face of the substrate especially typically comprises a layer sequence b) comprising exactly one photochromic layer, exactly one chemically modified primer coat layer, exactly one hardcoat layer 1, exactly one primer coat layer and exactly one hardcoat layer 2; or c) more typically at least one photochromic layer, at least one chemically modified primer coat layer 1, at least one hardcoat layer 1, at least one chemically modified primer coat layer 2 and at least one hardcoat layer 2. The at least one hardcoat layer 2 here typically serves to increase scratch resistance and to increase chemical stability of the spectacle lens. As already disclosed above for the layer sequence described under a), the at least one hardcoat layer 2 may additionally act as barrier layer. The at least one hardcoat layer 1 typically serves here as at least one barrier layer. The at least one hardcoat layer 1, as described above for layer sequence a), also serves to increase scratch resistance and to increase chemical stability. Here too, the at least one hardcoat layer 1 and the at least one hardcoat layer 2 can be produced using an identical or different composition. The composition usable for production of the at least one hardcoat layer 1 is typically identical to the composition usable for production of the at least one hardcoat layer 2. The average layer thickness of the at least one hardcoat layer 1 may be identical to or different than the average layer thickness of the at least one hardcoat layer 2. The average layer thickness of the at least one hardcoat layer 1 is typically identical to the average layer thickness of the at least one hardcoat layer 2. The average layer thickness of the at least one hardcoat layer 1 and of the at least one hardcoat layer 2 are typically each within a range from 1.7 µm to 4.6 µm, further typically within a range from 1.9 µm to 4.2 µm, more typically within a range from 2.0 µm to 4.0 µm and most typically within a range from 2.1 µm to 3.9 µm. The coating composition for production of the at least one chemically modified primer coat layer 1 and the coating composition for production of the at least one chemically modified primer coat layer 2 may be identical or different. The coating composition for production of the at least one chemically modified primer coat layer 1 may be identical to the coating composition for production of the at least one chemically modified primer coat layer 2. Alternatively, the coating composition for production of the at least one chemically modified primer coat layer 1 and the coating composition for production of the at least one chemically modified primer coat layer 2 may be identical apart from the type of the at least one base and/or the proportion of the at least one base. Typically, in the case of this alternative, the coating composition for production of the at least one chemically modified primer coat layer 1 and the coating composition for production of the at least one chemically modified primer coat layer 2 is identical apart from the type of the at least one base. The at least one base selected in this alternative is typically imidazole or an imidazole derivative, more typically 1-methylimidazole, 2-methylimidazole, 4-methylimidazole, 2,5-dimethylimidazole and/or 4-hydroxymethylimidazole, where the coating composition for production of the at least one chemically modified primer coat layer 1 and the coating composition for production of the at least one chemically modified primer coat layer 2 each comprise a different base. The proportion of the at least one base in the coating composition for production of the at least one chemically modified primer coat layer 1 and in the coating composition for production of the at least one chemically modified primer coat layer 2 is typically identical and is typically in each case within a range from 0.2% by weight to 2.7% by weight, further typically within a range from 0.3% by weight to 2.1% by weight, more typically within a range from 0.4% by weight to 1.7% by weight and most typically within a range from 0.5% by weight to 1.4% by weight. The average layer thickness of the chemically modified primer coat layer 1 and the average layer thickness of the chemically modified primer coat layer 2 may be identical or different. The average layer thickness of the chemically modified primer coat layer 1 is typically identical to the average layer thickness of the chemically modified primer coat layer 2. The average layer thickness of the chemically modified primer coat layer 1 and the average layer thickness of the chemically modified primer coat layer 2 are typically each within a range from 0.2 µm to 1.7 µm, further typically within a range from 0.3 µm to 1.2 µm, more typically within a range from 0.4 µm to 1.1 µm and most typically within a range from 0.5 µm to 1.0 µm. The hardcoat layer 2 in the above layer sequence c) is the layer furthest removed from the surface of the substrate, typically the outermost layer on the object side on the front face of the substrate in the above layer sequence c). The front face of the substrate especially typically comprises a layer sequence c) comprising exactly one photochromic layer, exactly one chemically modified primer coat layer 1, exactly one hardcoat layer 1, exactly one chemically modified primer coat layer 2 and exactly one hardcoat layer 2; or d) most typically at least one photochromic layer, at least one primer coat layer, at least one hardcoat layer 1, at least one chemically modified primer coat layer 2 and at least one hardcoat layer 2. The at least one hardcoat layer 2 here typically serves to increase scratch resistance and to increase chemical stability of the spectacle lens. The at least one hardcoat layer 2 may additionally, as set out above for the layer sequence described under a), also act as barrier layer. The at least one hardcoat layer 1 typically serves here as at least one barrier layer. Moreover, the at least one hardcoat layer 1, as described for the layer sequence above under a), may also contribute to an increase in scratch resistance and to an increase in chemical stability. The at least one hardcoat layer 1 and the at least one hardcoat layer 2 can be produced using the same or a different composition. The composition for production of the at least one hardcoat layer 1 is typically identical to the composition for production of the at least one hardcoat layer 2. The average layer thickness of the at least one hardcoat layer 1 and the average layer thickness of the at least one hardcoat layer 2 may be identical or different. The average layer thickness of the at least one hardcoat layer 1 is typically identical to the average layer thickness of the at least one hardcoat layer 2. The average layer thickness of the at least one hardcoat layer 1 and the average layer thickness of the at least one hardcoat layer 2 are each typically within a range from 1.7 µm to 4.7 µm, further typically within a range from 1.8 µm to 4.3 µm, more typically within a range from 1.9 µm to 4.1 µm and most typically within a range from 2.0 µm to 3.8 µm. The average layer thickness of the at least one chemically modified primer coat layer is typically within a range from 0.1 µm to 1.9 µm, further typically within a range from 0.2 µm to 1.5 µm, more typically within a range from 0.3 µm to 1.2 µm and most typically within a range from 0.4 µm to 1.1 µm. The hardcoat layer 2 in the above layer sequence d) is the layer furthest removed from the surface of the substrate, typically the outermost layer on the object side on the front face of the substrate in the above layer sequence d). The front face of the substrate especially typically comprises a layer sequence d) comprising exactly one photochromic layer, exactly one primer coat layer, exactly one hardcoat layer 1, exactly one chemically modified primer coat layer and exactly one hardcoat layer 2.

The composition used for production of the at least one hardcoat layer 1 or of the at least one hardcoat layer 2, or as coating composition for production of the at least one chemically modified primer coat layer 1 and of the at least one chemically modified primer coat layer 2, may be one of the compositions described in the above section "I. chemically modified layer" for production of the hardcoat layer or one of the coating compositions for production of the chemically modified primer coat layer. The coating composition used for the production of the at least one primer coat layer may be one of the compositions described above in that section.

The average thickness of the respective layer is typically determined after application and drying thereof by means of the test method described for the respective layer above.

In this exemplary embodiment, the surface of the substrate covered by at least one barrier layer or by above-detailed preferred layer sequences a), b), c) or d), typically the front face thereof adjoining the at least one barrier layer or adjoining the at least one hardcoat layer 2, remotely from the substrate, may also optionally comprise at least one antireflection layer, at least one electrically conductive or semiconductive layer, at least one antifog layer and/or at least one cleancoat layer. The at least one electrically conductive or semiconductive layer here may be part of the at least one antireflection layer. The coating typically comprises, remote from the substrate, adjoining the barrier layer furthest removed from the substrate or adjoining the hardcoat layer 2, at least one antireflection layer, more typically at least one antireflection layer and at least one cleancoat layer, in which latter case the cleancoat layer is the layer furthest removed from the substrate. In aforementioned preferred layer sequences a), b), c) and d), it is also possible for there to be at least one further layer between the layers explicitly detailed in each case. There is typically no further layer present between the individual layers detailed in each case in aforementioned preferred layer sequences a), b), c) and d). Moreover, there may also be at least one further layer between the surface of the substrate and the at least one photochromic layer. Typically disposed facing the substrate and directly adjoining the at least one photochromic layer is at least one primer layer, more typically the polyurethane resin layer disclosed in EP 1 602 479 A1, especially in EP 1 602 479 A1, claim 1. If the layer sequence comprises at least one coloring layer and/or at least one polarizing layer, in this exemplary embodiment too, the layer sequence specified in the section "I. chemically modified layer" between the surface of the substrate, typically the front face thereof, and the at least one photochromic layer is typically applicable. As an alternative to the application of at least one coloring layer to at least one surface of the substrate, typically the front face of the substrate, the substrate may be colored in this exemplary embodiment too.

In this exemplary embodiment, that surface of the substrate not covered by at least one photochromic layer typically comprises at least one hardcoat layer, at least one antireflection layer, at least one electrically conductive or semiconductive layer that is optionally part of the antireflection layer, at least one antifog layer and/or at least one cleancoat layer. Further typically, that surface of the substrate which is not covered by at least one photochromic layer typically comprises at least one hardcoat layer, more typically at least one hardcoat layer and at least one antireflection layer, and most typically at least one hardcoat layer, at least one antireflection layer and at least one cleancoat layer. The at least one antireflection layer is the layer furthest removed from the substrate or, in the presence of at least one cleancoat layer, the at least one cleancoat layer is the layer furthest removed from the substrate. Alternatively, that surface of the substrate which is not covered by at least one photochromic layer may comprise at least one ultrathin lens and at least one antireflection layer, in which case the at least one antireflection layer is typically remote from the substrate in relation to the at least one ultrathin lens. As a further alternative, that surface of the substrate which is not covered by at least one photochromic layer may comprise at least one ultrathin lens, at least one antireflection layer and at least one cleancoat layer, in which case the at least one antireflection layer and the at least one cleancoat layer are typically remote from the substrate in relation to the at least one ultrathin lens and the cleancoat layer is typically the layer furthest removed from the substrate. Ultrathin lenses are described in detail in connection with the further exemplary embodiment below in the section "II.2. barrier layer comprising at least one ultrathin lens". Optionally, there may be at least one layer, typically a coloring layer, between the substrate surface and the ultrathin lens. The composition for production of the at least one hardcoat layer on the surface of the substrate that does not include a photochromic layer may be identical to or different than the composition for production of the at least one hardcoat layer present on the same surface of the substrate as the at least one photochromic layer. If the surface of the substrate comprising at least one photochromic layer comprises more than one hardcoat layer, as described above in the preferred layer sequences a), b), c) and d) of this exemplary embodiment, the composition for production of the at least one hardcoat layer on that surface of the substrate that does not include a photochromic layer may be identical to or different than any of the compositions for production of the hardcoat layers or identical to or different than at least one of the compositions of the hardcoat layers. Typically, all compositions that are used for production of all hardcoat layers of the spectacle lens are identical. This facilitates the coating process firstly in that there is no need to make up, or keep stock of, different compositions for each hardcoat layer to be applied. Secondly, the hardcoat layer, in the case of use of identical compositions, can also be applied by means of dip-coating. Irrespective of which of the surfaces of the substrate the hardcoat layer is present on, the composition for production of the at least one hardcoat layer is described in section "I. chemically modified layer".

II.2. Coating Comprising at Least One Photochromic Layer, at Least One Chemically Modified Primer Coat Layer and at Least One Barrier Layer Comprising at Least One Ultrathin Lens on the Same Surface of the Substrate In a further exemplary embodiment, the spectacle lens comprises at least one photochromic layer, at least one chemically modified layer and at least one barrier layer on the same surface of the substrate, with use of at least one ultrathin lens as barrier layer in this exemplary embodiment. In this further exemplary embodiment, at least one surface of the substrate, typically the front face thereof, comprises at least one photochromic layer, at least one chemically modified layer and at least one ultrathin lens, where both the at least one chemically modified layer and the at least one ultrathin lens are arranged remote from the substrate in the layer sequence in relation to the at least one photochromic layer. The at least one ultrathin lens here is typically the furthest removed from the substrate. The at least one chemically modified layer in this further exemplary embodiment typically comprises at least one chemically modified primer coat layer that has already been described above in the section "I. chemically modified layer".

The at least one ultrathin lens may be based on various glass compositions, for example borosilicate glass, aluminoborosilicate glass or alkali-free borosilicate glass. The at least one ultrathin lens is typically based on a borosilicate glass or an aluminoborosilicate glass.

The at least one ultrathin lens typically has an average thickness from a range from 10 µm to 1000 µm, further typically from a range from 13 µm to 760 µm, further typically from a range from 16 µm to 510 µm, more typically from a range from 18 µm to 390 µm and most typically from a range from 19 µm to 230 µm. The at least one ultrathin lens especially typically has an average thickness from a range from 21 µm to 121 µm. The average thickness of the at least one ultrathin lens is understood to mean the arithmetic average, unless stated otherwise. Below an average thickness of 10 µm, the at least one ultrathin lens is too mechanically unstable to be bondable to at least the surface of the substrate comprising the at least one photochromic layer and optionally to the opposite surface of the substrate without breakage of the at least one ultrathin lens. Above an average thickness of 1000 µm, the at least one ultrathin lens can lead to spectacle lenses that would have too great an edge thickness or too great a middle thickness. The average thickness of the at least one spectacle lens is typically measured with the Filmetrics F10-HC instrument (from Filmetrics Inc.). The average thickness of the at least one ultrathin lens is typically determined using the at least one ultrathin lens before bonding to the substrate. Alternatively, the average thickness of the at least one ultrathin lens can be determined by means of a scanning electron micrograph using a polished section. This can be accomplished either using a polished section of the at least one ultrathin lens or using a polished section of the spectacle lens comprising at least one photochromic layer and at least one ultrathin lens on at least one surface of the substrate, or using a polished section of the spectacle lens comprising at least one photochromic layer and at least one ultrathin lens on at least one surface of the substrate and optionally at least one ultrathin lens on the opposite surface of the substrate. For this purpose, in each case, the thickness of the at least one ultrathin lens is determined in at least three places and statistically averaged. The relative standard deviation of the thickness distribution of the at least one ultrathin lens in each case is 0.1% to 100%, typically 0.2% to 81%, more typically 0.3% to 66% and most typically 0.4% to 24%. The relative standard deviation in [%] is the quotient of calculated standard deviation and average thickness.

The at least one ultrathin lens typically has a surface roughness Ra of <1 nm. Further typically, the surface roughness Ra of the at least one ultrathin lens is within a range from 0.1 nm to 0.8 nm, more typically within a range of 0.3 nm to 0.7 nm and most typically in a range of 0.4 nm to 0.6 nm. The aforementioned values for surface roughness Ra are each based on the front face and the reverse face of the at least one unformed, planar ultrathin lens. After forming, the aforementioned values are in each case applicable only to that surface of the at least one ultrathin lens that has not been brought into contact with the shaped body used for forming. Depending on the shaped body used for forming, the aforementioned values may also be applicable to the surface of the at least one ultrathin lens that was in contact with the shaped body used for forming. The surface roughness Ra of the at least one ultrathin lens is typically determined by means of white-light interferometry, typically using the NewView 7100 instrument (from Zygo Corporation). If the at least one ultrathin lens has further superficial unevenness, the area analysis of the respective surface can also be determined by phase-measuring deflectometry, typically with the SpecGage instrument (from 3D-Shape GmbH).

The transformation temperature $T_G$ of the at least one ultrathin lens is typically within a range from 400° C. to 800° C., further typically within a range from 430° C. to 770° C., more typically within a range from 490° C. to 740° C. and most typically within a range from 530° C. to 730° C. The transformation temperature $T_G$ of the at least one ultrathin lens can be determined in each case by means of dynamic-mechanical analysis, typically with the DMA 8000 Dynamic Mechanical Analyzer instrument (from Perkin Elmer Inc.), or by means of dynamic differential calorimetry, typically with the DSC204CEL instrument with TASC414/3A or CC2001 controller (each from Erich NETZSCH GmbH & Co. Holding KG). Typically, the transformation temperature $T_G$ of the at least one ultrathin lens is determined by means of dynamic differential calorimetry.

The coefficient of expansion of the at least one ultrathin lens is typically within a range from $1.8 \cdot 10^{-6} K^{-1}$ to $9.1 \cdot 10^{-6} K^{-1}$, further typically within a range from $2.1 \cdot 10^{-6} K^{-1}$ to $8.8 \cdot 10^{-6} K^{-1}$, more typically within a range from $2.6 \cdot 10^{-6} K^{-1}$ to $8.2 \cdot 10^{-6} K^{-1}$ and most typically within a range from $3.0 \cdot 10^{-6} K^{-1}$ to $7.4 \cdot 10^{-6} K^{-1}$, based in each case on the temperature range from 20° C. to 300° C. The coefficient of expansion of the at least one ultrathin lens is typically detected by means of dilatometry, typically with the DIL 402 E/7 instrument (from Erich NETZSCH GmbH & Co. Holding KG). The at least one ultrathin lens may comprise at least one colorant or no colorant. The at least one ultrathin lens typically does not comprise any colorant.

Further typically, the transmittance of the at least one ultrathin lens without colorant in the wavelength range from 400 nm to 800 nm is in each case ≥90%, more typically ≥92%. The transmittance of the at least one ultrathin lens without colorant is typically determined by means of a UV/VIS spectrophotometer, typically with the LAMBDA 950 UV/Vis/NIR Spectrophotometer (from Perkin Elmer Inc.).

The at least one ultrathin lens typically has a refractive index from a range of n=1.490 to n=1.950, further typically from a range of n=1.501 to n=1.799, more typically from a range of n=1.510 to n=1.755 and most typically from a range from n=1.521 to n=1.747, where the refractive index is reported for the wavelength of the sodium D line. The refractive index of the at least one ultrathin lens is typically matched to the directly adjoining coating in each case. At the respective interfaces of ultrathin lens/coating or ultrathin lens/adhesive or ultrathin lens/substrate, the difference in refractive index is typically in each case less than 0.3, further typically less than 0.1, further typically less than 0.05, more typically less than 0.03 and most typically less than 0.01, provided that the substrate has a uniform refractive index. If the substrate comprises a polymeric material having a location-dependent refractive index distribution, the average refractive index of the polymeric material at the respective interfaces of coating/polymeric material or adhesive/polymeric material or ultrathin lens/polymeric material typically differs by not more than 0.3, more typically by not more than 0.1 and most typically by not more than 0.05. Typically, the at least one ultrathin lens, the substrate having uniform refractive index, the adhesive(s) optionally used and all coatings except for the multilayer coatings, for example a multilayer antireflection layer or a multilayer reflection layer, have the same refractive index. In this case, the same refractive index tolerates a difference in refractive index from a range from 0.005 to 0.015. The refractive index is typically determined separately by refractometry on the respective constituents of the spectacle lens. The measuring instrument used may, for example, be the Anton Paar Abbemat MW instrument (from Anton Paar GmbH).

The at least one ultrathin lens typically has an Abbe number from a range from 20 to 85, further typically from a range from 23 to 74, more typically from a range from 29 to 66 and most typically from a range from 33 to 61. Typically, the at least one ultrathin lens, the substrate having uniform refractive index, the adhesive(s) optionally used and all coatings present except for the multilayer coatings, for example a multilayer antireflection layer or a multilayer reflection layer, have the same Abbe number. The same Abbe number tolerates a difference in the Abbe number from a range from 0.1 to 5, typically from a range from 0.1 to 2.1. The higher the refractive index of all constituents of the spectacle lens, the greater the differences in the Abbe number that are tolerated. The at least one ultrathin lens and the substrate typically each have a maximum Abbe number for a given refractive index n or for a given average refractive index.

The at least one ultrathin lens may have a transformation temperature $T_G$ from a range from 421° C. to 781° C., typically from a range from 501° C. to 766° C., and in each case has a coefficient of expansion for the temperature range from 20° C. to 300° C. from a range from $2.9 \cdot 10^{-6} K^{-1}$ to $8.3 \cdot 10^{-6} K^{-1}$, typically from a range from $3.1 \cdot 10^{-6} K^{-1}$ to $7.3 \cdot 10^{-6} K^{-1}$.

The at least one ultrathin lens may have an average thickness from a range from 17 μm to 190 μm, typically from a range from 24 μm to 166 μm, and a transformation temperature $T_G$ from a range from 510° C. to 730° C., typically from a range from 555° C. to 721° C.

Ultrathin lenses are commercially available, for example, under the D 263® T eco, D 263® LA eco, D 263® M, AF 32® eco, SCHOTT AS 87 eco, B 270® i names, each from Schott AG, or Corning Willow Glass or Corning Gorilla Glass, each from Corning Inc.

The at least one ultrathin lens may be in different shapes, for example planar or in a particular form. In connection with the shape of the at least one ultrathin lens, "planar" is understood to mean that the at least one ultrathin lens does not have any macroscopically visible bending or curvature. If the at least one ultrathin lens has a nonplanar surface, it is possible to achieve a desired surface topography, for example spherical or toric, by deforming a planar ultrathin lens on a corresponding negative mold. For example, the at least one ultrathin lens may be configured in the form of a spherical lens with a particular radius of curvature. For forming of a planar ultrathin lens, it may first be cut out, typically in the form of a circle, for example by means of a laser. In the edge region, this cut-out ultrathin lens circle may then be flame-treated in order to seal any microcracks that have formed. In order to produce a minimum amount of ultrathin lens offcut material, the cutout of the ultrathin lens is typically selected such that, after the joining of the at least one ultrathin lens to at least the surface of the substrate comprising at least one photochromic layer, or optionally after the joining of the at least one ultrathin lens to the opposite surface of the substrate, a minimum amount of excess ultrathin lens has to be removed in each case. The cut-out ultrathin lens may, for example, be placed onto a mold shell suitable for forming, optionally secured by means of a holder, and typically heated together with the mold shell, optionally together with the holder, up to the transformation temperature $T_G$ of the glass composition or up to a temperature which is typically not more than 20° C. above the transformation temperature $T_G$ of the glass composition. The mold shell may, for example, have a convex or concave shape. For example, the cut-out ultrathin lens is pressed into the mold shell with the aid of a counterpart that fits into the mold shell, or the ultrathin lens cutout is formed into the mold shell with application of reduced pressure and/or simply by means of gravity. Preference is given to forming of the at least one ultrathin lens with application of reduced pressure into a mold shell. The formed ultrathin lens is typically allowed to cool completely in or above the mold shell before it is separated from the mold shell. The forming of a typically planar cutout of an ultrathin lens is typically effected in a protective gas atmosphere. The mold shell may be configured here as negative mold of the front face or reverse face of the at least one ultrathin lens to be achieved in the forming operation. For example, the mold shell may be formed spherically, aspherically, rotationally symmetrically, torically, atorically, or as a symmetric free-form face or unsymmetric free-form face. Alternatively, the ultrathin lens may be formed in uncut form, typically planar form, with the aid of a thermoforming process.

The radius of curvature of the at least one ultrathin lens is typically within a range from 10 mm to infinity, typically within a range from 20 mm to 1600 mm, further typically within a range from 35 mm to 1535 mm, further typically within a range from 56 mm to 600 mm, more typically within a range from 66 mm to 481 mm and most typically within a range from 75 mm to 376 mm. A radius of curvature of the at least one ultrathin lens of infinity corresponds here to a planar surface. In the case of nonspherical surfaces of the at least one ultrathin lens, the above-specified radii of curvature are each based on an approximate spherical form.

The mold shell usable for forming typically comprises a material that can be processed with removal of material, does not cause any structures in the formed ultrathin lens and additionally does not enter into any inextricable bond to the ultrathin lens. The mold shell may consist, for example, of graphite, a metal (alloy) or a ceramic, as described, for example, in WO 2006/050891 A2. The mold shell may also have been surface-modified, so as to further minimize adhesion of the ultrathin lens.

The bonding of the surface of the substrate comprising at least one photochromic layer or of the opposite surface of the substrate to the at least one ultrathin lens in each case is typically effected by means of an adhesive. The adhesive may serve here, for example, as primer or compensation material for the different thermal expansion of the individual components. In addition, via the selection of the adhesive, matching of any difference in refractive index $\Delta n_D$ that exists between the individual components can be achieved. What is typically effected here is not just the matching of the refractive index $n_D$ but also the matching of the Abbe number, such that the change in the refractive index of the individual components is the same across the visible spectrum. Usable adhesives are described, for example, in DE 10 2012 210 185 A1, WO 2009/056196 A1 or WO 2015/121341 A1. Typically, the individual components are bonded to one another by means of an adhesive based on an amine-catalyzed thiol hardening of epoxy resins analogously to WO 2015/121341 A1, especially analogously to claim 1 of WO 2015/121341 A1, at a temperature from a range from 20° C. to 80° C., typically from a range from 40° C. to 70° C. and more typically from a range from 45° C. to 65° C.

Slight differences in the surface topography of the two surfaces to be joined to one another can be filled, for example, by means of an adhesive. For form-fitting bonding of the respective surfaces, it is preferable that the radii of curvature of the respective components to be bonded to one another should typically differ by less than 1 mm, further typically within a range from 0.03 mm to ≤0.8 mm, more typically within a range from 0.04 mm to ≤0.7 mm and most typically within a range from 0.05 mm to ≤0.6 mm. Typically, the at least one ultrathin lens, the surface of the substrate comprising at least one photochromic layer and optionally the opposite surface of the substrate, before being joined by means of an adhesive to at least one ultrathin lens, each have an identical radius of curvature, and optionally also an identical diameter.

The at least one ultrathin lens furthest removed from the substrate on the same surface of the substrate as the at least one photochromic layer may be covered on the surface remote from the substrate by at least one antireflection layer and/or by at least one cleancoat layer. Typically, this at least one ultrathin lens comprises at least one antireflection layer and at least one cleancoat layer, the cleancoat layer typically being the layer furthest removed from the substrate.

The opposite surface of the substrate from the surface comprising the at least one photochromic layer may likewise comprise an ultrathin lens. This ultrathin lens typically also comprises, remote from the substrate, at least one antireflection layer and/or at least one cleancoat layer, more typically at least one antireflection layer and at least one cleancoat layer, where the at least one cleancoat layer is typically the layer furthest removed from the substrate.

Optionally, the opposite surface may comprise at least one layer, for example a coloring layer, between this surface and the at least one ultrathin lens.

The front face and/or the reverse face of the at least one ultrathin lens can each be coated by means of a PVD method and/or a spin-coating method and/or a dip-coating method. The subsequent curing of the coating obtained by the spin-coating method and/or dip-coating method can be effected either thermally or by radiation curing. Typically, this coating is cured by radiation curing.

If both that surface of the substrate comprising the at least one photochromic layer and the opposite surface of the substrate comprise at least one ultrathin lens, these ultrathin lenses typically have the same glass composition. The average thickness of these ultrathin lenses may be the same or different; the average thickness of these ultrathin lenses is typically the same. The surface topography of these ultrathin lenses may be identical or different; the surface topography of these ultrathin lens is typically different.

The opposite surface of the substrate from the surface comprising the at least one photochromic layer typically comprises at least one coloring layer, at least one hardcoat layer, at least one antireflection layer and/or at least one cleancoat layer. More typically, the opposite surface of the substrate from the surface comprising the at least one photochromic layer comprises at least one hardcoat layer, at least one antireflection layer and at least one cleancoat layer, in which case the at least one hardcoat layer is typically the layer closest to the substrate and the at least one cleancoat layer is the layer furthest removed from the substrate.

II.3. Coating Comprising at Least One Photochromic Layer, at Least One Chemically Modified Primer Coat Layer and at Least One Barrier Layer Comprising at Least One Acrylate-Epoxy Layer In a particularly exemplary embodiment, the spectacle lens comprises at least one photochromic layer, at least one chemically modified primer coat layer and at least one barrier layer comprising at least one acrylate-epoxy layer on the same surface of the substrate. In this exemplary embodiment, at least one surface of the substrate to be coated, typically the front face thereof, comprises at least one photochromic layer, at least one acrylate-epoxy layer and at least one chemically modified layer. The at least one acrylate-epoxy layer and the at least one chemically modified layer are typically remote from the substrate in the layer sequence in relation to the at least one photochromic layer. The at least one chemically modified layer here is typically the layer furthest removed from the substrate. More typically, at least one surface of the substrate to be coated, typically the front face thereof, comprises at least one photochromic layer, at least one acrylate-epoxy layer, at least one chemically modified layer and at least one hardcoat layer. The at least one acrylate-epoxy layer, the at least one chemically modified layer and the at least one hardcoat layer here are typically remote from the substrate in the layer sequence in relation to the at least one photochromic layer. The at least one acrylate-epoxy layer here is typically the layer closest to the substrate, and the at least one hardcoat layer is the layer furthest removed from the substrate. The at least one chemically modified layer, in this particularly exemplary embodiment, typically comprises at least one chemically modified primer coat layer as already described above in the section "I. Coating comprising at least one photochromic layer and at least one chemically modified layer on the same surface of the substrate", called "I. chemically modified layer" hereinafter. The at least one hardcoat layer used is typically one of the hardcoat layers described above in the section "I. chemically modified layer". Optionally, the surface of the substrate comprising the at least one photochromic layer may further comprise at least one electrically conductive or semiconductive layer, at least one antireflection layer, at least one antifog layer and/or at least one cleancoat layer. The at least one electrically conductive or semiconductive layer may be part of the at least one antireflection layer. In the presence of at least one antireflection layer, at least one antifog layer and/or at least one cleancoat layer, the at least one antifog layer or the at least one cleancoat layer is the layer furthest removed from the substrate. If just one of the surfaces of the substrate comprises a photochromic layer and the opposite surface does not comprise any photochromic layer, this opposite surface may comprise at least one hardcoat layer, at least one antireflection layer, at least one electrically conductive or semiconductive layer which is optionally part of the at least one antireflection layer, at least one coloring layer, at least one polarizing layer, at least one antifog layer and/or at least one cleancoat layer. Typically, the opposite surface comprises at least one hardcoat layer, more typically at least one hardcoat layer and at least one antireflection layer, and most typically at least one hardcoat layer, at least one antireflection layer and at least one cleancoat layer. The antireflection layer here, or at least one cleancoat layer if present, is the layer furthest removed from the substrate. Alternatively, the opposite surface may comprise an ultrathin lens, typically at least one ultrathin lens and at least one antireflection layer, in which case the at least one antireflection layer is remote from the substrate in relation to the at least one ultrathin lens. Further alternatively, the opposite surface may comprise at least one ultrathin lens, at least one antireflection layer and at least one cleancoat layer, in which case the at least one antireflection layer and the at least one cleancoat layer are remote from the substrate in relation to the at least one ultrathin lens, and the at least one cleancoat layer is the layer furthest remote from the substrate. Ultrathin lenses are described in detail in the above section "II.2. Barrier layer comprising at least one ultrathin lens". Optionally, the opposite surface may comprise at least one coloring layer between this surface and the at least one ultrathin lens.

The at least one barrier layer comprising at least one acrylate-epoxy layer is typically produced using a coating composition comprising
  a) at least one acrylate and/or at least one methacrylate,
  b) at least one epoxy compound,
  c) at least one colloidal inorganic oxide, hydroxide, oxide hydrate, fluoride and/or oxyfluoride that has optionally been surface-modified,
  d) at least one solvent,
  e) at least one photoinitiator and
  f) optionally at least one additive.

The total proportion of at least one acrylate and/or at least one methacrylate in the coating composition usable for production of the at least one barrier layer comprising at least one acrylate epoxy layer is typically within a range from 4.0% by weight to 25.0% by weight, further typically within a range from 5.1% by weight to 24.7% by weight, further typically within a range from 5.9% by weight to 24.2% by weight, more typically within a range from 6.1% by weight to 23.9% by weight and most typically within a range from 6.5% by weight to 23.1% by weight, based in each case on the total weight of the coating composition. The total proportion here is based on the use of at least one type of acrylate or on the use of at least one type of methacrylate or on the use of a mixture of at least one type of acrylate and at least one type of methacrylate.

The at least one acrylate or the at least one methacrylate is typically an acrylate having at least two acrylate groups or a methacrylate having at least two methacrylate groups. The at least one acrylate and/or the at least one methacrylate may also be a mixture of differently functional acrylates and/or differently functional methacrylates. For example, at least one difunctional acrylate may be in a mixture with at least one tetrafunctional acrylate, or at least two different trifunctional acrylates with at least one tetrafunctional methacrylate, or at least one trifunctional methacrylate with at least one further, different trifunctional methacrylate.

For example, the difunctional acrylate or difunctional methacrylate used may be ethylene glycol diacrylate (CAS No. 2274-11-5), diethylene glycol diacrylate (CAS No. 2274-11-5), triethylene glycol diacrylate (CAS No. 1680-21-3), tetraethylene glycol diacrylate (CAS No. 17831-71-9), ethylene glycol dimethacrylate (CAS No. 97-90-5), diethylene glycol dimethacrylate (CAS No. 2358-84-1), triethylene glycol dimethacrylate (CAS No. 109-16-0), tetraethylene glycol dimethacrylate (CAS No. 109-17-1), polyethylene glycol 200 dimethacrylate (CAS No. 25852-47-2), dipropylene glycol diacrylate (CAS No. 57472-68-1), tripropylene glycol diacrylate (CAS No. 42978-66-5), butane-1,3-diol diacrylate (CAS No. 19485-03-1), butane-1,4-diol diacrylate (CAS No. 1070-70-8), hexane-1,6-diol diacrylate (CAS No. 13048-33-4), neopentyl glycol diacrylate (CAS No. 2223-82-7), butane-1,3-diol dimethacrylate (CAS No. 1189-08-8), butane-1,4-diol dimethacrylate (CAS No. 2082-81-7), hexane-1,6-diol dimethacrylate (CAS No. 6606-59-3), 3-(acryloyloxy)-2-hydroxypropyl methacrylate (CAS No. 1709-71-3), poly(ethylene glycol) diacrylate (CAS No. 26570-48-9), bisphenol A ethoxylate diacrylate (CAS No. 64401-02-1), tricyclo[5.2.1.0$^{2,6}$]decanedimethanol diacrylate (CAS No. 42594-17-2), and/or mixtures thereof.

The difunctional acrylate or difunctional methacrylate used is typically polyethylene glycol 200 dimethacrylate, ethylene glycol dimethacrylate, diethylene glycol dimethacrylate, butane-1,4-diol dimethacrylate and/or mixtures thereof, more typically ethylene glycol dimethacrylate, diethylene glycol dimethacrylate and/or mixtures thereof.

The trifunctional acrylate or trifunctional methacrylate used may be trimethylolpropane trimethacrylate (CAS No. 3290-92-4), trimethylolpropane triacrylate (CAS No. 15625-89-5), pentaerythritol triacrylate (CAS No. 3524-68-3), pentaerythritol propoxylate triacrylate (CAS No. 145611-81-0), trimethylolpropane propoxylate triacrylate (CAS No. 53879-54-2), trimethylolpropane ethoxylate triacrylate (CAS No. 28961-43-5), tris[2-(acryloyloxy)ethyl] isocyanurate (CAS No. 40220-08-4) and/or mixtures thereof.

The trifunctional acrylate or trifunctional methacrylate used is typically trimethylolpropane trimethacrylate, pentaerythritol triacrylate and/or mixtures thereof, more typically trimethylolpropane trimethacrylate.

The tetrafunctional acrylate or tetrafunctional methacrylate used may, for example, be di(trimethylolpropane) tetraacrylate (CAS No. 94108-97-1), pentaerythritol tetraacrylate (CAS No. 4986-89-4), pentaerythritol tetramethacrylate (CAS No. 3253-41-6) and/or mixtures thereof. The tetrafunctional acrylate or tetrafunctional methacrylate used is typically di(trimethylolpropane) tetraacrylate, pentaerythritol tetramethacrylate and/or mixtures thereof, more typically di(trimethylolpropane) tetraacrylate.

For example, the pentafunctional acrylate or pentafunctional methacrylate used may be dipentaerythritol pentaacrylate (CAS No. 60506-81-2).

At least one monofunctional acrylate and/or at least monofunctional methacrylate is optionally used in a mixture with at least one difunctional acrylate and/or with at least one at least difunctional methacrylate. The monofunctional acrylate or monofunctional methacrylate used in such a mixture may, for example, be acrylic acid (CAS No. 79-10-7), methacrylic acid (CAS No. 79-41-4), methyl acrylate (CAS No. 96-33-3), methyl methacrylate (CAS No. 80-62-6), ethyl acrylate (CAS No. 140-88-5), ethyl methacrylate (CAS No. 97-63-2), ethyl 2-ethylacrylate (CAS No. 3070-65-3), (2,2-dimethyl-1,3-dioxolan-4-yl)methyl methacrylate (CAS No. 7098-80-8), 2-phenoxyethyl acrylate (CAS No. 48145-04-6), isobornyl acrylate (CAS No. 5888-33-5), 2-(2-methoxyethoxy)ethyl methacrylate (CAS No. 45103-58-0), 4-acryloylmorpholine (CAS No. 5117-12-4), dodecyl acrylate (CAS No. 2156-97-0), isodecyl acrylate (CAS No. 1330-61-6), decyl acrylate (CAS No. 2156-96-9), n-octyl acrylate (CAS No. 2499-59-4), isooctyl acrylate (CAS No. 29590-42-9), octadecyl acrylate (CAS No. 4813-57-4), tetrahydrofurfuryl acrylate (CAS No. 2399-48-6), 2-(2-ethoxyethoxy)ethyl acrylate (CAS No. 7328-17-8), 4-tert-butylcyclohexyl acrylate (CAS No. 84100-23-2), methoxy poly (ethylene glycol) monoacrylate (CAS No. 32171-39-4), phenoxy polyethylene glycol acrylate (CAS No. 56641-05-5), mono-2-(acryloyloxy)ethyl succinate (CAS No. 50940-49-3), allyl methacrylate (CAS No. 96-05-9) or mixtures thereof.

The monofunctional acrylate or monofunctional methacrylate used in such a mixture is typically acrylic acid, methacrylic acid, methyl acrylate, methyl methacrylate, ethyl acrylate, ethyl methacrylate, 2-phenoxyethyl acrylate, dodecyl acrylate or mixtures thereof, more typically methacrylic acid, methyl methacrylate, ethyl methacrylate or mixtures thereof.

Typically, in such a mixture, the weight ratio of monofunctional acrylate and/or monofunctional methacrylate to an at least difunctional acrylate and/or difunctional methacrylate is 1:7, further typically 1:11, more typically 1:17 and most typically 1:21.

The total proportion of at least one epoxy compound in the coating composition usable for production of the at least one barrier layer comprising at least one acrylate epoxy layer is typically within a range from 20.0% by weight to 25.0% by weight, further typically within a range from 21.3% by weight to 24.8% by weight, further typically within a range from 21.9% by weight to 23.9% by weight, more typically within a range from 22.2% by weight to 23.7% by weight and most typically within a range from 22.6% by weight to 23.4% by weight, based in each case on the total weight of the coating composition. The total proportion is based here on the use of at least one type of epoxy compound or on the use of a mixture of different epoxy compounds.

The at least one epoxy compound is typically an epoxy compound having at least two epoxy groups. It may also be a mixture of epoxy compounds having a different number of epoxy groups and/or a mixture of epoxy compounds having the same number of epoxy groups but a different type of epoxy compound. For example, in each case, at least one trifunctional epoxy compound may be present in a mixture with at least one tetrafunctional epoxy compound, or a tetrafunctional epoxy compound with at least one further, different tetrafunctional epoxy compound, or at least one difunctional epoxy compound with at least one trifunctional epoxy compound and with at least one tetrafunctional epoxy compound.

The difunctional epoxy compound used in the coating composition for production of the at least one barrier layer comprising at least one acrylate-epoxy layer may, for example, be diglycidyl ether (CAS No. 2238-07-5), ethylene glycol diglycidyl ether (CAS No. 2224-15-9), diethylene glycol diglycidyl ether (CAS No. 4206-61-5), propylene glycol diglycidyl ether (CAS No. 16096-30-3), dipropylene glycol diglycidyl ether (CAS No. 41638-13-5), butane-1,4-diol diglycidyl ether (CAS No. 2425-79-8), cyclohexane-1, 4-dimethanol diglycidyl ether (CAS No. 14228-73-0), neopentyl glycol diglycidyl ether (CAS No. 17557-23-2), polypropylene glycol (400) diglycidyl ether (CAS No. 26142-30-3), hexane-1,6-diol diglycidyl ether (CAS No. 16096-31-4), bisphenol A diglycidyl ether (CAS No. 1675-54-3), bisphenol A propoxylate diglycidyl ether (CAS No. 106100-55-4), polyethylene glycol diglycidyl ether (CAS No. 72207-80-8), glycerol diglycidyl ether (CAS No. 27043-36-3), resorcinol diglycidyl ether (CAS No. 101-90-6) and/or mixtures thereof.

The difunctional epoxy compound used in the coating composition is typically diglycidyl ether, ethylene glycol diglycidyl ether, diethylene glycol diglycidyl ether, butane-1,4-diol diglycidyl ether, polyethylene glycol diglycidyl ether, polypropylene glycol (400) diglycidyl ether and/or mixtures thereof, more typically ethylene glycol diglycidyl ether, diethylene glycol diglycidyl ether, butane-1,4-diol diglycidyl ether, polyethylene glycol diglycidyl ether and/or mixtures thereof.

The trifunctional epoxy compound used in the coating composition for production of the at least one barrier layer comprising at least one acrylate-epoxy layer may, for example, be trimethylolethane triglycidyl ether (CAS No. 68460-21-9), trimethylolpropane triglycidyl ether (CAS No. 30499-70-8), triphenylolmethane triglycidyl ether (CAS No. 66072-38-6), tris(2,3-epoxypropyl) isocyanurate (CAS No. 2451-62-9), tris(4-hydroxyphenyl)methane triglycidyl ether (CAS No. 66072-38-6), 1,1,1-tris(4-hydroxyphenyl)ethane triglycidyl ether (CAS No. 87093-13-8), glycerol triglycidyl ether (CAS No. 13236-02-7), glycerol propoxylate triglycidyl ether (CAS No. 37237-76-6), N,N-diglycidyl-4-glycidyloxyaniline (CAS No. 5026-74-4) and/or mixtures thereof.

The trifunctional epoxy compound used in the coating composition is typically trimethylolpropane triglycidyl ether, tris(2,3-epoxypropyl) isocyanurate, glycerol triglycidyl ether, glycerol propoxylate triglycidyl ether and/or mixtures thereof, more typically tris(2,3-epoxypropyl) isocyanurate, glycerol triglycidyl ether and/or mixtures thereof.

The tetrafunctional epoxy compound used in the coating composition for production of the at least one barrier layer comprising at least one acrylate-epoxy layer may, for example, be pentaerythritol tetraglycidyl ether (CAS No. 3126-63-4), dipentaerythritol tetraglycidyl ether, tetraglycidylbenzylethane, sorbitol tetraglycidyl ether, tetraglycidyldiaminophenylmethane, tetraglycidylbisaminomethylcyclohexane and/or mixtures thereof.

The tetrafunctional epoxy compound used in the coating composition is typically pentaerythritol tetraglycidyl ether (CAS No. 3126-63-4), dipentaerythritol tetraglycidyl ether, sorbitol tetraglycidyl ether and/or mixtures thereof, more typically pentaerythritol tetraglycidyl ether (CAS No. 3126-63-4), dipentaerythritol tetraglycidyl ether and/or mixtures thereof.

At least one monofunctional epoxy compound is optionally used in a mixture with at least one further difunctional epoxy compound. The monofunctional epoxy compound used in the above-described mixture may, for example, be ethyl glycidyl ether (CAS No. 4016-11-9), n-butyl glycidyl ether (CAS No. 2426-08-6), 2-ethylhexyl glycidyl ether (CAS No. 2461-15-6), C8-C10 glycidyl ether (CAS No. 68609-96-1), C12-C14 glycidyl ether (CAS No. 68609-97-2), cresyl glycidyl ether (CAS No. 2210-79-9), p-tert-butylphenyl glycidyl ether (CAS No. 3101-60-8), nonylphenyl glycidyl ether (CAS No. 147094-54-0), benzyl glycidyl ether (CAS No. 2930-05-4), phenyl glycidyl ether (CAS No. 122-60-1), bisphenol A 2,3-dihydroxypropyl glycidyl ether (CAS No. 76002-91-0) and/or mixtures thereof. The monofunctional epoxy compound used in the above-described mixture is typically ethyl glycidyl ether, n-butyl glycidyl ether, 2-ethylhexyl glycidyl ether and/or mixtures thereof. If a mixture of at least one monofunctional epoxy compound and at least one at least difunctional epoxy compound is used, the weight ratio of the at least one monofunctional epoxy compound to the at least one at least difunctional epoxy compound is typically 1:2, further typically 1:9, more typically 1:13 and most typically 1:17.

More typically, the coating composition for production of the at least one barrier layer comprising at least one acrylate-epoxy layer comprises at least one trifunctional acrylate and/or at least one trifunctional methacrylate, typically at least one tetrafunctional acrylate and/or at least one tetrafunctional methacrylate, and at least one difunctional epoxy compound, typically a trifunctional epoxy compound. The total proportion of at least one trifunctional acrylate and/or at least one trifunctional methacrylate, typically at least one tetrafunctional acrylate and/or at least one tetrafunctional methacrylate, and at least one difunctional epoxy compound, typically a trifunctional epoxy compound, here is typically within a range from 21% by weight to 40% by weight, further typically within a range from 23% by weight to 39% by weight, more typically within a range from 25% by weight to 38% by weight and most typically 28% by weight to 37% by weight, based in each case on the total weight of the coating composition. The ratio of at least one trifunctional acrylate and/or at least one trifunctional methacrylate, typically at least one tetrafunctional acrylate and/or at least one tetrafunctional methacrylate, to at least one difunctional epoxy compound, typically a trifunctional epoxy compound, here is typically 1:3, more typically 1:2.

The total proportion of at least one colloidal inorganic oxide, hydroxide, oxide hydrate, fluoride and/or oxyfluoride in the coating composition usable for production of the at least one barrier layer comprising at least one acrylate epoxy layer is typically within a range from 4.0% by weight to 45.0% by weight, further typically within a range from 4.3% by weight to 43.8% by weight, further typically within a range from 4.7% by weight to 36.9% by weight, more typically within a range from 5.1% by weight to 35.6% by weight and most typically within a range from 6.2% by weight to 32.3% by weight, based in each case on the total weight of the coating composition. Especially typically, the coating composition usable for production of the at least one barrier layer comprising at least one acrylate-epoxy layer comprises at least one colloidal inorganic oxide, hydroxide, oxide hydrate, fluoride and/or oxyfluoride in a total proportion from a range from 14.2% by weight to 21.3% by weight, based on the total weight of the coating composition. The total proportion is based here on the use of at least one type of colloidal inorganic oxide, hydroxide, oxide hydrate, fluoride and/or oxyfluoride or on the use of a mixture of different colloidal inorganic oxides, hydroxides, oxide hydrates, fluorides and/or oxyfluorides. Colloidal inorganic oxides, hydroxides, oxide hydrates, fluorides and/or oxyfluorides are described in detail in the above section "I. chemically modified layer". The at least one colloidal inorganic oxide, hydroxide, oxide hydrate, fluoride and/or oxyfluoride may optionally have surface modification. This surface modification may comprise, for example, at least one acrylate, at least one methacrylate and/or at least one epoxy compound.

Most typically, the coating composition for production of the at least one barrier layer comprising at least one acrylate epoxy layer comprises at least one trifunctional acrylate and/or at least one trifunctional methacrylate, typically at least one tetrafunctional acrylate and/or at least one tetrafunctional methacrylate, at least one difunctional epoxy compound, typically a trifunctional epoxy compound, and at least one colloidal metal oxide, metal hydroxide and/or metal oxide hydrate of or including titanium, typically $TiO_2$, of or including silicon, typically $SiO_2$, of or including zirconium, typically $ZrO_2$, typically a colloidal metal oxide, metal hydroxide, metal oxide hydrate of or including silicon, most typically $SiO_2$. The total proportion of at least one trifunctional acrylate and/or at least one trifunctional methacrylate, typically at least one tetrafunctional acrylate and/or at least one tetrafunctional methacrylate, at least one difunctional epoxy compound, typically a trifunctional epoxy compound, and at least one colloidal metal oxide, metal hydroxide and/or metal oxide hydrate here is typically within a range from 40% by weight to 59% by weight, further typically within a range from 42% by weight to 57% by weight, more typically within a range from 44% by weight to 54.8% by weight and most typically 45% by weight to 53.9% by weight, based in each case on the total weight of the coating composition. The ratio of at least one trifunctional acrylate and/or at least one trifunctional methacrylate, typically at least one tetrafunctional acrylate and/or at least one tetrafunctional methacrylate, to at least one difunctional epoxy compound, typically a trifunctional epoxy compound, to at least one colloidal metal oxide, metal hydroxide and/or metal oxide hydrate here is typically 1:3:1, more typically 1:2:1.

The total proportion of at least one photoinitiator in the coating composition usable for production of the at least one barrier layer comprising at least one acrylate epoxy layer is typically within a range from 1.5% by weight to 4.0% by weight, further typically within a range from 1.6% by weight to 3.7% by weight, further typically within a range from 1.9% by weight to 3.3% by weight, more typically within a range from 2.0% by weight to 2.7% by weight and most typically within a range from 2.2% by weight to 2.4% by weight, based in each case on the total weight of the coating composition. The total proportion is based here on the use of at least one type of photoinitiator or on the use of a mixture of different photoinitiators.

As at least one photoinitiator may be used, for example, benzophenone (CAS No. 119-61-9), 2-methylbenzophenone (CAS No. 131-58-8), 4-methylbenzophenone (CAS No. 134-84-9), 4,4'-bis(dimethylamino)benzophenone (CAS No. 90-94-8), benzoin (CAS No. 119-53-9), benzoin methyl ether (CAS No. 3524-62-7), benzoin isopropyl ether (CAS No. 6652-28-4), 2,2-dimethoxy-1,2-diphenylethan-1-one (CAS No. 24650-42-8), phenylbis(2,4,6-trimethylbenzoyl)phosphine oxide (CAS No. 162881-26-7), ethyl 2,4,6-trimethylbenzoylphenylphosphinate (CAS No. 84434-11-7), 2-methyl-1-[4-(methylthio)phenyl]-2-(4-morpholinyl)-1-propanone (CAS No. 71868-10-5), 2-hydroxy-2-methyl-1-phenyl-1-propanone (CAS No. 7473-98-5), 2-(dimethylamino)-1-(4-(4-morpholinyl)phenyl)-2-(phenylmethyl)-1-butanone (CAS No. 119313-12-1), diphenyl(2,4,6-trimethylbenzoyl)phosphine oxide (CAS No. 75980-60-8), triarylsulfonium hexafluorophosphate salts (CAS No. 109037-77-6), triarylsulfonium hexafluoroantimonate salts (CAS No. 109037-75-4) or mixtures thereof. The at least one photoinitiator used in the coating composition for production of the at least one barrier layer comprising at least one acrylate-epoxy layer may be benzophenone, 2,2-dimethoxy-1,2-diphenylethan-1-one, phenylbis(2,4,6-trimethylbenzoyl)phosphine oxide, diphenyl(2,4,6-trimethylbenzoyl)phosphine oxide, triarylsulfonium hexafluorophosphate salts or mixtures thereof, more typically 2,2-dimethoxy-1,2-diphenylethan-1-one, phenylbis(2,4,6-trimethylbenzoyl)phosphine oxide, diphenyl(2,4,6-trimethylbenzoyl)phosphine oxide and/or mixtures thereof.

The total proportion of at least one additive optionally present in the coating composition usable for production of the at least one barrier layer comprising at least one acrylate epoxy layer is typically within a range from 0.05% by weight to 1.9% by weight, further typically within a range from 0.07% by weight to 1.6% by weight, further typically within a range from 0.08% by weight to 1.4% by weight, more typically within a range from 0.09% by weight to 1.2% by weight and most typically within a range from 0.1% by weight to 1.0% by weight, based in each case on the total weight of the coating composition. The total proportion is based here on the use of at least one type of additive or on the use of a mixture of different additives.

The adhesive used in the coating composition for production of the at least one barrier layer comprising at least one acrylate-epoxy layer may, for example, be a dispersant, and antisettling agent, a wetting agent, including an anti-crater additive or a leveling additive, a biocide and/or a UV absorber. The additive used in the coating composition is typically at least one wetting agent.

The coating composition usable for production of the at least one barrier layer comprising at least one acrylate-epoxy layer further comprises at least one solvent. The at least one solvent is used in the coating composition in a proportion to make it up to 100% by weight. The coating composition typically comprises at least one organic solvents having a low boiling point of <100° C. at standard pressure and at least one organic solvent having a moderate boiling point from a range from 100° C. to 150° C. at standard pressure. Examples of organic solvents having a low boiling point that may be used include methanol, ethanol, 1-propanol, 2-propanol, tert-butanol, acetone, diethyl ether, tert-butyl methyl ether, tetrahydrofuran, chloroform, 1,2-dichloroethane, methylene chloride, cyclohexane, ethyl acetate, n-hexane, n-heptane and/or methyl ethyl ketone. Preferred organic solvents having a low boiling point are methanol, ethanol, 1-propanal and/or 2-propanol.

Examples of organic solvents having a moderate boiling point that may be used include 1-methoxy-2-propanol, 1-butanol, dibutyl ether, 1,4-dioxane, 3-methyl-1-butanol, 4-hydroxy-4-methyl-2-pentanone, methyl isobutyl ketone and/or toluene. Preferred solvents having a moderate boiling point are 1-methoxy-2-propanol and/or methyl isobutyl ketone.

The weight ratio of the at least one organic solvent having a low boiling point to at least one organic solvent having a moderate boiling point is typically 1:1.3, typically 1:1.6, more typically 1:1.7 and most typically 1:1.8.

The average layer thickness of the at least one barrier layer comprising at least one acrylate-epoxy layer after application and drying is typically within a range from 2.7 µm to 5.1 µm, further typically within a range from 2.9 µm to 4.9 µm, more typically within a range from 3.0 µm to 4.7 µm and most typically within a range from 3.1 µm to 4.7 µm. The average layer thickness is typically determined analogously to the average layer thickness of the at least one chemically modified primer coat layer by means of measurement of spectral reflectivity and/or spectral transmissivity. The measuring instrument used to determine the average thickness is particularly typically the F10-HC optical spectrometer (from Filmetrics Inc.).

By contrast with the acrylate-based radiation-cured layer having a layer thickness of 2 µm to 20 µm described in EP 1 461 644 A1, the above-described barrier layer comprising at least one acrylate-epoxy layer displays its barrier action in spite of a very small layer thickness in interplay with the chemically modified primer coat layer on account of its mechanical flexibility, which effectively brings about mechanical decoupling of the substrate with the photochromic layer applied thereon and the subsequent hardcoat and antireflection layer. By virtue of this mechanical decoupling, the outer hardcoat layer and antireflection layer "float" atop the mechanically flexible barrier layer in interplay with the chemically modified primer coat layer, such that active forces that would actually cause damage to the layer relax within the mechanically flexible barrier layer in interplay with the chemically modified primer coat layer without causing damage.

There follows a further elucidation of at least one barrier layer present on the same surface of the substrate as the photochromic layer and further remote from the substrate in relation to the at least one photochromic layer with reference to various exemplary embodiments. If the front face of the substrate comprises at least one photochromic layer, the at least one barrier layer is further to the object side in relation to the photochromic layer. If the reverse face of the substrate comprises at least one photochromic layer, the at least one barrier layer is further to the eye side in relation to the photochromic layer. The barrier layer may be the outermost layer of the spectacle lens. There is typically at least one further layer atop the at least one barrier layer remote from the substrate in each case.

III. Coating Comprising at Least One Photochromic Layer and at Least One Barrier Layer on the Same Surface of the Substrate There follows a further elucidation of at least one barrier layer present on the same surface of the substrate as the photochromic layer and further remote from the substrate in relation to the at least one photochromic layer with reference to various exemplary embodiments. In these exemplary embodiments, the layer sequence typically does not comprise any chemically modified layer as defined within the scope of this disclosure. If the front face of the substrate comprises at least one photochromic layer, the at least one barrier layer is further to the object side in relation to the photochromic layer. If the reverse face of the substrate comprises at least one photochromic layer, the at least one barrier layer is further to the eye side in relation to the photochromic layer. The barrier layer may be the outermost layer of the spectacle lens. There is typically at least one layer atop the at least one barrier layer remote from the substrate in each case.

III.1. Coating Comprising at Least One Photochromic Layer and at Least One Barrier Layer Comprising at Least One Hardcoat Layer on the Same Surface of the Substrate In one exemplary embodiment, the spectacle lens comprises at least one photochromic layer and at least one barrier layer comprising at least one hardcoat layer on the same surface of the substrate. In this exemplary embodiment, at least one surface of the substrate, typically the front face of the substrate, comprises at least one photochromic layer and at least one barrier layer comprising at least one hardcoat layer, where the at least one barrier layer is remote from the substrate in the layer sequence in relation to the at least one photochromic layer. The at least one barrier layer in this exemplary embodiment typically comprises at least one of the hardcoat layers that have already been described above in the section "I. chemically modified layer". Alternatively, the at least one barrier layer may also comprise at least one primer coat layer and at least one of the hardcoat layers that have already been described above in the section "I. chemically modified layer". The at least one primer coat layer may comprise one of the primer coat layers described in the section "II.1. Coating comprising at least one photochromic layer, at least one chemically modified primer coat layer and at least one barrier layer comprising at least one hardcoat layer on the same surface of the substrate", called "III. Barrier layer comprising at least one hardcoat layer" hereinafter. In the latter case, the at least one hardcoat layer is disposed on the outside, i.e., further removed from the substrate, in relation to the at least one primer coat layer.

In this exemplary embodiment, typically at least one surface of the substrate, typically the front face thereof, comprises a) typically at least one photochromic layer, at least one hardcoat layer 1, at least one primer coat layer and at least one hardcoat layer 2. The at least one hardcoat layer 2 here typically serves to increase scratch resistance and to increase chemical stability of the spectacle lens. In addition, the at least one hardcoat layer 2 may act as barrier layer, but only in those regions of the hardcoat layer 2 that are intact, i.e., undamaged. The at least one hardcoat layer 2 may have instances of minor damage over the course of time, for example microscratches, that can arise in the course of everyday use of the spectacles during of the total wearing period of a pair of spectacles of typically two to four years. In the region of the instances of minor damage, the at least one hardcoat layer 2 can no longer act as barrier layer. The at least one hardcoat layer 1 typically serves here as at least one barrier layer. The at least one hardcoat layer 1 also serves, in addition to the at least one hardcoat layer 2, to increase scratch resistance and to increase chemical stability, especially in those regions in which the at least one hardcoat layer 2 has instances of minor damage. The average layer thickness of the at least one hardcoat layer 1 and the average layer thickness of the at least one hardcoat layer 2 may be identical or different. The average layer thickness of the at least one hardcoat layer 1 is typically different than the average layer thickness of the at least one hardcoat layer 2. The average layer thickness of the at least one hardcoat layer 1 is typically within a range from 1.6 µm to 5.1 µm, further typically within a range from 2.0 µm to 4.9 µm, more typically within a range from 2.2 µm to 4.5 µm and most typically within a range from 2.3 µm to 4.0 µm. The average layer thickness of the at least one hardcoat layer 2 is typically within a range from 0.8 µm to 4.3 µm, further typically within a range from 1.3 µm to 3.8 µm, more typically within a range from 1.6 µm to 3.2 µm and most typically within a range from 2.0 µm to 2.8 µm. The at least one hardcoat layer 1 and the at least one hardcoat layer 2 can be produced using the same or a different composition. The at least one hardcoat layer 1 and the at least one hardcoat layer 2 are typically produced using an identical composition. The average layer thickness of the at least one primer coat layer is typically within a range from 0.3 µm to 1.4 µm, further typically within a range from 0.4 µm to 1.3 µm, more typically within a range from 0.5 µm to 1.2 µm and most typically within a range from 0.6 µm to 1.1 µm. The hardcoat layer 2 in this layer sequence a) is the layer furthest removed from the surface of the substrate, typically the outermost layer on the object side on the front face of the substrate in this layer sequence a). The front face of the substrate especially typically comprises a layer sequence a) comprising exactly one photochromic layer, exactly one hardcoat layer 1, exactly one primer coat layer and exactly one hardcoat layer 2; or b) more typically at least one photochromic layer, at least one primer coat layer 1, at least one hardcoat layer 1, at least one primer coat layer 2 and at least one hardcoat layer 2. The at least one hardcoat layer 2 here typically serves to increase scratch resistance and to increase chemical stability of the spectacle lens. As already disclosed above for the layer sequence described under a), the at least one hardcoat layer 2 may additionally act as barrier layer. The at least one hardcoat layer 1 typically serves here as at least one barrier layer. The at least one hardcoat layer 1, as described above for layer sequence a), also serves to increase scratch resistance and to increase chemical stability. Here too, the at least one hardcoat layer 1 and the at least one hardcoat layer 2 can be produced using an identical or different composition. The composition usable for production of the at least one hardcoat layer 1 is typically identical to the composition usable for production of the at least one hardcoat layer 2. The average layer thickness of the at least one hardcoat layer 1 may be identical to or different than the average layer thickness of the at least one hardcoat layer 2. The average layer thickness of the at least one hardcoat layer 1 is typically identical to the average layer thickness of the at least one hardcoat layer 2. The average layer thickness of the at least one hardcoat layer 1 and of the at least one hardcoat layer 2 are typically each within a range from 1.6 µm to 4.7 µm, further typically within a range from 1.7 µm to 4.4 µm, more typically within a range from 1.9 µm to 4.2 µm and most typically within a range from 2.0 µm to 4.1 µm. The coating composition for production of the at least one primer coat layer 1 and the coating composition for production of the at least one primer coat layer 2 may be identical or different. The coating composition for production of the at least one primer coat layer 1 may be identical to the coating composition for production of the at least one primer coat layer 2. The average layer thickness of the primer coat layer 1 and the average layer thickness of the primer coat layer 2 may be identical or different. The average layer thickness of the primer coat layer 1 is typically identical to the average layer thickness of the primer coat layer 2. The average layer thickness of the primer coat layer 1 and the average layer thickness of the primer coat layer 2 are typically each within a range from 0.3 µm to 1.6 µm, further typically within a range from 0.4 µm to 1.3 µm, more typically within a range from 0.5 µm to 1.2 µm and most typically within a range from 0.6 µm to 1.1 µm. The hardcoat layer 2 in this layer sequence b) is the layer furthest removed from the surface of the substrate, typically the outermost layer on the object side on the front face of the substrate in this layer sequence b). The front face of the substrate more typically comprises a layer sequence b) comprising exactly one photochromic layer, exactly one primer coat layer 1, exactly one hardcoat layer 1, exactly one primer coat layer 2 and exactly one hardcoat layer 2.

The composition used for production of the at least one hardcoat layer 1 or of the at least one hardcoat layer 2 may be one of the compositions for production of the hardcoat layer that are described in the above section "I. chemically modified layer". The coating composition used for the production of the at least one primer coat layer may be one of the compositions described above in section "II.1. Barrier layer comprising at least one hardcoat layer".

The average thickness of the respective layer is typically determined after application and drying thereof by means of the test method described for the respective layer above.

In this exemplary embodiment, the surface of the substrate covered by at least one barrier layer or by the above-detailed preferred layer sequences a) and b), typically the front face thereof adjoining the at least one barrier layer or adjoining the at least one hardcoat layer 2, remotely from the substrate, may also optionally comprise at least one antireflection layer, at least one electrically conductive or semiconductive layer, at least one antifog layer and/or at least one cleancoat layer. The at least one electrically conductive or semiconductive layer here may be part of the at least one antireflection layer. The coating typically comprises, remote from the substrate, adjoining the barrier layer furthest removed from the substrate or adjoining the hardcoat layer 2, at least one antireflection layer, more typically at least one antireflection layer and at least one cleancoat layer, in which latter case the cleancoat layer is the layer furthest removed from the substrate. In aforementioned preferred layer sequences a) and b), it is also possible for there to be at least one further layer between the layers explicitly detailed in each case. There is typically no further layer present between the individual layers detailed explicitly in aforementioned preferred layer sequences a) and b). Moreover, there may also be at least one further layer between the surface of the substrate and the at least one photochromic layer. Typically disposed facing the substrate and directly adjoining the at least one photochromic layer is at least one primer layer, more typically the polyurethane resin layer disclosed in EP 1 602 479 A1, especially in EP 1 602 479 A1, claim 1. If the layer sequence comprises at least one coloring layer and/or at least one polarizing layer, in this exemplary embodiment too, the layer sequence specified in the section "I. chemically modified layer" between the surface of the substrate, typically the front face thereof, and the at least one photochromic layer is applicable. As an alternative to the application of at least one coloring layer to at least one surface of the substrate, typically the front face of the substrate, the substrate may be colored in this exemplary embodiment too.

In this exemplary embodiment too, that surface of the substrate not covered by at least one photochromic layer typically comprises at least one hardcoat layer, at least one antireflection layer, at least one electrically conductive or semiconductive layer that is optionally part of the antireflection layer, at least one antifog layer and/or at least one cleancoat layer. Further typically, that surface of the substrate which is not covered by at least one photochromic layer typically comprises at least one hardcoat layer, more typically at least one hardcoat layer and at least one antireflection layer, and most typically at least one hardcoat layer, at least one antireflection layer and at least one cleancoat layer. The at least one antireflection layer is the layer furthest remote from the substrate or, in the presence of at least one cleancoat layer, the at least one cleancoat layer is the layer furthest remote from the substrate. Alternatively, that surface of the substrate which is not covered by the at least one photochromic layer may comprise at least one ultrathin lens and at least one antireflection layer, in which case the at least one antireflection layer is typically remote from the substrate in relation to the at least one ultrathin lens. As a further alternative, that surface of the substrate which is not covered by at least one photochromic layer may comprise at least one ultrathin lens, at least one antireflection layer and at least one cleancoat layer, in which case the at least one antireflection layer and the at least one cleancoat layer are typically remote from the substrate in relation to the at least one ultrathin lens and the cleancoat layer is typically the layer furthest removed from the substrate. Ultrathin lenses are described in detail in section "II.2. Barrier layer comprising at least one ultrathin lens". Optionally, there may be at least one layer, typically a coloring layer, between the substrate surface and the ultrathin lens. In this exemplary embodiment, the composition for production of the at least one hardcoat layer on the surface of the substrate that does not include a photochromic layer may be identical to or different than the composition for production of the at least one hardcoat layer present on the same surface of the substrate as the at least one photochromic layer. If the surface of the substrate comprising at least one photochromic layer comprises more than one hardcoat layer, as described above in the preferred layer sequences a) and b) of this exemplary embodiment, the composition for production of the at least one hardcoat layer on that surface of the substrate that does not include a photochromic layer may be identical to or different than any of the compositions for production of the hardcoat layers or identical to or different than at least one of the compositions of the hardcoat layers. Typically, all compositions that are used for production of all hardcoat layers of the spectacle lens are identical. This facilitates the coating process firstly in that there is no need to make up, or keep stock of, different compositions for each hardcoat layer to be applied. Secondly, the hardcoat layer, in the case of use of identical compositions, can also be applied by means of dip-coating. Irrespective of which of the surfaces of the substrate the hardcoat layer is present on, the composition for production of the at least one hardcoat layer is described in section "I. chemically modified layer".

III.2. Coating Comprising at Least One Photochromic Layer and at Least One Barrier Layer Comprising at Least One Ultrathin Lens on the Same Surface of the Substrate In one exemplary embodiment, the spectacle lens comprises at least one photochromic layer and at least one barrier layer comprising at least one ultrathin lens. In this exemplary embodiment, at least one surface of the substrate, typically the front face thereof, comprises at least one photochromic layer and at least one barrier layer comprising at least one ultrathin lens. The at least one barrier layer is disposed remotely from the substrate in relation to the at least one photochromic layer. Ultrathin lenses are described in detail in section "II.2. Barrier layer comprising at least one ultrathin lens". Alternatively, in this exemplary embodiment, at least one surface of the substrate, typically the front face thereof, can comprise at least one photochromic layer, at least one primer coat layer and at least one barrier layer comprising at least one ultrathin lens. In this alternative, the at least one barrier layer comprising at least one ultrathin lens is the layer furthest remote from the substrate. The coating composition used for the production of the at least one primer coat layer may be one of the compositions described above in section "II.1. Barrier layer comprising at least one hardcoat layer", with one of the average layer thicknesses disclosed therein. At least one surface of the substrate, typically the front face thereof, typically comprises at least one photochromic layer and at least one ultrathin lens. The at least one ultrathin lens here is disposed remotely from the substrate in relation to the at least one photochromic layer.

In this exemplary embodiment, the surface of the substrate covered by at least one barrier layer or by at least one ultrathin lens, typically the front face thereof adjoining the at least one barrier layer or adjoining the at least one ultrathin lens, remotely from the substrate, may also optionally comprise at least one antireflection layer, at least one electrically conductive or semiconductive layer, at least one antifog layer and/or at least one cleancoat layer. The at least one electrically conductive or semiconductive layer here may be part of the at least one antireflection layer. The coating typically comprises, remote from the substrate, adjoining the barrier layer furthest remote from the substrate or adjoining the ultrathin lens, at least one antireflection layer, more typically at least one antireflection layer and at least one cleancoat layer, in which latter case the cleancoat layer is the layer furthest removed from the substrate. In addition, there may be at least one further layer in each case between the at least one photochromic layer and the at least one barrier layer. There is typically no further layer present between the at least one photochromic layer and the at least one barrier layer. In addition, there may also be at least one further layer between the surface of the substrate and the at least one photochromic layer. Typically disposed facing the substrate and directly adjoining the at least one photochromic layer is at least one primer layer, more typically the polyurethane resin layer disclosed in EP 1 602 479 A1, especially in EP 1 602 479 A1, claim 1. If the layer sequence comprises at least one coloring layer and/or at least one polarizing layer, in this exemplary embodiment too, the layer sequence specified in the section "I. chemically modified layer" between the surface of the substrate, typically the front face thereof, and the at least one photochromic layer is applicable. As an alternative to the application of at least one coloring layer to at least one surface of the substrate, typically the front face of the substrate, the substrate may be colored in this exemplary embodiment too.

In this exemplary embodiment too, that surface of the substrate not covered by at least one photochromic layer typically comprises at least one hardcoat layer, at least one antireflection layer, at least one electrically conductive or semiconductive layer that is optionally part of the antireflection layer, at least one antifog layer and/or at least one cleancoat layer. Further typically, that surface of the substrate which is not covered by at least one photochromic layer typically comprises at least one hardcoat layer, more typically at least one hardcoat layer and at least one antireflection layer, and most typically at least one hardcoat layer, at least one antireflection layer and at least one cleancoat layer. The at least one antireflection layer is the layer furthest remote from the substrate or, in the presence of at least one cleancoat layer, the at least one cleancoat layer is the layer furthest remote from the substrate. Alternatively, that surface of the substrate which is not covered by the at least one photochromic layer may comprise at least one ultrathin lens and at least one antireflection layer, in which case the at least one antireflection layer is typically remote from the substrate in relation to the at least one ultrathin lens. As a further alternative, that surface of the substrate which is not covered by at least one photochromic layer may comprise at least one ultrathin lens, at least one antireflection layer and at least one cleancoat layer, in which case the at least one antireflection layer and the at least one cleancoat layer are typically remote from the substrate in relation to the at least one ultrathin lens and the cleancoat layer is typically the layer furthest removed from the substrate. There may optionally be at least one layer, typically a coloring layer, between this substrate surface and the ultrathin lens. The at least one hardcoat layer may be produced using a composition described in the section "I. chemically modified layer".

III.3. Coating Comprising at Least One Photochromic Layer and at Least One Barrier Layer Comprising at Least One Acrylate-Epoxy Layer In an exemplary embodiment, the spectacle lens comprises at least one photochromic layer and at least one barrier layer comprising at least one acrylate-epoxy layer. In this case, at least one surface of the substrate, typically the front face thereof, typically comprises at least one photochromic layer and at least one acrylate-epoxy layer. The at least one acrylate-epoxy layer is described in the section "II.3. Coating comprising at least one photochromic layer, at least one chemically modified primer coat layer and at least one barrier layer comprising at least one acrylate-epoxy layer", called "II.3. Barrier layer comprising at least one acrylate-epoxy layer" hereinafter. The at least one acrylate-epoxy layer is disposed remotely from the substrate in relation to the at least one photochromic layer.

In this exemplary embodiment, at least one surface of the substrate, typically the front face thereof, comprises a) at least one photochromic layer, at least one acrylate-epoxy layer and at least one hardcoat layer. The at least one acrylate-epoxy layer and the at least one hardcoat layer are typically disposed here remote from the substrate in relation to the at least one photochromic layer, with the at least one hardcoat layer disposed furthest remote from the substrate in relation to the at least one photochromic layer. The at least one acrylate-epoxy layer typically acts here as barrier layer for protection of the at least one photochromic layer lying in substrate direction. The at least one hardcoat layer typically serves to increase scratch resistance and to increase chemical stability of the substrate coated therewith. At least one surface of the substrate, typically the front face thereof, typically comprises exactly one photochromic layer, exactly one acrylate-epoxy layer and exactly one hardcoat layer; or b) at least one photochromic layer, at least one acrylate-epoxy layer, at least one primer coat layer and at least one hardcoat layer. The at least one acrylate-epoxy layer, the at least one primer coat layer and the at least one hardcoat layer are disposed remote from the substrate in relation to the at least one photochromic layer. The at least one acrylate-epoxy layer here is typically disposed closest to the at least one photochromic layer, and the at least one hardcoat layer is typically disposed furthest removed from the at least one photochromic layer. At least one surface of the substrate, typically the front face thereof, typically comprises exactly one photochromic layer, exactly one acrylate-epoxy layer, exactly one primer coat layer and exactly one hardcoat layer.

The composition used for production of the at least one hardcoat layer may be one of the compositions for production of the hardcoat layer that are described in the above section "I. chemically modified layer". The coating composition used for the production of the at least one primer coat layer may be one of the compositions described above in section "III. Barrier layer comprising at least one hardcoat layer".

The average thickness of the respective layer is typically determined after application and drying thereof by means of the test method described for the respective layer above.

In this exemplary embodiment, the surface of the substrate covered by at least one barrier layer comprising at least one acrylate-epoxy layer or by at least one hardcoat layer, typically according to one of the above-described layer sequences a) and b), typically the front face thereof adjoining the at least one barrier layer or adjoining the at least one hardcoat layer, remotely from the substrate, may also optionally comprise at least one antireflection layer, at least one electrically conductive or semiconductive layer, at least one antifog layer and/or at least one cleancoat layer. The at least one electrically conductive or semiconductive layer here may be part of the at least one antireflection layer. The coating typically comprises, remote from the substrate, adjoining the barrier layer furthest remote from the substrate or adjoining the at least one hardcoat layer, at least one antireflection layer, more typically at least one antireflection layer and at least one cleancoat layer, in which latter case the cleancoat layer is the substrate furthest removed from the substrate. It is additionally possible for there also to be at least one further layer in each case between the at least one photochromic layer and the at least one barrier layer or between the at least one photochromic layer and the at least one hardcoat layer, typically according to one of the aforementioned layer sequences a) or b). There is typically no further layer present between the at least one photochromic layer and the at least one barrier layer or between the at least one photochromic layer and the at least one hardcoat layer, typically according to one of the aforementioned layer sequences a) or b). In addition, there may also be at least one further layer between the surface of the substrate and the at least one photochromic layer. Typically disposed facing the substrate and directly adjoining the at least one photochromic layer is at least one primer layer, more typically the polyurethane resin layer disclosed in EP 1 602 479 A1, especially in EP 1 602 479 A1, claim 1. If the layer sequence comprises at least one coloring layer and/or at least one polarizing layer, in this exemplary embodiment too, the layer sequence specified in the section "I. chemically modified layer" between the surface of the substrate, typically the front face thereof, and the at least one photochromic layer is applicable. As an alternative to the application of at least one coloring layer to at least one surface of the substrate, typically the front face of the substrate, the substrate may be colored in this exemplary embodiment too.

In this exemplary embodiment too, that surface of the substrate not covered by at least one photochromic layer typically comprises at least one hardcoat layer, at least one antireflection layer, at least one electrically conductive or semiconductive layer that is optionally part of the antireflection layer, at least one antifog layer and/or at least one cleancoat layer. Further typically, that surface of the substrate which is not covered by at least one photochromic layer typically comprises at least one hardcoat layer, more typically at least one hardcoat layer and at least one antireflection layer, and most typically at least one hardcoat layer, at least one antireflection layer and at least one cleancoat layer. The at least one antireflection layer is the layer furthest remote from the substrate or, in the presence of at least one cleancoat layer, the at least one cleancoat layer is the layer furthest remote from the substrate. Alternatively, that surface of the substrate which is not covered by at least one photochromic layer may comprise at least one ultrathin lens and at least one antireflection layer, in which case the at least one antireflection layer is typically remote from the substrate in relation to the at least one ultrathin lens. As a further alternative, that surface of the substrate which is not covered by at least one photochromic layer may comprise at least one ultrathin lens, at least one antireflection layer and at least one cleancoat layer, in which case the at least one antireflection layer and the at least one cleancoat layer are typically remote from the substrate in relation to the at least one ultrathin lens and the cleancoat layer is typically the layer furthest removed from the substrate. There may optionally be at least one layer, typically a coloring layer, between this substrate surface and the ultrathin lens. The at least one hardcoat layer may be produced using a composition described in the section "I. chemically modified layer".

IV. Coating Comprising at Least One Photochromic Layer and at Least One Chemically Modified Layer that Acts as Barrier Layer on the Same Surface of the Substrate There follows a further elucidation of the simultaneous presence of at least one chemically modified layer that simultaneously acts as at least one barrier layer on the same surface as the at least one photochromic layer and is further remote from the substrate in a layer sequence in relation to the at least one photochromic layer, with reference to various exemplary embodiments. If the front face of the substrate here comprises at least one photochromic layer, the at least one chemically modified layer that acts as barrier layer is further to the object side in the layer sequence in relation to the photochromic layer. If the reverse face of the substrate comprises at least one photochromic layer, the at least one chemically modified layer that acts as barrier layer is further to the eye side in the layer sequence in relation to the photochromic layer. Both the front face of the substrate and the reverse face of the substrate may comprise at least one photochromic layer and at least one chemically modified layer that acts as barrier layer. Typically only the front face of the substrate comprises at least one photochromic layer and at least one chemically modified layer that acts as barrier layer.

IV.1. Coating Comprising at Least One Photochromic Layer and at Least One Chemically Modified Layer According to Section "I. Chemically Modified Layer" that Simultaneously Acts as Barrier Layer In this exemplary embodiment, the spectacle lens comprises at least one photochromic layer and at least one chemically modified primer coat layer according to section "I. chemically modified layer" that simultaneously acts as barrier layer In relation to the layer sequence of the front face and the reverse face of the substrate to be coated and the chemical composition of the chemically modified primer coat layer, reference is made to the detailed description in section "I. chemically modified layer". In order that the at least one chemically modified primer coat layer according to section "I. chemically modified layer" can simultaneously act as barrier layer, in this exemplary embodiment, the average layer thickness of the chemically modified primer coat layer is typically increased. In this exemplary embodiment, the average layer thickness of the at least one chemically modified primer coat layer according to section "I. chemically modified layer" is typically within a range from 1.0 µm to 4.0 µm, further typically within a range from 1.1 µm to 3 µm, further typically within a range from 1.2 µm to 2.7 µm, more typically within a range from 1.3 µm to 2.2 µm and most typically within a range from 1.4 µm to 1.7 µm. The average layer thickness of the chemically modified primer coat layer according to section "I. chemically modified layer" is determined as likewise disclosed therein. In addition, as already described in section "I. chemically modified layer", the spectacle lens may comprise at least one hardcoat layer. If the substrate to be coated, typically the front face thereof, comprises at least one photochromic layer, at least one chemically modified primer coat layer according to section "I. chemically modified layer", typically with the above-detailed average layer thickness, and at least one hardcoat layer, the at least one hardcoat layer, in addition to its actual function, may also act as barrier layer. The at least one photochromic layer is disposed closer to the substrate in the aforementioned layer sequence and the at least one hardcoat layer furthest removed from the substrate, as already described in section "I. chemically modified layer". The at least one hardcoat layer serves to increase the chemical stability and to increase the scratch resistance of the spectacle lens, and especially additionally acts as a barrier layer at the undamaged sites. This barrier effect occurs especially when the average layer thickness of the at least one hardcoat layer is typically within a range from 2.0 µm to 5.1 µm, further typically within a range from 2.1 µm to 4.7 µm, further typically within a range from 2.2 µm to 4.3 µm, more typically within a range from 2.3 µm to 3.7 µm and most typically within a range from 2.4 µm to 3.3 µm. The average layer thickness of the at least one hardcoat layer is determined as disclosed in section "I. chemically modified layer". The at least one hardcoat layer typically has one of the chemical compositions disclosed in section "I. chemically modified layer".

IV.2. Coating Comprising at Least One Photochromic Layer, at Least One Chemically Modified Layer According to Section "I. Chemically Modified Layer" that Simultaneously Acts as Barrier Layer, and at Least One Hardcoat Layer In this exemplary embodiment, the spectacle lens comprises at least one photochromic layer, at least one chemically modified primer coat layer according to section "I. chemically modified layer" that simultaneously acts as barrier layer, and at least one hardcoat layer. In relation to the chemical composition of the at least one chemically modified primer coat layer according to section "I. chemically modified layer" and the chemical composition of the at least one hardcoat layer, the descriptions in section "I. chemically modified layer" are also applicable to this exemplary embodiment. In relation to the average layer thickness of the at least one chemically modified primer coat layer and the average layer thickness of the at least one hardcoat layer and the respective determination thereof, the details from section "IV.1. Coating comprising at least one photochromic layer and at least one chemically modified layer according to section "I. chemically modified layer" that simultaneously acts as barrier layer", called "IV.1 chemically modified and simultaneously barrier" hereinafter, are correspondingly applicable.

In this exemplary embodiment, typically at least one surface of the substrate, typically the front face thereof, typically comprises at least one photochromic layer, at least one hardcoat layer 1, at least one chemically modified primer coat layer and at least one hardcoat layer 2. The at least one hardcoat layer 2 here typically serves to increase scratch resistance and to increase chemical stability of the spectacle lens. In addition, the at least one hardcoat layer 2 may act as barrier layer, but only in those regions of the hardcoat layer 2 that are intact, i.e., undamaged. The at least one hardcoat layer 2 may have instances of minor damage over the course of time, for example microscratches, that can arise in the course of everyday use of the spectacles over the course of the total wearing period of a pair of spectacles of typically two to four years. In the region of the instances of minor damage, the at least one hardcoat layer 2 can no longer act as barrier layer. The at least one hardcoat layer 1 typically serves here as at least one barrier layer. The at least one hardcoat layer 1 also serves, in addition to the at least one hardcoat layer 2, to increase scratch resistance and to increase chemical stability, especially in those regions in which the at least one hardcoat layer 2 has instances of minor damage. The average layer thickness of the at least one hardcoat layer 1 and the average layer thickness of the at least one hardcoat layer 2 may be identical or different. The average layer thickness of the at least one hardcoat layer 1 is typically equal to the average layer thickness of the at least one hardcoat layer 2. Both the at least one hardcoat layer 1 and the at least one hardcoat layer 2 typically have the average layer thickness specified in "IV.1 chemically modified and simultaneously barrier". The at least one hardcoat layer 1 and the at least one hardcoat layer 2 can be produced using the same or a different composition. The at least one hardcoat layer 1 and the at least one hardcoat layer 2 are typically produced using an identical composition. The hardcoat layer 2 in this layer sequence is the layer furthest removed from the surface of the substrate, typically the outermost layer on the object side on the front face of the substrate in this layer sequence. The front face of the substrate especially typically comprises a layer sequence comprising exactly one photochromic layer, exactly one hardcoat layer 1, exactly one chemically modified primer coat layer and exactly one hardcoat layer 2. If the spectacle lens comprises further layers on the front face and/or on the reverse face, reference is made to the corresponding details in section "I. chemically modified layer" or in section "II. coating comprising at least one photochromic layer, at least one chemically modified layer and at least one barrier layer on the same surface of the substrate".

If, in the context of this disclosure, at least one antireflection layer, at least one electrically conductive or semiconductor layer, at least one cleancoat layer and/or at least one antifog layer is used, preference is given to using one of the corresponding layers described in detail below.

The spectacle lens comprising at least one photochromic layer may comprise at least one antireflection layer. The antireflection layer typically comprises alternating discrete metal oxide, metal hydroxide and/or metal oxide hydrate layers of or including iron, tin, nickel, molybdenum, cerium, copper, aluminum, silicon, zirconium, titanium, yttrium, tantalum, neodymium, lanthanum, niobium and/or praseodymium. Typically, the at least one antireflection layer comprises at least one metal oxide, metal hydroxide and/or metal oxide hydrate layer of or including silicon, where this at least one silicon oxide, silicon hydroxide and/or silicon oxide hydrate layer on the front face typically forms the layer of the at least one antireflection layer on the object side, or, on the reverse face, typically the outer layer on the eye side. The outer layer in this connection is understood to mean that layer of the antireflection layer which is furthest to the eye side or furthest to the object side in the layer sequence. The at least one antireflection layer typically has a total layer thickness from a range from 97 nm to 420 nm, typically from a range from 102 nm to 360 nm, further typically from a range of 111 nm to 310 nm, more typically from a range of 122 nm to 270 nm and most typically from a range of 131 nm to 223 nm.

The at least one antireflection layer may typically, for example, have the following layer sequence from facing the substrate to remote from the substrate:

a) metal oxide, metal hydroxide and/or metal oxide hydrate layer of or including titanium,
b) metal oxide, metal hydroxide and/or metal oxide hydrate layer of or including silicon,
c) metal oxide, metal hydroxide and/or metal oxide hydrate layer of or including titanium,
d) metal oxide, metal hydroxide and/or metal oxide hydrate layer of or including silicon,
e) metal oxide, metal hydroxide and/or metal oxide hydrate layer of or including titanium,
f) metal oxide, metal hydroxide and/or metal oxide hydrate layer of or including silicon.

The at least one antireflection layer may also have the layer sequence and layer thickness indicated in EP 2 437 084 A1, in FIGS. 3 and 5, in each case between the superhydrophobic layer and the hardcoat layer. Typically, in the context of this disclosure, the layer that adjoins the hardcoat layer therein in each case on the eye side and the layer that adjoins the superhydrophobic layer in each case on the object side is disposed on the front face, and the layer that adjoins the hardcoat layer in each case on the object side and the layer that adjoins the superhydrophobic layer therein in each case on the eye side is disposed on the reverse face in the layer sequence. The at least one antireflection layer is typically produced by means of PVD methods.

The at least one electrically conductive or semiconductive layer typically comprises a layer of or including indium tin oxide $(((In_2O_3)_{0.9}(SnO_2)_{0.1}; ITO)$, fluorine tin oxide $(SnO_2:F; FTO)$, aluminum zinc oxide (ZnO:Al; AZO) and/or antimony tin oxide $(SnO_2:Sb; ATO)$. Typically, the electrically conductive or semiconductive layer comprises a layer of or including ITO or of or including FTO.

The at least one cleancoat layer typically comprises a material having oleophobic and hydrophobic properties, as disclosed in EP 1 392 613 A1, for example, on which water forms a contact angle of more than 90°, typically of more than 100° and particularly typically more than 110°. The at least one cleancoat layer more typically comprises an organofluorine layer with covalent attachment to the substrate according to DE 198 48 591 A1, claim 1, or a layer based on perfluoropolyethers.

The at least one antifog layer typically comprises a silane derivative according to EP 2 664 659 A1, more typically according to claim 4 of EP 2 664 659 A1. Alternatively, the at least one antifog layer may also be produced by the process described in DE 10 2015 209 794 A1, especially by the process described in claim 1 of DE 10 2015 209 794 A1.

If, in the context of this disclosure, a layer is applied by means of dip-coating, it will be self-evident to the person skilled in the art that the front face and the reverse face comprise the same layer.

The disclosure further relates to a method of producing a spectacle lens comprising at least one substrate and at least one photochromic layer, wherein the method comprises the following steps:

a. providing at least one substrate to be coated,
b. coating at least one surface of the substrate to be coated with at least one photochromic layer,
c. covering the spectacle lens obtained in step b) with at least one chemically modified layer and/or at least one barrier layer that prevents occurrence of swelling of the coating and/or the substrate in the event of at least one instance of damage to the surface of the spectacle lens comprising at least one photochromic layer with a force of ≤65 mN, further typically with a force from a range from 0 mN to 63 mN, further typically with a force from a range from 9 mN to 61 mN, more typically with a force from a range from 13 mN to 59 mN and most typically with a force from a range from 17 mN to 56 mN, after contamination of the surface of the spectacle lens comprising at least one photochromic layer with at least one organic acid over a period from a range from 12 hours to 84 hours, further typically from a range from 24 hours to 72 hours, more typically from a range from 48 hours to 71 hours and most typically from a range from 60 hours to 70 hours.

The disclosure also relates to the use of at least one chemically modified layer and/or at least one barrier layer for coating of a substrate of a spectacle lens comprising at least one substrate and at least one photochromic layer, wherein the at least one chemically modified layer and/or the at least one barrier layer prevents occurrence of no swelling of the coating and/or the substrate in the event of at least one instance of damage to the surface of the spectacle lens comprising at least one photochromic layer with a force of ≤65 mN, further typically with a force from a range from 0 mN to 63 mN, further typically with a force from a range from 9 mN to 61 mN, more typically with a force from a range from 13 mN to 59 mN and most typically with a force from a range from 17 mN to 56 mN, after contamination of the surface of the spectacle lens comprising at least one photochromic layer with at least one organic acid over a period from a range from 12 hours to 84 hours, further typically from a range from 24 hours to 72 hours, more typically from a range from 48 hours to 71 hours and most typically from a range from 60 hours to 70 hours.

What is meant by "no swelling" has already been elucidated above.

The disclosure is elucidated in detail hereinafter by some examples that are intended to be nonlimiting:

V. Production of the Spectacle Lenses of the Disclosure

Comparative Example 1 (Coating Composition for Production of the Primer Coat Layer)

For production of the coating composition, 20 parts by weight of Witcobond W240 (aqueous aliphatic polyesterurethane dispersion, from Lanxess), 35 parts by weight of 2-propanol, 44.8 parts by weight of 1-methoxy-2-propanol and 0.2 part by weight of SF-1188A (copolymer of polydimethylsiloxane and polyoxyalkylene ether, INCI: PEG/PPG-20/15 Dimethicone, from Momentive) were combined successively by stirring at room temperature.

Example 1 (Coating Composition for Production of the Chemically Modified Primer Coat Layer)

For production of the coating composition, 19 parts by weight of Witcobond W240 (aqueous aliphatic polyesterurethane dispersion, from Lanxess), 35 parts by weight of 2-propanol, 44.6 parts by weight of 1-methoxy-2-propanol, 0.2 part by weight of SF-1188A (copolymer of polydimethylsiloxane and polyoxyalkylene ether, INCI: PEG/PPG-20/15 Dimethicone, from Momentive) and 1.2 parts by weight of 2-methylimidazole were combined successively by stirring at room temperature.

Comparative Example 2

The coating composition from comparative example 1 was applied by means of spin-coating to the front face of a polythiourethane-based substrate (MR 8, from Mitsui Chemicals Inc.) that already had a photochromic layer (PhotoFusion, from ZEISS) on the front face, such that the resulting primer coat layer had an average coat thickness of about 700 nm. After thermal pre-drying of the primer coat layer at 70° C. for 10 min, a hardcoat layer according to EP 2 578 649 B1, example 2, was then applied to the front face by means of spin-coating, such that the resulting hardcoat layer had an average layer thickness of about 2500 nm. The layers applied were then baked at 110° C. for 3 h.

Example 2

The coating composition from example 1 was applied by means of spin-coating to the front face of a polythiourethane-based substrate (MR 8, from Mitsui Chemicals Inc.) that already had a photochromic layer (PhotoFusion, from ZEISS) on the front face, such that the resulting chemically modified primer coat layer had an average coat thickness of about 700 nm. After thermal pre-drying of the chemically modified primer coat layer at 70° C. for 10 min, a hardcoat layer according to EP 2 578 649 B1, example 2, was then applied to the front face by means of spin-coating, such that the resulting hardcoat layer had an average layer thickness of about 2500 nm. The layers applied were then baked at 110° C. for 3 h.

Comparative Example 3

The coating composition from comparative example 1 was applied by means of dip-coating to both sides of a polythiourethane-based substrate (MR 8, from Mitsui Chemicals Inc.) that had a photochromic layer (PhotoFusion, from ZEISS) on the front face, such that each resulting primer coat layer had an average coat thickness of about 700 nm. After thermal pre-drying of the primer coat layers at 70° C. for 10 min, a hardcoat layer according to EP 2 578 649 B1, example 2, was applied to both sides by means of dip-coating, such that each resulting hardcoat layer had an average layer thickness of about 2500 nm. The layers applied were then baked at 110° C. for 3 h. Thereafter, the spectacle lens thus coated was coated on both sides with an antireflection layer and a cleancoat layer according to U.S. Pat. No. 9,778,484 B2, claim 5.

Example 3

The coating composition from EP 2 578 649 B1, example 2, was applied by means of spin-coating to the front face of a polythiourethane-based substrate (MR 8, from Mitsui Chemicals Inc.) that already had a photochromic layer (PhotoFusion, from ZEISS) on the front face, such that the resulting hardcoat layer had an average coat thickness of about 3500 nm. The hardcoat layer applied was then baked at 110° C. for 3 h.

Thereafter, the coating composition from comparative example 1 was coated by means of dip-coating on to both sides of the spectacle lens obtained, such that each resulting primer coat layer had an average thickness of about 700 nm. After thermal pre-drying of the two primer coat layers at 70° C. for 10 min, a hardcoat layer according to EP 2 578 649 B1, example 2, was applied to both sides by means of dip-coating, such that each resulting hardcoat layer had an average layer thickness of about 2500 nm. The layers applied were then baked at 110° C. for 3 h. Thereafter, the spectacle lens obtained was coated on both sides with an antireflection layer and a cleancoat layer according to U.S. Pat. No. 9,778,484 B2, claim 5.

Example 4

The coating composition from comparative example 1 was applied by means of dip-coating to both sides of a polythiourethane-based substrate (MR 8, from Mitsui Chemicals Inc.) that had a photochromic layer (PhotoFusion, from ZEISS) on the front face, such that each resulting primer coat layer had an average coat thickness of about 700 nm. After thermal pre-drying of the primer coat layer at 70° C. for 10 min, a hardcoat layer according to EP 2 578 649 B1, example 2, was applied to both sides by means of dip-coating, such that each resulting hardcoat layer had an average layer thickness of about 2500 nm. The layers applied were then baked at 110° C. for 3 h.

Thereafter, the coating composition from comparative example 1 was coated by means of dip-coating on to both sides of the spectacle lens obtained, such that each resulting primer coat layer had an average thickness of about 700 nm. After thermal pre-drying of the primer coat layer at 70° C. for 10 min, a hardcoat layer according to EP 2 578 649 B1, example 2, was applied to both sides by means of dip-coating, such that each resulting hardcoat layer had an average layer thickness of about 2500 nm. The layers applied were then baked at 110° C. for 3 h. Thereafter, the lens was coated on both sides with an antireflection layer and a cleancoat layer according to U.S. Pat. No. 9,778,484 B2, claim 5.

Example 5

The coating composition from US 2008/0311404 A1, example 1, was applied by means of spin-coating the front face of a polythiourethane-based substrate (MR 8, from Mitsui Chemicals Inc.) that already had a photochromic layer (PhotoFusion, from ZEISS) on the front face, such that the resulting layer had an average layer thickness of about 3800 nm. The layer applied was then cured with UV radiation from a D lamp from Fusion Systems with a maximum intensity of 12 Wcm-2 for 30 sec (corresponding to a total dose of 1.0 Jcm-1 based on the UVA irradiation region).

Thereafter, the coating composition from comparative example 1 was coated by means of dip-coating on to both sides of the spectacle lens thus coated, such that each resulting primer coat layer had an average thickness of about 700 nm. After thermal pre-drying of the primer coat layer at 70° C. for 10 min, a hardcoat layer according to EP 2 578 649 B1, example 2, was applied to both sides by means of dip-coating, such that each resulting hardcoat layer had an average layer thickness of about 2500 nm. The layers applied were then baked at 110° C. for 3 h. Thereafter, the lens was coated on both sides with an antireflection layer and a clean coat layer according to U.S. Pat. No. 9,778,484 B2, claim 5.

Example 6

The coating composition from comparative example 1 was applied by means of dip-coating to both sides of a polythiourethane-based substrate (MR 8, from Mitsui Chemicals Inc.) that had a photochromic layer (PhotoFusion, from ZEISS) on the front face, such that each resulting primer coat layer had an average layer thickness of about 700 nm. After thermal pre-drying of the primer coat layer at 70° C. for 10 min, a hardcoat layer according to EP 2 578 649 B1, example 2, was applied to both sides by means of dip-coating, such that each resulting hardcoat layer had an average layer thickness of about 2500 nm. The layers applied were then baked at 110° C. for 3 h.

Thereafter, 300 µl of the adhesive according to example 4 of WO 2015/121341 A1 were applied to the hardcoat layer present on the front face. An ultrathin lens formed by means of a ceramic mold (ultrathin lens prior to forming: D 263® T eco, from Schott AG) was pressed onto this front face such that the adhesive was distributed homogeneously between the reverse face of the ultrathin lens and the hardcoat layer present on the front face. The adhesive layer in the spectacle lens thus obtained was cured at 70° C. for 3.5 hours. Thereafter, the spectacle lens thus obtained was coated on both sides with an antireflection layer and a cleancoat layer according to U.S. Pat. No. 9,778,484 B2, claim 5.

Comparative Example 4

Rodenstock Perfalit Colormatic Solitare Protect Plus 2 spectacle lens (from Rodenstock GmbH).

Comparative Example 5

Hoya 1.6 Sensity Hi-Vision LongLife spectacle lens (from Hoya).

VI. Characterization of the Spectacle Lenses of the Disclosure and of the Spectacle Lenses from the Comparative Examples VI.1. Characterization of the Spectacle Lenses after Cleaning with a Cotton Cloth The spectacle lens from comparative example 2 and the spectacle lens from example 2 were each rubbed with a cotton cloth in order to simulate the microscratches caused when the spectacle lens is cleaned in the customary way. Thereafter, the spectacle lenses were half immersed into an 85% aqueous lactic acid solution at room temperature for 120 h, such that the coated surface was completely covered with the lactic acid solution. After the lactic acid treatment, the spectacle lenses were cleaned with water, dried and then first assessed visually by shadow projection with a BTG QC-X75-CE LENS INSPECTION UNIT instrument from Bulbtronics Inc. The corresponding assessment results are compiled in table 2 below.

Moreover, the spectacle lenses were examined for swelling effects on the front face by means of white light interferometry with the NewView 7100 instrument (from Zygo Corporation). The corresponding results are likewise compiled in Table 2.

TABLE 2

| Spectacle lens from | Shadow projection | Analysis by means of white light interferometry |
|---|---|---|
| Comparative example 2 | Light-colored, spotty defects; Visible immersion edge | 500 nm swelling in z direction at immersion edge on the front face of the spectacle lens |
| Example 2 | No light-colored, spotty defects; No visible immersion edge | No detectable swelling in z direction on the front face of the spectacle lens |

VI.2. Characterization of the Spectacle Lenses after Scratching of the Surface with a Scoring Tool The damage to the spectacle lens from the examples and comparative examples on the surface of the substrate comprising at least one photochromic layer was caused by a diamond scoring tool having a conical tip having a radius of 2 μm±0.2 μm and a cone of 90°±1.5°, which was moved in a first direction so as to remove material, i.e., to remove coating and/or substrate. In this way, multiple instances of damage to the spectacle lens with rising force from a range from typically 4 mN to 100 mN were caused in the form of a matrix on the surface of the spectacle lens. The spectacle lens was damaged using the UNHT³ ultra-nanohardness measuring instrument from Anton-Paar GmbH. Each individual instance of linear damage had a length of 500 μm; the overall matrix extended over an area of 2.5 mm×2.5 mm on the spectacle lens surface.

The spectacle lens thus treated was then immersed into oleic acid for 70 h and subsequently cleaned with water and a cotton cloth. The resulting topography of the matrix was analyzed by means of white light interferometry with the NewView 7100 instrument (from Zygo Corporation), and the minimum force at which swelling occurs in z direction was documented. The results are compiled in Table 3.

TABLE 3

| Spectacle lens from | Force applied [mN] before occurrence of swelling in z direction |
| --- | --- |
| Comparative example 3 | ≥8 |
| Example 3 | ≥30 |
| Example 4 | ≥30 |
| Example 5 | ≥30 |
| Example 6 | ≥100 |
| Comparative example 4 | ≥8 |
| Comparative example 5 | ≥10 |

The spectacle lenses of examples 3 to 6, after the damage described above, showed swelling only in the event of much higher expenditure of force compared to the spectacle lenses of comparative examples 3, 4 and 5.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A spectacle lens comprising:
    a substrate;
    a photochromic layer arranged on the substrate;
    a barrier layer, a chemically modified layer, or the barrier layer and the chemically modified layer, wherein the barrier layer and/or the chemically modified layer are arranged on a same side of the substrate as the photochromic layer and jointly form a first surface of the spectacle lens,
    wherein the spectacle lens, in an event of damaging the spectacle lens by scratching the first surface of the spectacle lens with a scoring tool with a force of ≤65 mN, exhibits no swelling after complete contamination of the damaged first surface of the spectacle lens with a liquid, saturated or unsaturated, optionally substituted, monocarboxylic acid over a period of from 12 hours to 84 hours at room temperature,
    wherein no swelling is defined as no structure of a size of ≥500 nm in z direction of the first surface of the spectacle lens is formed after the complete contamination, as seen with an optical profilometer based on white light interferometry, and
    wherein
    a) the photochromic layer,
    b) at least one hardcoat layer 1,
    c) at least one primer coat layer, and
    d) at least one hardcoat layer 2,
    are arranged on the substrate in a layer sequence, and
    wherein the hardcoat layer 2 in the layer sequence is the layer furthest away from the substrate.

2. The spectacle lens as claimed in claim 1, wherein the at least one primer coat layer is produced from a mixture comprising:
    i) at least one of:
        an aqueous aliphatic, cycloaliphatic, aromatic, or heteroaromatic polyurethane dispersion;
        an aqueous aliphatic, cycloaliphatic, aromatic, or heteroaromatic polyurea dispersion;
        an aqueous aliphatic, cycloaliphatic, aromatic, or heteroaromatic polyurethane-polyurea dispersion; or
        an aqueous aliphatic, cycloaliphatic, aromatic or heteroaromatic polyester dispersion;
    ii) at least one solvent; and
    iii) optionally, at least one additive.

3. The spectacle lens as claimed in claim 1, wherein the at least one primer coat layer is a chemically modified primer coat layer which displays a pH-buffering effect and which is produced from a mixture comprising:
    i) at least one of:
        an aqueous aliphatic, cycloaliphatic, aromatic, or heteroaromatic polyurethane dispersion;
        an aqueous aliphatic, cycloaliphatic, aromatic, or heteroaromatic polyurea dispersion;
        an aqueous aliphatic, cycloaliphatic, aromatic, or heteroaromatic polyurethane-polyurea dispersion; or
        an aqueous aliphatic, cycloaliphatic, aromatic or heteroaromatic polyester dispersion;
    ii) at least one solvent;
    iii) at least one base; and
    iv) optionally, at least one additive.

4. The spectacle lens as claimed in claim 3, wherein the at least one base is selected from the group consisting of imidazole, 1-methylimidazole, 2-methylimidazole, 4-methylimidazole, 2,5-dimethylimidazole, 4-hydroxymethylimidazole, pyrazole, 1,2,3-triazole, 1,2,4-triazole, tetrazole, pentazole, pyrrole, pyrrolidine, pyridine, 4-amidopyridine, 4-methylpyridine, 4-methoxypyridine, 2,4,6-trimethylpyridine, piperidine, piperazine, triethylamine, diisopropylamine, diisobutylamine, sodium hydroxide solution, and potassium hydroxide solution, or a mixture thereof.

5. The spectacle lens as claimed in claim 3, wherein the at least one base is present in an amount in a range from 0.1% by weight to 3.2% by weight, based on a total weight of the coating composition.

6. The spectacle lens as claimed in claim 1, wherein an average layer thickness of the primer coat layer is within a range from 0.4 µm to 1.3 µm.

7. The spectacle lens as claimed in claim 1, wherein a composition for production of the hardcoat layer 1 and a composition for production of the hardcoat layer 2 are identical or different.

8. The spectacle lens as claimed in claim 1, wherein the composition for production of the hardcoat layer 1 and the composition for production of the hardcoat layer 2 comprise:
  a) at least one silane derivative of the formula $R^1R^2{}_{3-n}Si(OR^3)_n$, where $R^1$ is an unsubstituted or substituted alkyl group, cycloalkyl group, acyl group, alkyleneacyl group, aryl group or alkylenearyl group, $R^2$ is an organic radical comprising an epoxy group, $R^3$ is an unsubstituted or substituted alkyl group, cycloalkyl group, aryl group or alkylenearyl group and n=2 or 3, and/or a hydrolysis product and/or a condensation product of the silane derivative of the formula $R^1R^2{}_{3-n}Si(OR^3)_n$;
  b) at least one colloidal inorganic oxide, hydroxide, oxide hydrate, fluoride, and oxyfluoride, or a mixture thereof;
  c) at least one epoxy compound having at least two epoxy groups; and
  d) at least one catalyst system including at least one Lewis acid and at least one thermolatent Lewis acid-base adduct.

9. The spectacle lens as claimed in claim 1, wherein the monocarboxylic acid is selected from the group consisting of acetic acid, propionic acid, acrylic acid, lactic acid, butyric acid, isobutyric acid, valeric acid, enanthic acid, caproic acid, caprylic acid, pelargonic acid, myristoleic acid, palmitoleic acid, linoleic acid, alpha-linolenic acid, gamma-linolenic acid, oleic acid, ricinoleic acid, stearidonic acid, arachidonic acid, eicosapentaenoic acid, docosapentaenoic acid, and docosahexaenoic acid.

10. The spectacle lens as claimed in claim 1, wherein the layer sequence is arranged on a front face of the substrate.

11. A method of producing a spectacle lens having at least one substrate and at least one photochromic layer, the method comprising:
  a) providing at least one substrate to be coated;
  b) coating at least one surface of the substrate to be coated with at least one photochromic layer;
  c) covering the spectacle lens obtained in step b), on a same surface of the substrate as in step b), remotely from the substrate, with at least one hardcoat layer 1;
  d) covering the spectacle lens obtained in step c), on the same surface of the substrate as in step c), remotely from the substrate, with at least a primer coat layer; and
  e) covering the spectacle lens obtained in step d), on the same surface of the substrate as in step d), remotely from the substrate, with at least one hardcoat layer 2, wherein the at least one primer coat layer is a chemically modified primer coat layer that has been produced with a coating composition comprising:
    i) at least one of:
      an aqueous aliphatic, cycloaliphatic, aromatic, or heteroaromatic polyurethane dispersion;
      an aqueous aliphatic, cycloaliphatic, aromatic, or heteroaromatic polyurea dispersion;
      an aqueous aliphatic, cycloaliphatic, aromatic, or heteroaromatic polyurethane-polyurea dispersion; or
      an aqueous aliphatic, cycloaliphatic, aromatic or heteroaromatic polyester dispersion;
    ii) at least one solvent;
    iii) at least one base; and
    iv) optionally, at least one additive.

12. A spectacle lens comprising:
a substrate;
a photochromic layer arranged on the substrate;
a barrier layer, a chemically modified primer coat layer, or the barrier layer and the chemically modified primer coat layer, wherein the barrier layer and/or the chemically modified primer coat layer are arranged on a same side of the substrate as the photochromic layer and jointly form a first surface of the spectacle lens,
wherein the spectacle lens, in an event of damaging the spectacle lens by scratching the first surface of the spectacle lens with a scoring tool with a force of ≤65 mN, exhibits no swelling after complete contamination of the damaged first surface of the spectacle lens with a liquid, saturated or unsaturated, optionally substituted, monocarboxylic acid over a period of from 12 hours to 84 hours at room temperature,
wherein no swelling is defined as no structure of a size of ≥500 nm in z direction of the first surface of the spectacle lens is formed after the complete contamination, as seen with an optical profilometer based on white light interferometry, and
wherein
a) the photochromic layer;
b) at least one primer coat layer 1;
c) at least one hardcoat layer 1;
d) at least one primer coat layer 2; and
e) at least one hardcoat layer 2,
are arranged on the substrate in a layer sequence, and
wherein the hardcoat layer 2 in the layer sequence is the layer furthest away from the substrate.

13. The spectacle lens as claimed in claim 12, wherein the at least one primer coat layer 1 and the at least one primer coat layer 2 each have a coating composition which is produced from a mixture comprising:
  i) at least one of:
    an aqueous aliphatic, cycloaliphatic, aromatic, or heteroaromatic polyurethane dispersion;
    an aqueous aliphatic, cycloaliphatic, aromatic, or heteroaromatic polyurea dispersion;
    an aqueous aliphatic, cycloaliphatic, aromatic, or heteroaromatic polyurethane-polyurea dispersion; or
    an aqueous aliphatic, cycloaliphatic, aromatic or heteroaromatic polyester dispersion;
  ii) at least one solvent; and
  iii) optionally, at least one additive.

14. The spectacle lens as claimed in claim 12, wherein at least one of the primer coat layer 1 and the primer coat layer 2 is the chemically modified primer coat layer, which is produced from a coating composition comprising:
  i) at least one of:
    an aqueous aliphatic, cycloaliphatic, aromatic, or heteroaromatic polyurethane dispersion;
    an aqueous aliphatic, cycloaliphatic, aromatic, or heteroaromatic polyurea dispersion;
    an aqueous aliphatic, cycloaliphatic, aromatic, or heteroaromatic polyurethane-polyurea dispersion; or
    an aqueous aliphatic, cycloaliphatic, aromatic or heteroaromatic polyester dispersion;

ii) at least one solvent;

iii) at least one base; and iv) optionally, at least one additive.

15. The spectacle lens as claimed in claim 12, wherein the at least one solvent of the at least one primer coat layer and the at least one solvent of the at least one primer coat layer each comprise at least one organic solvent having a low boiling point of <100° C. at standard pressure and at least one organic solvent having a moderate boiling point in a range from 100° C. to 150° C. at standard pressure, and a weight ratio of the at least one organic solvent having a low boiling point to the at least one organic solvent having a moderate boiling point is 1:1.

16. The spectacle lens as claimed in claim 15, wherein the at least one solvent additionally comprises water and the weight ratio of the at least one organic solvent having a low boiling point to the at least one organic solvent having a moderate boiling point to water is 2:7:1.

17. The spectacle lens as claimed in claim 14, wherein the at least one base is selected from the group consisting of imidazole, 1-methylimidazole, 2-methylimidazole, 4-methylimidazole, 2,5-dimethylimidazole, 4-hydroxymethylimidazole, pyrazole, 1,2,3-triazole, 1,2,4-triazole, tetrazole, pentazole, pyrrole, pyrrolidine, pyridine, 4-amidopyridine, 4-methylpyridine, 4-methoxypyridine, 2,4,6-trimethylpyridine, piperidine, piperazine, triethylamine, diisopropylamine, diisobutylamine, sodium hydroxide solution, and potassium hydroxide solution, or a mixture thereof.

18. The spectacle lens as claimed in claim 14, wherein the at least one base is present in an amount from 0.1% by weight to 3.2% by weight, based on a total weight of the coating composition.

19. The spectacle lens as claimed in claim 12, wherein the composition for production of the hardcoat layer 1 and the composition for production of the hardcoat layer 2 are identical or different.

20. The spectacle lens as claimed in claim 12, wherein the composition for production of the hardcoat layer 1 and the composition for production of the hardcoat layer 2 are identical and each comprise:

a) at least one silane derivative of the formula $R^1R^2_{3-n}Si(OR^3)_n$ where $R^1$ is an unsubstituted or substituted alkyl group, cycloalkyl group, acyl group, alkyleneacyl group, aryl group or alkylenearyl group, $R^2$ is an organic radical comprising an epoxy group, $R^3$ is an unsubstituted or substituted alkyl group, cycloalkyl group, aryl group or alkylenearyl group and n=2 or 3, and/or a hydrolysis product and/or a condensation product of the silane derivative of the formula $R^1R^2_{3-n}Si(OR^3)_n$;

b) at least one colloidal inorganic oxide, hydroxide, oxide hydrate, fluoride, and oxyfluoride, or a mixture thereof;

c) at least one epoxy compound having at least two epoxy groups; and d) at least one catalyst system comprising at least one Lewis acid and at least one thermolatent Lewis acid-base adduct.

21. The spectacle lens as claimed in claim 12, wherein the monocarboxylic acid is selected from the group consisting of acetic acid, propionic acid, acrylic acid, lactic acid, butyric acid, isobutyric acid, valeric acid, enanthic acid, caproic acid, caprylic acid, pelargonic acid, myristoleic acid, palmitoleic acid, linoleic acid, alpha-linolenic acid, gamma-linolenic acid, oleic acid, ricinoleic acid, stearidonic acid, arachidonic acid, eicosapentaenoic acid, docosapentaenoic acid, and docosahexaenoic acid.

22. The spectacle lens as claimed in claim 12, wherein the layer sequence is arranged on a front face of the substrate.

23. A method of producing a spectacle lens comprising at least one substrate and at least one photochromic layer, the method comprising:

a) providing at least one substrate to be coated, b) coating at least one surface of the substrate to be coated with at least one photochromic layer, c) covering the spectacle lens obtained in step b), on the same surface of the substrate as in step b), remotely from the substrate, with at least one primer coat layer 1, d) covering the spectacle lens obtained in step c), on the same surface of the substrate as in step b), remotely from the substrate, with at least one hardcoat layer 1, e) covering the spectacle lens obtained in step d), on the same surface of the substrate as in step d), remotely from the substrate, with at least one primer coat layer 2, f) covering the spectacle lens obtained in step e), on the same surface of the substrate as in step e), remotely from the substrate, with at least one hardcoat layer 2, wherein the coating composition for the production of the at least one primer coat layer 1 and the coating composition for the production of the at least one primer coat layer 2 are identical and each comprise:

i) at least one of:

an aqueous aliphatic, cycloaliphatic, aromatic, or heteroaromatic polyurethane dispersion;

an aqueous aliphatic, cycloaliphatic, aromatic, or heteroaromatic polyurea dispersion;

an aqueous aliphatic, cycloaliphatic, aromatic, or heteroaromatic polyurethane-polyurea dispersion; or an aqueous aliphatic, cycloaliphatic, aromatic, or heteroaromatic polyester dispersion;

ii) at least one solvent; and iii) optionally, at least one additive.

24. A method of producing a spectacle lens comprising at least one substrate and at least one photochromic layer, the method comprising:

a) providing at least one substrate to be coated, b) coating at least one surface of the substrate to be coated with at least one photochromic layer, c) covering the spectacle lens obtained in step b), on the same surface of the substrate as in step b), remotely from the substrate, with at least one primer coat layer 1, d) covering the spectacle lens obtained in step c), on the same surface of the substrate as in step b), remotely from the substrate, with at least one hardcoat layer 1, e) covering the spectacle lens obtained in step d), on the same surface of the substrate as in step d), remotely from the substrate, with at least one primer coat layer 2, f) covering the spectacle lens obtained in step e), on the same surface of the substrate as in step e), remotely from the substrate, with at least one hardcoat layer 2, wherein at least one of the primer coat layer 1 and the one primer coat layer 2 is a chemically modified primer coat layer produced with a coating composition comprising:

i) at least one of:

an aqueous aliphatic, cycloaliphatic, aromatic, or heteroaromatic polyurethane dispersion;

an aqueous aliphatic, cycloaliphatic, aromatic, or heteroaromatic polyurea dispersion;

an aqueous aliphatic, cycloaliphatic, aromatic, or heteroaromatic polyurethane-polyurea dispersion; or an aqueous aliphatic, cycloaliphatic, aromatic, or heteroaromatic polyester dispersion;

ii) at least one solvent;

iii) at least one base; and iv) optionally, at least one additive.

25. A spectacle lens comprising:

a substrate;

a photochromic layer arranged on the substrate;

a barrier layer, a chemically modified primer coat layer, or the barrier layer and the chemically modified primer coat layer, wherein the barrier layer and/or the chemically modified primer coat layer are arranged on a same side of the substrate as the photochromic layer and jointly form a first surface of the spectacle lens, wherein the spectacle lens, in an event of damaging the spectacle lens by scratching the first surface of the spectacle lens with a scoring tool with a force of ≤65 mN, exhibits no swelling after complete contamination of the damaged first surface of the spectacle lens with a liquid, saturated or unsaturated, optionally substituted, monocarboxylic acid over a period of from 12 hours to 84 hours at room temperature, wherein no swelling is defined as no structure of a size of ≥500 nm in z direction of the first surface of the spectacle lens is formed after the complete contamination, as seen with an optical profilometer based on white light interferometry, and wherein a) the at least one photochromic layer, b) at least one chemically modified primer coat layer, c) at least one ultrathin lens having an average thickness from a range from 19 μm to 230 μm, are arranged on the substrate in a layer sequence, and wherein the at least one ultrathin lens in the layer sequence is the layer furthest away from the substrate, wherein the at least one chemically modified primer coat layer is produced with a composition containing:

i) at least one of:

an aqueous aliphatic, cycloaliphatic, aromatic, or heteroaromatic polyurethane dispersion;

an aqueous aliphatic, cycloaliphatic, aromatic, or heteroaromatic polyurea dispersion;

an aqueous aliphatic, cycloaliphatic, aromatic, or heteroaromatic polyurethane-polyurea dispersion; or an aqueous aliphatic, cycloaliphatic, aromatic, or heteroaromatic polyester dispersion;

ii) at least one solvent;

iii) at least one base; and iv) optionally, at least one additive.

26. The spectacle lens as claimed in claim 25, wherein the at least one solvent of the at least one primer coat layer and the at least one solvent of the at least one chemically modified primer coat layer each comprise at least one organic solvent having a low boiling point of <100° C. at standard pressure and at least one organic solvent having a moderate boiling point from a range from 100° C. to 150° C. at standard pressure, and a weight ratio of the at least one organic solvent having a low boiling point to the at least one organic solvent having a moderate boiling point is 1:1.

27. The spectacle lens as claimed in claim 25, wherein the at least one solvent additionally comprises water and the weight ratio of the at least one organic solvent having a low boiling point to at least one organic solvent having a moderate boiling point to water is 2:7:1.

28. The spectacle lens as claimed in claim 25, wherein the at least one base is selected from the group consisting of imidazole, 1-methylimidazole, 2-methylimidazole, 4-methylimidazole, 2,5-dimethylimidazole, 4-hydroxymethylimidazole, pyrazole, 1,2,3-triazole, 1,2,4-triazole, tetrazole, pentazole, pyrrole, pyrrolidine, pyridine, 4-amidopyridine, 4-methylpyridine, 4-methoxypyridine, 2,4,6-trimethylpyridine, piperidine, piperazine, triethylamine, diisopropylamine, diisobutylamine, sodium hydroxide solution, and potassium hydroxide solution, or a mixture thereof.

29. The spectacle lens as claimed in claim 25, wherein the at least one base is present in an amount from 0.1% by weight to 3.2% by weight, based on a total weight of the coating composition.

30. The spectacle lens as claimed in claim 25, wherein an average layer thickness of the chemically modified primer coat layer is within a range from 300 nm to 1200 nm.

31. A method of producing a spectacle lens having at least one substrate and at least one photochromic layer, the method comprising:

a) providing at least one substrate to be coated, b) coating at least one surface of the substrate to be coated with at least one photochromic layer, c) covering the spectacle lens obtained in step b), on the same surface of the substrate as in step b), remotely from the substrate, with at least one chemically modified layer which displays a pH-buffering effect and which is produced using a coating composition containing:

i) at least one of:

an aqueous aliphatic, cycloaliphatic, aromatic, or heteroaromatic polyurethane dispersion;

an aqueous aliphatic, cycloaliphatic, aromatic, or heteroaromatic polyurea dispersion;

an aqueous aliphatic, cycloaliphatic, aromatic, or heteroaromatic polyurethane-polyurea dispersion; or an aqueous aliphatic, cycloaliphatic, aromatic, or heteroaromatic polyester dispersion;

ii) at least one solvent;

iii) at least one base; and iv) optionally, at least one additive; and d) bonding the same surface of the spectacle lens obtained in step c) to at least one ultrathin lens of average thickness in a range of 19 μm to 230 μm.

32. A spectacle lens comprising:

a substrate;

a photochromic layer arranged on the substrate;

a barrier layer, a chemically modified primer coat layer, or the barrier layer and the chemically modified primer coat layer, wherein the barrier layer and/or the chemically modified primer coat layer are arranged on a same side of the substrate as the photochromic layer and jointly form a first surface of the spectacle lens, wherein the spectacle lens, in an event of damaging the spectacle lens by scratching the first surface of the spectacle lens with a scoring tool with a force of ≤65 mN, exhibits no swelling after complete contamination of the damaged first surface of the spectacle lens with a liquid, saturated or unsaturated, optionally substituted, monocarboxylic acid over a period of from 12 hours to 84 hours at room temperature, wherein no swelling is defined as no structure of a size of ≥500 nm in z direction of the first surface of the spectacle lens is formed after the complete contamination, as seen with an optical profilometer based on white light interferometry, and wherein
a) the at least one photochromic layer,
b) at least one acrylate-epoxy layer,
c) at least one primer coat layer and
d) at least one hardcoat layer,
are arranged on the substrate, and
wherein, remotely from the substrate, the at least one acrylate-epoxy layer is disposed closest to the at least one photochromic layer and the at least one hardcoat layer furthest removed from the at least one photochromic layer.

33. The spectacle lens as claimed in claim 32, wherein the at least one acrylate-epoxy layer is produced with a coating composition comprising:
a) at least one acrylate and/or at least one methacrylate;
b) at least one epoxy compound;
c) at least one colloidal inorganic oxide, hydroxide, oxide hydrate, fluoride, and oxyfluoride, which has optionally been surface-modified;
d) at least one solvent;
e) at least one photoinitiator; and
f) optionally, at least one additive,
wherein a total amount of at least one acrylate and/or at least one methacrylate in the coating composition is within a range from 4.0% by weight to 25.0% by weight, based on a total weight of the coating composition.

34. The spectacle lens as claimed in claim 32, wherein an average layer thickness of the at least one acrylate-epoxy layer after application and drying is within a range from 2.7 µm to 5.1 µm.

35. The spectacle lens as claimed in claim 32, wherein the at least one primer coat layer is produced using a coating composition comprising
i) at least one of:
an aqueous aliphatic, cycloaliphatic, aromatic, or heteroaromatic polyurethane dispersion;
an aqueous aliphatic, cycloaliphatic, aromatic, or heteroaromatic polyurea dispersion;
an aqueous aliphatic, cycloaliphatic, aromatic, or heteroaromatic polyurethane-polyurea dispersion; or
an aqueous aliphatic, cycloaliphatic, aromatic, or heteroaromatic polyester dispersion;
ii) at least one solvent; and
iv) optionally, at least one additive.

36. The spectacle lens as claimed in claim 32, wherein the at least one primer coat layer is a chemically modified primer coat layer that has been produced with a coating composition comprising:
i) at least one of:
an aqueous aliphatic, cycloaliphatic, aromatic, or heteroaromatic polyurethane dispersion;
an aqueous aliphatic, cycloaliphatic, aromatic, or heteroaromatic polyurea dispersion;
an aqueous aliphatic, cycloaliphatic, aromatic, or heteroaromatic polyurethane-polyurea dispersion; or
an aqueous aliphatic, cycloaliphatic, aromatic, or heteroaromatic polyester dispersion;
ii) at least one solvent;
iii) at least one base; and
iv) optionally, at least one additive.

37. The spectacle lens as claimed in claim 35, wherein the at least one solvent of the at least one primer coat layer and the at least one solvent of the at least one chemically modified primer coat layer each comprise an organic solvent having a low boiling point of <100° C. at standard pressure and at least one organic solvent having a moderate boiling point from a range from 100° C. to 150° C. at standard pressure, and a weight ratio of the at least one organic solvent having a low boiling point to at least one organic solvent having a moderate boiling point is 1:1.

38. The spectacle lens as claimed in claim 35, wherein the at least one solvent additionally comprises water and the weight ratio of the at least one organic solvent having a low boiling point to at least one organic solvent having a moderate boiling point to water is 2:7:1.

39. The spectacle lens as claimed in claim 32, wherein the composition for production of the at least one hardcoat layer comprises
a) at least one silane derivative of the formula $R^1R^2_{3-n}Si(OR^3)_n$ where $R^1$ is an unsubstituted or substituted alkyl group, cycloalkyl group, acyl group, alkyleneacyl group, aryl group or alkylenearyl group, $R^2$ is an organic radical comprising an epoxy group, $R^3$ is an unsubstituted or substituted alkyl group, cycloalkyl group, aryl group or alkylenearyl group and n=2 or 3, and/or a hydrolysis product and/or a condensation product of the silane derivative of the formula $R^1R^2_{3-n}Si(OR^3)_n$,
b) at least one colloidal inorganic oxide, hydroxide, oxide hydrate, fluoride and/or oxyfluoride,
c) at least one epoxy compound having at least two epoxy groups and
d) at least one catalyst system comprising at least one Lewis acid and at least one thermolatent Lewis acid-base adduct.

40. A method of producing a spectacle lens comprising at least one substrate and at least one photochromic layer, wherein the method comprises the following steps:
a) providing at least one substrate to be coated,
b) coating at least one surface of the substrate to be coated with at least one photochromic layer,
c) covering the spectacle lens obtained in step b), on the same surface of the substrate as in step b), remotely from the substrate, with at least one acrylate-epoxy layer,
d) covering the spectacle lens obtained in step c), on the same surface of the substrate as in step c), remotely from the substrate, with at least one primer coat layer and
e) covering the spectacle lens obtained in step d), on the same surface of the substrate as in step d), remotely from the substrate, with at least one hardcoat layer,
wherein the at least one acrylate-epoxy layer is produced using a coating composition comprising:
i. at least one acrylate and/or at least one methacrylate;
ii. at least one epoxy compound;
iii. at least one colloidal inorganic oxide, hydroxide, oxide hydrate, fluoride, and oxyfluoride, or a mixture thereof, which, optionally, has been surface-modified;
iv. at least one solvent;
v. at least one photoinitiator; and
vi. optionally, at least one additive,
wherein a total amount of the at the least one acrylate and/or the at least one methacrylate in the coating composition is within a range from 4.0% by weight to 25.0% by weight, based on a total weight of the coating composition.

41. A method of producing a spectacle lens comprising at least one substrate and at least one photochromic layer, wherein the method comprises the following steps:

a) providing at least one substrate to be coated,
b) coating at least one surface of the substrate to be coated with at least one photochromic layer,
c) covering the spectacle lens obtained in step b), on the same surface of the substrate as in step b), remotely from the substrate, with at least one acrylate-epoxy layer,
d) covering the spectacle lens obtained in step c), on the same surface of the substrate as in step c), remotely from the substrate, with at least one primer coat layer and
e) covering the spectacle lens obtained in step d), on the same surface of the substrate as in step d), remotely from the substrate, with at least one hardcoat layer, wherein an average layer thickness of the at least one acrylate-epoxy layer after application and drying is within a range from 2.7 µm to 5.1 µm.

42. A spectacle lens comprising at least one substrate and at least one photochromic layer, wherein at least one of the surfaces of the substrate comprises the at least one photochromic layer and, remotely from the substrate, at least one ultrathin lens having an average thickness from a range from 19 µm to 230 µm on the same surface of the substrate, wherein the ultrathin lens prevents pH-acidic components from coming into contact with the at least one photochromic layer, such that, in the event of at least one instance of damage by scratching with a scoring tool to the surface of the spectacle lens comprising at least one photochromic layer with a force of ≤65 mN, after complete contamination of the damaged surface of the spectacle lens comprising at least one photochromic layer with at least one organic acid selected from a liquid organic aliphatic saturated or unsaturated, optionally substituted, monocarboxylic acid, there is no occurrence of swelling of the coating and/or the substrate over a period from a range from 12 hours to 84 hours at room temperature, wherein, in the case of no swelling, it is not possible with the aid of an optical profilometer based on white light interferometry to see any structures of ≥500 nm in z direction on the surface of the spectacle lens comprising at least one photochromic layer.

43. A spectacle lens comprising at least one substrate and at least one photochromic layer, wherein the spectacle lens comprises, in each case on the same surface also comprising the at least one photochromic layer, at least one barrier layer and/or at least one chemically modified layer, and at least the same one of the surfaces of the substrate comprises
a) at least one photochromic layer,
b) at least one acrylate-epoxy layer and
c) at least one hardcoat layer,
wherein the at least one acrylate-epoxy layer and the at least one hardcoat layer are disposed remote from the substrate in relation to the at least one photochromic layer, the at least one hardcoat layer is disposed furthest remote from the substrate in relation to the at least one photochromic layer, and the spectacle lens, in the event of at least one instance of damage by scratching with a scoring tool to the surface of the spectacle lens comprising at least one photochromic layer with a force of ≤65 mN, after complete contamination of the damaged surface of the spectacle lens comprising at least one photochromic layer with at least one organic acid selected from a liquid organic aliphatic saturated or unsaturated, optionally substituted, monocarboxylic acid, has no swelling of the coating and/or the substrate over a period from a range from 12 hours to 84 hours at room temperature, wherein, in the case of no swelling, it is not possible with the aid of an optical profilometer based on white light interferometry to see any structures of ≥500 nm in z direction on the surface of the spectacle lens comprising at least one photochromic layer.

44. The spectacle lens as claimed in claim 1, further comprising:
at least one antireflection layer.

* * * * *

UNITED STATES PATENT AND TRADEMARK OFFICE
CERTIFICATE OF CORRECTION

PATENT NO. : 11,874,534 B2
APPLICATION NO. : 17/078143
DATED : January 16, 2024
INVENTOR(S) : Norbert Hugenberg et al.

It is certified that error appears in the above-identified patent and that said Letters Patent is hereby corrected as shown below:

On the Title Page

Item (73), change "GmbM" to -- GmbH --

Item (56) Other Publications, change "von Gleitsichtglaeser" to -- von Gleitsichtglaesern --

In the Specification

In Column 3, Line 51: change "Koppen "Konzeption and" to -- Köppen "Konzeption und --

In Column 16, Line 39: change "Lacke and" to -- Lacke und --

In Column 48, Line 9: change "II.1" to -- III --

Signed and Sealed this
Thirteenth Day of February, 2024

Katherine Kelly Vidal
*Director of the United States Patent and Trademark Office*